US008204840B2

(12) United States Patent
Patil et al.

(10) Patent No.: US 8,204,840 B2
(45) Date of Patent: Jun. 19, 2012

(54) GLOBAL CONDUCT SCORE AND ATTRIBUTE DATA UTILIZATION PERTAINING TO COMMERCIAL TRANSACTIONS AND PAGE VIEWS

(75) Inventors: Dhanurjay A. S. Patil, Belmont, CA (US); Timothy M. Murphy, San Mateo, CA (US); Hugo Olliphant, San Francisco, CA (US); Brian Andrew Phillips, San Francisco, CA (US); George Lee, Mountain View, CA (US); Daniel L Pritchett, San Jose, CA (US)

(73) Assignee: eBay Inc., San Jose, CA (US)

( * ) Notice: Subject to any disclaimer, the term of this patent is extended or adjusted under 35 U.S.C. 154(b) by 867 days.

(21) Appl. No.: 11/953,244

(22) Filed: Dec. 10, 2007

(65) Prior Publication Data
US 2009/0125349 A1 May 14, 2009

Related U.S. Application Data

(60) Provisional application No. 60/988,967, filed on Nov. 19, 2007, provisional application No. 60/986,879, filed on Nov. 9, 2007.

(51) Int. Cl.
*G06F 17/00* (2006.01)
(52) U.S. Cl. ........................................ 706/45
(58) Field of Classification Search .......... 706/12, 706/20, 45–48; 705/38
See application file for complete search history.

(56) References Cited

U.S. PATENT DOCUMENTS

| 5,577,106 | A | 11/1996 | Tanaka et al. |
| 6,032,188 | A | 2/2000 | Mairs et al. |
| 6,208,720 | B1 | 3/2001 | Curtis et al. |
| 6,321,206 | B1 | 11/2001 | Honarvar |
| 6,405,173 | B1 | 6/2002 | Honarvar et al. |
| 6,430,545 | B1 | 8/2002 | Honarvar et al. |
| 6,493,637 | B1 * | 12/2002 | Steeg .............................. 702/19 |
| 6,609,120 | B1 | 8/2003 | Honarvar et al. |
| 6,708,155 | B1 | 3/2004 | Honarvar et al. |
| 2002/0133721 | A1 | 9/2002 | Adjaoute |
| 2002/0198866 | A1 * | 12/2002 | Kraft et al. ....................... 707/3 |
| 2003/0097320 | A1 | 5/2003 | Gorden |
| 2003/0204426 | A1 | 10/2003 | Honarvar et al. |

(Continued)

OTHER PUBLICATIONS

"U.S. Appl. No. 11/618,465, Examiner Interview Summary mailed Dec. 14, 2009", 3 pgs.

(Continued)

*Primary Examiner* — David Vincent
(74) *Attorney, Agent, or Firm* — Schwegman, Lundberg & Woessner, P.A.

(57) ABSTRACT

In one embodiment, a system and method is illustrated as including generating a model using at least one of a global conduct score and attribute data. A range of numeric values may be retrieved, based upon which, a better term is granted in a transaction than would otherwise be granted in the transaction. A comparison may be made between the model and the range of numeric values. Further, a better term may be granted in the transaction where the model falls within the range of numeric values. The global conduct score is computed using an approach including at least one of a feed score approach, and a composite score approach. The attribute data includes page view data, click through data, account usage data, and good purchased data. The model includes a global conduct score model, a weighting model, an AI based model, and an associated network based model.

25 Claims, 31 Drawing Sheets

U.S. PATENT DOCUMENTS

| | | | |
|---|---|---|---|
| 2004/0122803 A1 | 6/2004 | Dom et al. | |
| 2004/0148211 A1 | 7/2004 | Honarvar et al. | |
| 2004/0249866 A1 | 12/2004 | Chen et al. | |
| 2006/0287910 A1* | 12/2006 | Kuchar et al. | 705/10 |
| 2007/0078707 A1* | 4/2007 | Axe et al. | 705/14 |
| 2007/0255821 A1* | 11/2007 | Ge et al. | 709/224 |
| 2008/0162259 A1 | 7/2008 | Patil et al. | |
| 2008/0222284 A1* | 9/2008 | Barua et al. | 709/224 |
| 2009/0276233 A1* | 11/2009 | Brimhall et al. | 705/1 |
| 2010/0223211 A1* | 9/2010 | Johnson et al. | 706/11 |

OTHER PUBLICATIONS

"U.S. Appl. No. 11/618,465, Non-Final Office Action mailed Aug. 3, 2010", 15 pgs.

"U.S. Appl. No. 11/618,465, Final Office Action mailed Apr. 15, 2010", 16 pgs.

"U.S. Appl. No. 11/618,465, Non-Final Office Action mailed Apr. 13, 2009", 17 pgs.

"U.S. Appl. No. 11/618,465, Response filed Jul. 15, 2010 to Final Office Action mailed Apr. 15, 2010", 11 pgs.

"U.S. Appl. No. 11/618,465, Response filed Aug. 13, 2009 to Non Final Office Action mailed Apr. 13, 2009", 12 pgs.

Lindorff, Dave, "CIO Insight", New York; vol. 1(20), ISSN15350096, ProQuest document ID: 234810651, (Nov. 2, 2002), 6.

"Rete algorithm—Wikipedia", http://en.wikipedia.org/wiki/Rete_algorithm#Rete_III, (Jun. 28, 2007).

"U.S. Appl. No. 11/618,465, Final Office Action mailed Feb. 4, 2011", 15 pgs.

"U.S. Appl. No. 11/618,465, Response filed Dec. 3, 2010 to Non Final Office Action mailed Aug. 3, 2010", 23 pgs.

"U.S. Appl. No. 11/618,465, Appeal Brief filed Jul. 8, 2011", 25 pgs.

"U.S. Appl. No. 11/618,465, Applicant's Summary of Examiner Interview filed Sep. 19, 2011", 1 pg.

"U.S. Appl. No. 11/618,465, Decision on Pre-Appeal Brief Request mailed Jun. 8, 2011", 2 pgs.

"U.S. Appl. No. 11/618,465, Examiner Interview Summary mailed Aug. 31, 2011", 3 pgs.

"U.S. Appl. No. 11/618,465, Examiner's Answer to Appeal Brief mailed Aug. 19, 2011", 21 pgs.

"U.S. Appl. No. 11/618,465, Reply Brief filed Sep. 19, 2011", 3 pgs.

"U.S. Appl. No. 11/618,465, Second Examiner's Answer to Appeal Brief mailed Aug. 31, 2011", 20 pgs.

"U.S. Appl. No. 11/618,465, Pre-Appeal Brief Request filed Apr. 4, 2011", 5 pgs.

"U.S. Appl. No. 11/618,465, Response filed Dec. 3, 2010 to Non Final Office Action mailed Aug. 3, 2010", 10 pgs.

* cited by examiner

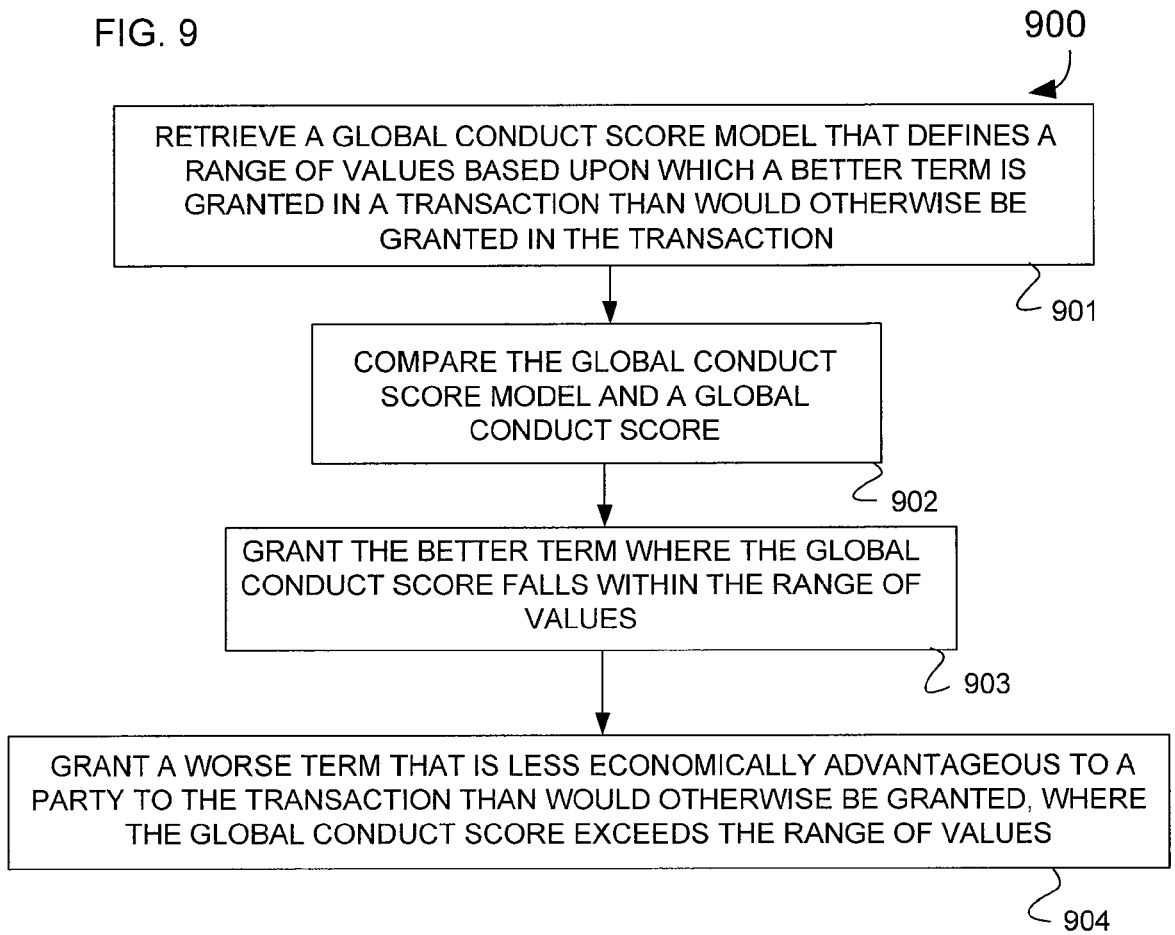
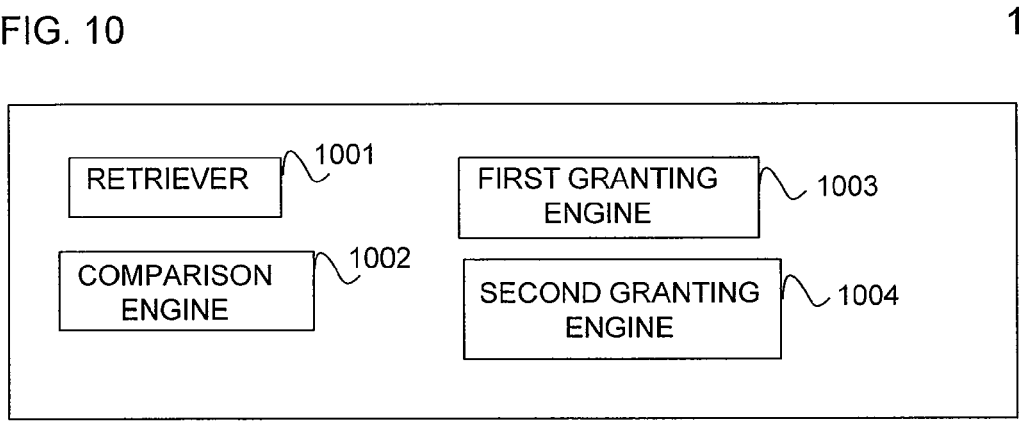

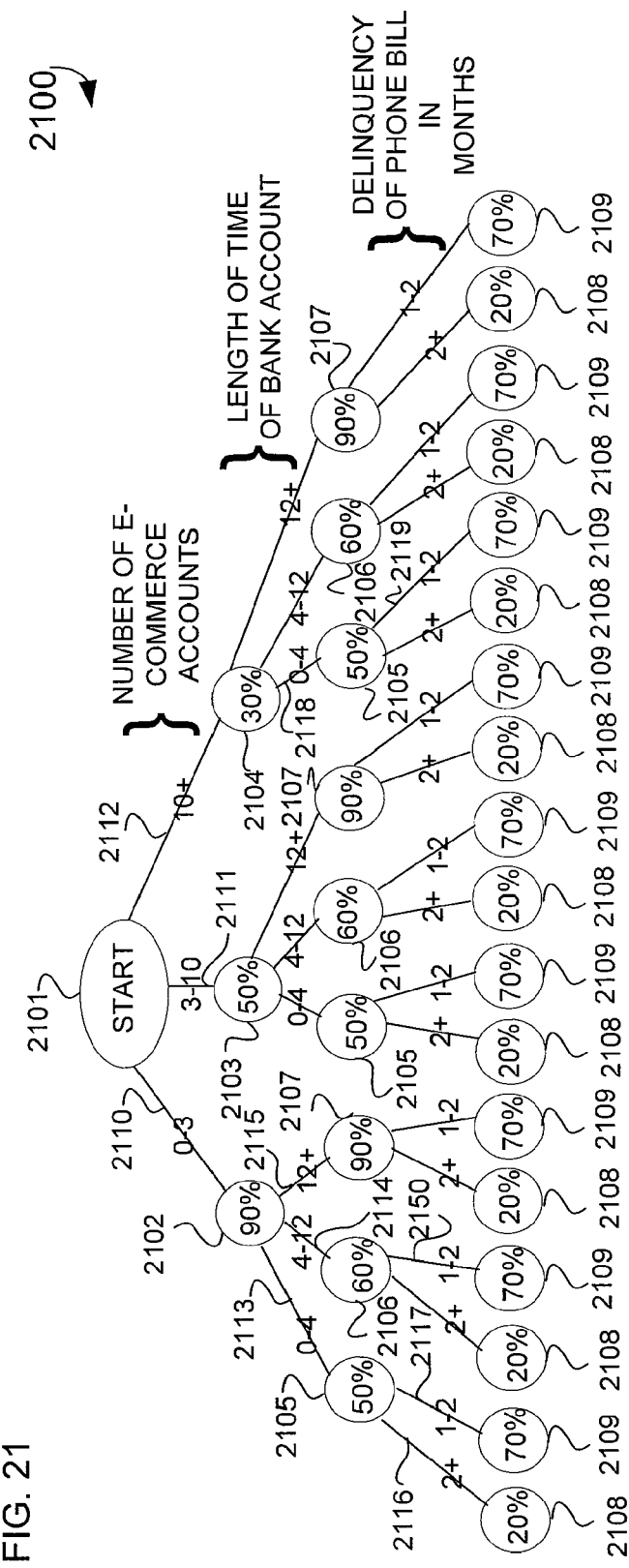
FIG. 21
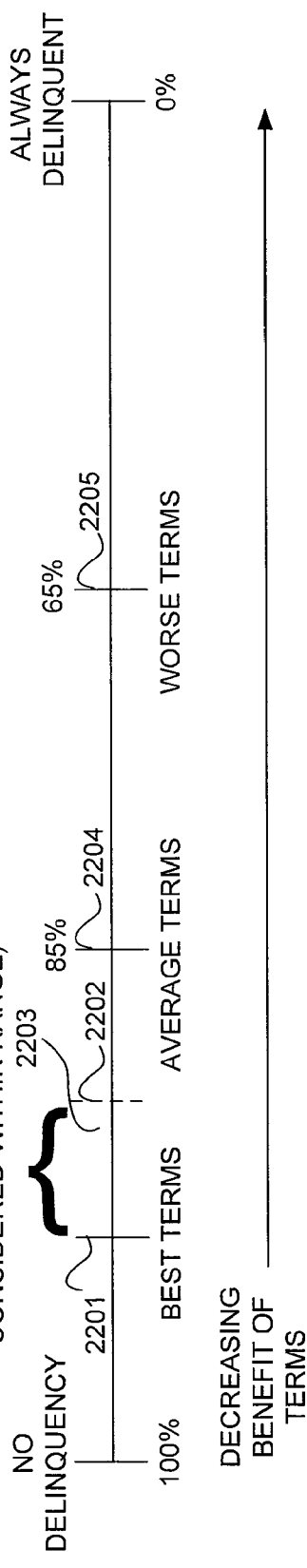
FIG. 22 RANGE WHERE TRANSACTION RECOMMENDED (E.G., CONSIDERED WITHIN RANGE)

GLOBAL CONDUCT SCORE AND ATTRIBUTE DATA UTILIZATION PERTAINING TO COMMERCIAL TRANSACTIONS AND PAGE VIEWS

CROSS REFERENCE TO RELATED APPLICATIONS

This is a non-provisional patent application that claims priority under 35 U.S.C. §119(e) to U.S. Provisional Patent Application No. 60/988,967 titled "GLOBAL CONDUCT SCORE AND ATTRIBUTE DATA UTILIZATION" that was filed on No. 19, 2007. This provisional patent application is incorporated by reference in its entirety into the present non-provisional patent application. Further, the present non-provisional patent application is related to U.S. patent application Ser. No. 11/618,465 entitled "ASSOCIATED COMMUNITY PLATFORM" that was filed on Dec. 29, 2006, and which is incorporated by reference in its entirety. This application is also provided as an Appendix A at the end of the present application. Further, the present non-provisional patent application is related to U.S. Provisional Patent Application No. 60/986,879 entitled "NETWORK RATING VISUALIZATION" which was filed on Nov. 9, 2007, and which is incorporated by reference in it entirety. This application is also provided as an Appendix B at the end of the present application.

TECHNICAL FIELD

The present application relates generally to the technical field of data mining applications and, in one specific example, the use of a data mining to track individual and network behavior.

BACKGROUND

One way that Internet based commercial transactions differ from traditional commercial transactions is that the anonymity of the Internet limits the ability of the parties to the Internet based commercial transaction to know the background of one another. Parties engage in these Internet based commercial transactions despite this anonymity.

BRIEF DESCRIPTION OF THE DRAWINGS

Some example embodiments are illustrated by way of example and not limitation in the figures of the accompanying drawings in which:

FIG. 9 is a flow chart illustrating a method used to retrieve a global conduct score to determine what terms should be granted in a transaction, according to an example embodiment.

FIG. 10 is a block diagram of a computer system used to retrieve a global conduct score to determine what terms should be granted in a transaction, according to an example embodiment.

FIG. 21 is a diagram illustrating an AI based model in the form of a Decision Tree, according to an example embodiment.

FIG. 22 is a diagram of a scale showing a range of values where these values represent percentile values ranging from no delinquency to always delinquent, according to an example embodiment.

DETAILED DESCRIPTION

Figure 1:
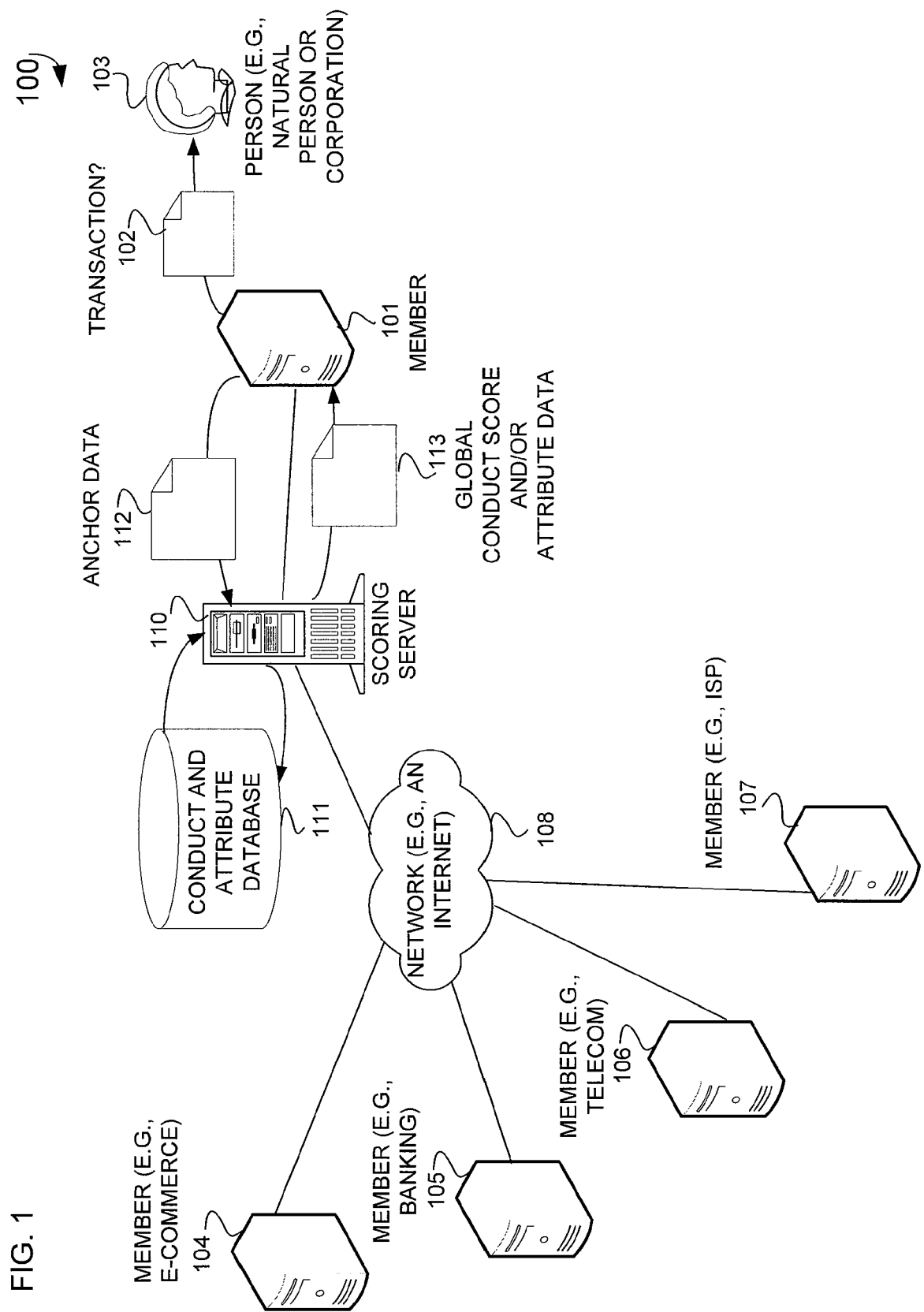
FIG. 1 is a diagram of a system illustrating the providing of anchor data and in response to this providing of anchor data, the generation of a global conduct score and/or attribute data, according to an example embodiment.

Example methods and systems to analyze global conduct scores and attribute data are disclosed herein. In the following description, for purposes of explanation, numerous specific details are set forth in order to provide a thorough understanding of example embodiments. It will be evident, however, to one skilled in the art that the present invention may be practiced without these specific details.

A Primer on the Generation of a Global Conduct Score and Attribute Data

In some example embodiments, a global conduct score and/or global attribute data may be generated, recorded, and processed. As will be more fully discussed below, these global conduct scores and/or attribute data may then, in some example embodiments, be used to assist in a determination of whether and/or under what terms one party should engage in a transaction (e.g., a commercial transaction) with another party. As a threshold matter, the generation of global conduct scores and/or attribute data is illustrated in U.S. patent application Ser. No. 11/618,465 entitled "ASSOCIATED COMMUNITY PLATFORM," copy of which is provided herein an Appendix A, with pages for this Appendix A referenced as 1A, 2A, 3A, etc. Drawing upon the technology disclosed in this application, the generation of global conduct scores and/or attribute data may be illustrated in the following manner.

In some example embodiments, a global conduct score is a numerical score reflecting the activities of a person. This global conduct score may be based upon one or more normal actor scores. A normal actor score is a numeric score generated by a member of a network. A member of network is a person who provides attribute data or a normal actor score for use by members of the network through the use of a computer system that is part of a network. A person may be a human being, or a legal construct such as a corporation. The network may utilize protocols including the Transmission Control Protocol/Internet Protocol (TCP/IP), Asynchronous Transfer Mode (ATM), or some other suitable protocol. For example, websites linked using TCP/IP such as an e-commerce site, a banking site, a telecom site, and an Internet Service Provider (ISP) site may form a network, where each site is a member of the network. (See pgs. 7A-8A)

In some example embodiments, this normal actor score may be a raw numerical score reflecting the activities of a person (e.g., a normal actor) with regard to one or more of the members. (See pg. 8A) In some example embodiments, a high value may reflect a good normal actor score, while, in some example embodiments, a normal actor score may reflect a poor normal actor score. In some example embodiments, the reverse may be "true." Collectively, these various members network may be considered a federation of participants.

Some example embodiments may include processing one or more of these normal actor scores so as to generate a global conduct score (e.g., a global score). This global conduct score may be generated using either a composite score approach, a global feed score approach, some combination of the two, or some other suitable approach. A composite score approach may be illustrated with the following example. Assume an e-commerce site and ISP each generates a normal actor score of 65 and 75 respectively. Also assume that banking site and telecom site generate scores of 55 and 85 respectively. Once these scores are generated, then subset of these score are added together and analyzed such that after each addition, the scores are compared to ensure that there is consistency among the scores. For example, 65 and 75 are added together to create a global score of 140. Then 55 and 85 are added together to create a global score of 140. The sums of these two sub sets are then compared so as to maintain and retain confidence in the scores. Specifically, in the present example, both sums equal 140 such that there is a high degree of confidence in the conjecture that the score for both subsets represents the same individual. Taken together these two sub set scores form a global conduct score which here is 280. In some example cases, a standard deviation value will be used to determine whether two or more sub set scores are deemed to be approximately equal. (See generally pgs. 13A-14A, 48A)

Some example embodiments may implement a feed global score approach. In the feed global score scenario, a score from one site (e.g., banking site) is provided to a second site (e.g., telecom site) where the product of these two scores is determined. Once determined, then this product is provided to a third site (e.g., e-commerce site) where the product is determined and so on until the product of all global scores for all members of the network is calculated. For example, if the global score for the banking site 602 is 0.90, and the global score for the telecom site 603 is 0.80, then the product score will be 0.85. The aggregate of these products will produce a global conduct score (e.g., a global confidence score). (See generally pgs. 14A-15A, and 49A) This product score may also be used to determine risk as used in risk based pricing and terms. In some example embodiments, the global score may be calculated using a function of one or more mathematical properties to generate a result in the form of output from that function.

In some example embodiments, in addition to the generation of a global conduct score, attribute data for a person may be record by each of the previously referenced sites. For example, a software module (e.g., an executed operation), or hardware module on an e-commerce site may be implemented that generates attribute abbreviation data or even a normal actor attribute list (e.g., collectively attribute data) through obtaining recorded data from a database. Further such modules may be implemented on the ISP site, banking site, and/or telecom site that also record data regarding a person. Recorded data may include the number or purchases made on an e-commerce site, the number an amount of transactions made, dates accounts were opened for a bank, the location form which phone calls were made for an account related to a telecom site, the physical location of Internet Protocol (IP) addresses used a person as provided by an ISP. (See pg. 45A) Once this data is obtained from, for example, the ISP site, banking site or the like, the data may then be transmitted to a third site, and computer operatively coupled to this third site for processing and analysis. (See e.g., pg. 12A, and 47A). For example, if a person opens a new account on an ISP, or opens a new banking account with the banking node, then data reflecting these new accounts may be received to update to a database residing as apart of this third site and associated computer. And again, if the normal actor clicks through a number of web pages on the e-commerce site, then these various click-throughs may also be recorded in the database. (See pgs. 15A-16A, and 49A-50A). This attribute data may, in some example cases, allow for a more granular description of the activities of a person as compared to a global conduct score, which provides a score that, while based upon certain industry or network (e.g., a merchant network) standards, fails to provide granularity as to what the score actually means, in terms what specific activities have (e.g., the normal actor engaged in).

In some example embodiments, a global conduct score and/or attribute data may not only be based upon a specific individuals behavior and actions, but may also be based upon the network (e.g., an association network) that the individual is associated. In some example cases, a hierarchy of association networks may be used. In such an example, an aggregating of the global conduct scores, or even attribute data compiled from members may occur using the association network. This use of association networks in determining the global conduct score and/or attribute data for a person will be more fully discussed below.

A Primer on the Graphical Representation of Associated Network Models

Some example embodiments may include the representation of an associated network models in a Graphical User Interface (GUI). The system and method illustrated in U.S. Provisional Patent Application No. 60/986,879 entitled "NETWORK RATING VISUALIZATION," which is incorporated by reference in its entirety, may be used, for example, to display the associated network models as illustrated at 2904 and 3400 in a GUI. FIGS. 8-11 on pgs 32B-35B, and their associated descriptions of a system and method, shown how these example associated network models might be displayed in a GUI. Further, these same GUIs, and associated descriptions of a system and method, may be used to display the example networks in FIGS. 1-6, 18-19, and 23 on pgs. 39A-43A, and 50A-51A.

Example Case of Using Global Conduct Score and/or Attribute Data in a Transaction FIG. 1 is a diagram of an example system 100 illustrating the providing of anchor data, and in response to this providing of anchor data, the generation of a global conduct score and/or attribute data. In some example embodiments, this global conduct score and/or attribute data may be generated by a scoring server. Illustrated is a member 101, wherein this member 101 is a computer system utilized by a natural person, a corporation, or some other suitable entity. This member 101 may contemplate engaging in a transaction 102 with, for example, a person 103. This person 103 may be a natural person, a corporation, or some other suitable entity utilizing a computer system. The transaction 102 may be, for example, a sales transaction, a purchase transaction, or some other transaction commonly performed in commerce. Prior to engaging in this transaction 102, a member 101 may, for example, request anchor data from the person 103. This anchor data may be some type of data identifier that uniquely identifies a person. This anchor data may be, for example, a numeric value assigned by a scoring server or member (e.g., scoring server 110, or member 101), a social security number, a bank account number, two or three factor identification, biometric identification, or some other suitable form of identification that will uniquely identify the person 103. This anchor data is provided to, for example, a scoring server 110 as anchor data 112. In some example cases, this anchor data 112 is provided to a plurality of scoring servers. Once this anchor data 112 is provided to a scoring server 110, the scoring server 110 may then retrieve a global conduct score and/or attribute data from a conduct and attribute database 111. This conduct and attribute database 111 may be populated with data provided, in part, by, for example, a member 104, such as an e-commerce site, a member 105 who may be, for example, a banking site, a member 106 that may be a Telecom site, or member 107 who may be, for example, an ISP. These various members (e.g., 104, 105, 106 and 107) may utilize one or more computer systems as part of their respective web sites, and may each be operatively coupled to a network 108. These computer systems may be web servers, application servers, or some other suitable computer system. The scoring server 110 may also be operatively coupled to the network 108 such that the various members (e.g., 104, 105, 106 and 107), and the computer systems utilized by them, may be able to transmit attribute data over the network 108 to the scoring server 110 for processing. In some example cases, as illustrated above, a normal actor score, or even a global conduct score may be transmitted by one or more of the members to the scoring server 110.

Processing of the normal actor score, global conduct score, or even attribute data may take a variety of forms. For example, the conversion of the normal actor scores to a global conduct score may take the form of the scoring server 110 generating a conduct score utilizing one of more of the method previous illustrated (e.g., executing the feed method, or the composite method). Still further, with regard to the case of a scoring server receiving global conduct scores from members, the scoring server 110 may act to apply the feed method, composite method, or may merely average these global conduct scores. In example cases where attribute data is received from these members, the scoring server 110 may store the attribute data along with the global conducts scores, normal actor scores, and other suitable data into a conduct and attribute database 111. In certain example cases, though not pictured, a database server may act as an intermediary between the scoring server 110 and the conduct and attribute database 111 such that the database server receives queries from the scoring server 110, processes them and then requests data from the conduct and attribute database 111. In certain example cases, a plurality of database servers may be used.

Once the anchor data 112 is received at the scoring server 110, the scoring server 110 queries the conduct and attribute database 111 and the returns a global conduct score and/or attribute data 113 to the member 101. The decision as to whether a global conduct score or attribute data may be returned may be based upon a query type that is generated and sent along with the anchor data. This query types will be more fully illustrated below. In some example embodiments, the member 101 may be provided with only a conduct score. In other example cases, they may be provided with only the attribute data. In still other example cases, they may be provided with a combination of the conduct score and all or some of the attribute data associated with the provided anchor data 112.

Some example embodiments may include the scoring server 110 providing the member 101 with some level of analysis of the global conduct score and/or attribute data in lieu of providing them with the actual global conduct score and/or attribute data 113. This analysis may include instructing the member 101 as to whether or not to engage in the transaction 102 with the person 103. In other example cases, however, the member 101 may perform this analysis. Once the member 101 receives the global conduct score and/or attribute data 113, that member 101 may then use the provided global conduct score and/or attribute data to determine whether or not they should engage in a transaction 102 with the person 103.

Example Retrival of Global Conduct Score

In some example embodiments, a person may be able to retrieve their own global conduct score and/or attribute data. The basis for this retrieve may exist due to the person having certain privileges to access the global conduct score and/or attribute data. Additionally, the person may also be able to dispute their global conduct score and/or attribute data.

Some example embodiments may include a dispute resolution process whereby once a person learns of their global conduct score and/or attribute data, they may be able to challenge the global conduct score, attribute data and the factual basis for the global conduct score and attribute data. For example, the person may be able to use an email or some other suitable mechanism of communication to send a challenge to member of the network (e.g., members 104-107) providing the information for the global conduct score and/or attribute data, or to the party managing the scoring server 110. This challenge may reference the anchor data used to uniquely refer to the person, and then cite the allegedly erroneous nature of the global conduct score, and/or attribute data. The member 104-107, or party managing the scoring server 110, receiving the challenge may then investigate the validity of the erroneous nature and act to change the global conduct score and/or attribute data accordingly. The basis for changing the global conduct score and/or attribute data may be left to the discretion of the party managing the scoring server 110, and/or the member 104-107.

Figure 2:
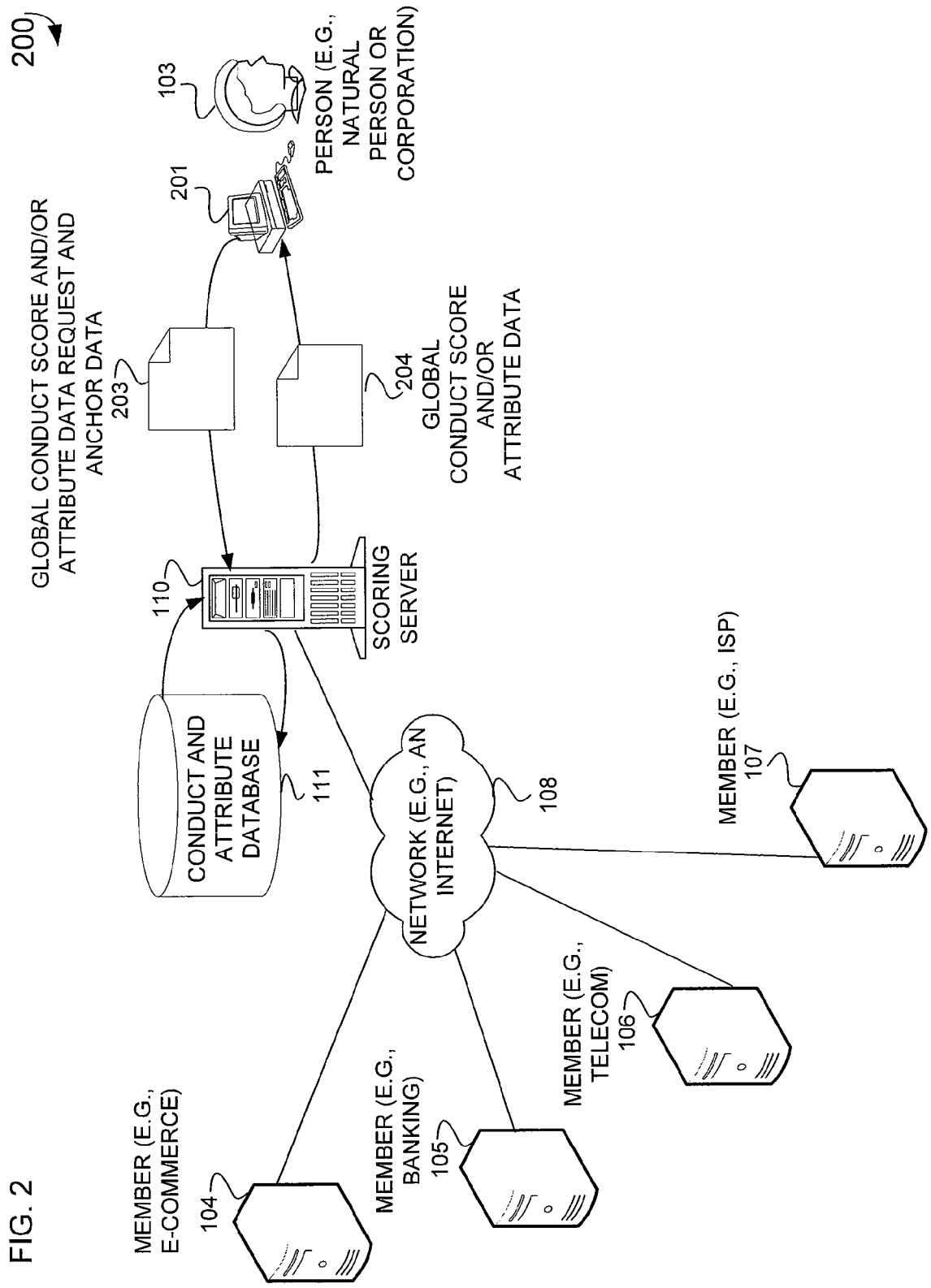
FIG. 2 is a diagram of a system where people seeks a global conduct score and/or attribute data regarding themselves, according to an example embodiment.

FIG. 2 is a diagram of an example system 200 where the person 103 seeks a global conduct score and/or attribute data regarding themselves. Illustrated is the person 103 utilizing a computer system 201, who generates a global conduct score and/or attribute data request 203, wherein this global conduct score and/or attribute data request 203 may contain, for example, anchor data. A data request may be a request for a global conduct score, or attribute data. This request may be made via a network using, for example, TCP/IP. This anchor data, as previously illustrated, serves to uniquely identify the person 103. This global conduct score and/or attribute data request 203 may be transmitted across, for example, the network 108 (not pictured). Once the global conduct score and/or attribute data request 203 is received by a scoring server 110, the global conduct score may be processed by the scoring server 110. The computer system 201 and the scoring server 110 may be operatively connected via the network 108 (not pictured).

In some example embodiments, the processing performed by the scoring server 110 may include, for example, the scoring server 110 making a database query of the conduct and attribute database 110. This query, on the part of the scoring server 110, may be premised upon the person 103 having a privilege or right to access a global conduct score or attribute data. In some example cases, as a precondition to exercising this privilege, a person may be required to provide the correct anchor data. Further, in some example cases, a person may have to provide a monetary payment to access this global conduct score and/or attribute data. This monetary payment may have to be made before, after, or contemporaneous with the analyzing of the global conduct score, and/or attribute data. Assuming, for example, that the person 103 has the privileges to be able to access this global conduct score and/or attribute data, the scoring server 110 may generate a global conduct score and/or attribute data 204 in the form of, for example, one or more data packets. This global conduct score and/or attribute data 204 may then be transmitted across a network, such as network 108 (not pictured), to be received by the computer system 201. Once received by the computer system 201, the person 103 may be free to view their global conduct score and/or attribute data.

Figure 3:
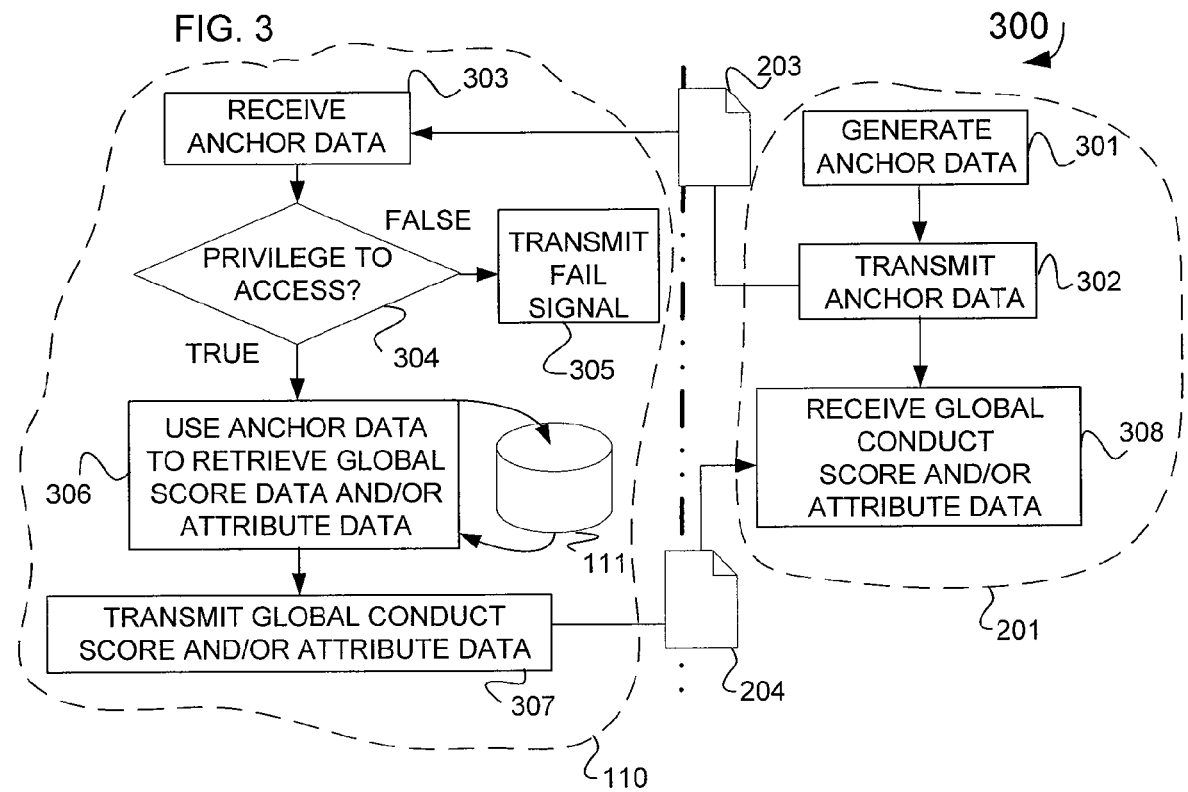
FIG. 3 is a flowchart illustrating a method used to both receive a global conduct score and/or attribute data request, the accompanying anchor data, and to process this global conduct score and/or attribute data request, according to an example embodiment.

FIG. 3 is a flowchart illustrating an example method 300 used to both receive a global conduct score and/or attribute data request 203, the accompanying anchor data, and to process this global conduct score and/or attribute data request 203. Once processed, and where the permissions to do so exist, a global conduct score and/or attribute data 204 may be returned. This flowchart is a dual-stream flowchart, wherein a first stream illustrates various operations residing as part of, for example, a scoring server 110. The second stream illustrates various operations residing as a part of, for example, the computer system 201. In one embodiment, an operation 301 residing on the computer system 201 generates anchor data. Once operation 301 is executed, and anchor data generated, a second operation 302 is executed that transmits this anchor data along with, for example, a global conduct score and/or attribute data request 203. This global conduct score and/or attribute data request 203 along with anchor data is transmitted across a network and is ultimately received through the execution of an operation 303 residing as a part of the scoring server 110. Once the operation 303 is successfully executed, the decisional operation 304 is executed that determines whether or not the person, such as person 103, making the request has the privilege to access the global conduct score and/or attribute data associated with the anchor data. In example cases where a decisional operation 304 evaluates to "false," then a further operation 305 is executed that transmits a fail signal instructing the requesting person, in this case person 103, that they may not receive the requested global conduct score and/or attribute data. In example cases where a decisional operation 304 evaluates to "true," a further operation 306 is executed that uses the anchor data as a uniquely identifying value to retrieve the global score and/or attribute data from the previously illustrated conduct and attribute database 111. In certain example cases, one type of anchor data may serve to uniquely identify a person, such as person 103, whereas, in other example cases, a plurality of anchor data may be used to uniquely identify this person. For example, in certain example cases a social security number along with two or even three factor identification may be used to identify a person such as person 103. Upon the successful execution of operation 306, a further operation 307 is executed that transmit the global conduct score and/or attribute data now in the form of a global conduct score and/or attribute data 204 (e.g., one or more packets containing this data) back across a network, such as network 108. This global conduct score and/or attribute data 204 may be received through the execution of an operation 308 that resides as a part of the computer system 201. Once this global conduct score and/or attribute data 204 is received by the computer system 201, the person 103 is free to view this global conduct score and/or attribute data.

Figure 4:
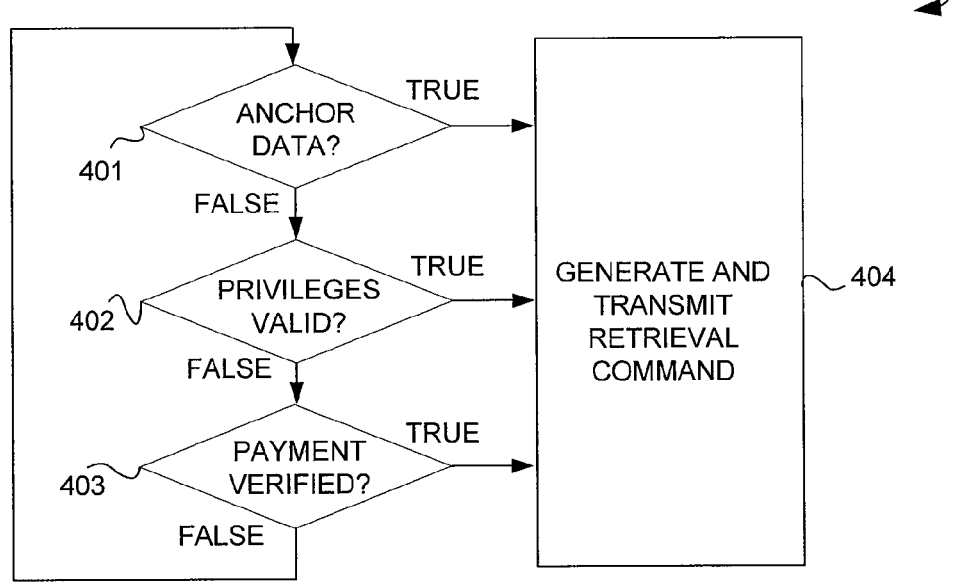
FIG. 4 is a flowchart illustrating a method used to execute a decisional operation that determines whether or not the person making a request for a global conduct score and/or attribute data has the privilege to access this data, according to an example embodiment.

FIG. 4 is a flowchart illustrating an example method used to execute a decisional operation 304. Illustrated is a decisional operation 401 that determines whether or not anchor data has be provided to identify the particular person seeking a global conduct score and/or attribute data. In example cases where a decisional operation 401 evaluates to "true," then an operation 404 is executed that generates and transmits a retrieval command to, in effect, facilitate the retrieval of the global conduct score and/or attribute data from, for example, the conduct and attribute database 111. In example cases where a decisional operation 401 evaluates to "false," a further decisional operation 402 is executed that determines whether or not a particular person, such as person 103, has valid privileges to access the global conduct score and/or attribute data corresponding to, for example, the anchor data. In certain example cases, a person such as person 103 may not be able to access a global conduct score and/or attribute data associated with a uniquely identifying piece of anchor data. These privileges may, for example, restrict such access to specific persons. In example cases where a decisional operation 402 evaluates to "true," the previously illustrated operation 404 is executed. In example cases where a decisional operation 402 evaluates to "false," a further decisional operation 403 is executed that determines whether payment has been verified. In certain example cases access to the global conduct score and/or attribute data associated with a particular piece of anchor data may be predicated upon a person, such as a person 103, making some type of monetary payment or providing some other type of financial consideration. In example cases where a decisional operation 403 evaluates to "true," the previously shown operation 404 executes. In case where a decisional operation 403 evaluates to "false," then a loop is formed and the previously shown decisional operation 401 may be executed. In some example embodiments only one of these decisional operations (e.g., 401, 402, or 403) may be used to determine whether a person, such as person 103, has privilege to access a particular global conduct score and/or piece of attribute data. In other example cases, a combination or permutation different from the ordering shown may be utilized. The utilization of any one of these combinations or permutations may be implementation specific, and based upon the needs and desires of a particular software developer, or other suitable person.

Figure 5:
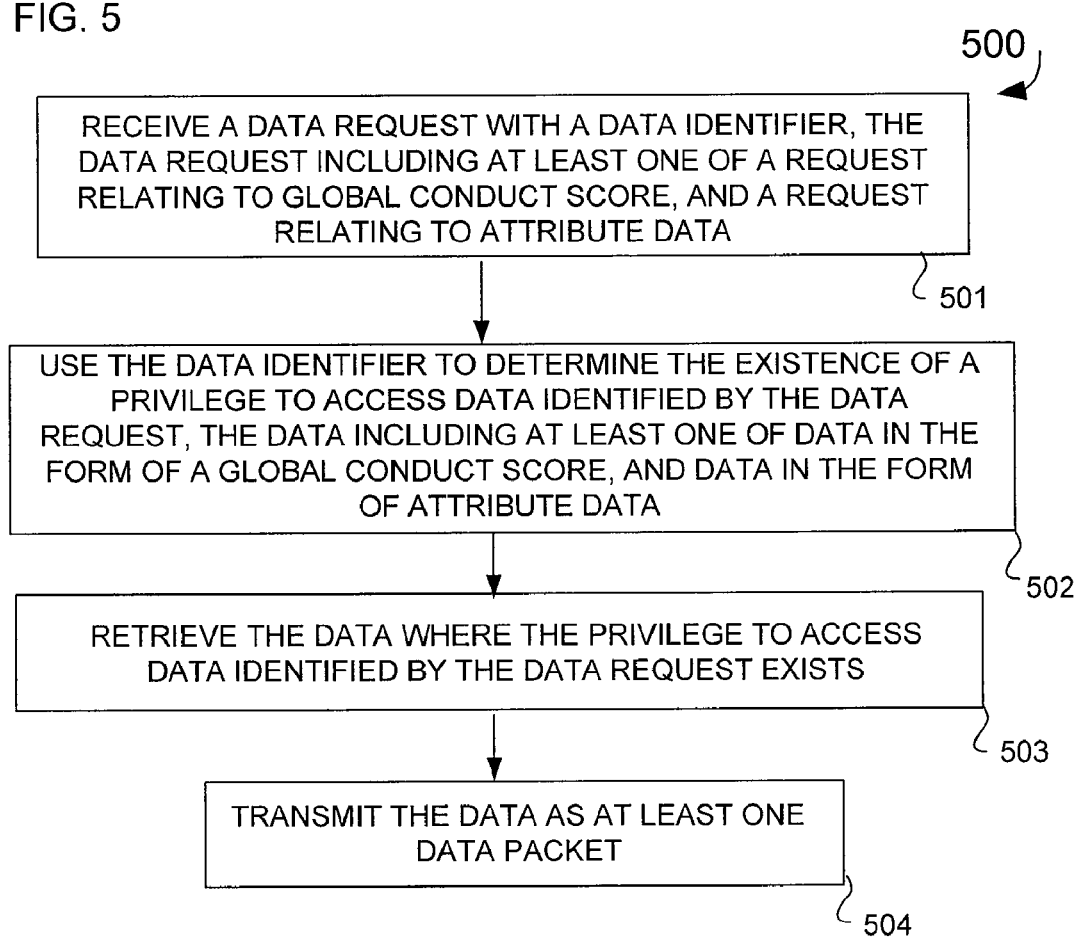
FIG. 5 is a flow chart illustrating a method for determining the existence of a privilege to access a global conduct score and/or attribute data, according to an example embodiment.

FIG. 5 is a flow chart illustrating an example method 500 for determining the existence of a privilege to access a global conduct score and/or attribute data. The operations shown below may reside as part of the scoring server 110, the computer system 201, or as one of the computer systems associated with the member of the network 104-107. Shown is an operation 501 that, when executed, operates to receive a data request with a data identifier, the data request including at least one of a request relating to global conduct score, and a request relating to attribute data. For example, the operation 501 may receive a global conduct score and/or attribute data request 203. An operation 502 is also shown that uses the data identifier to determine the existence of a privilege to access data identified by the data request, the data including at least one of data in the form of a global conduct score, and data in the form of attribute data. The privilege may be determined by, for example, the execution of the operation 304. Operation 503 is illustrated that, when executed, retrieves the data where the privilege to access data identified by the data request exists. This operation may have functionality similar to, for example, operation 306. An operation 504 is shown that transmits the data as at least one data packet, such as the global conduct score and/or attribute data 204. Operation 504 may have functionality similar to, for example, operation 307.

Figure 6:
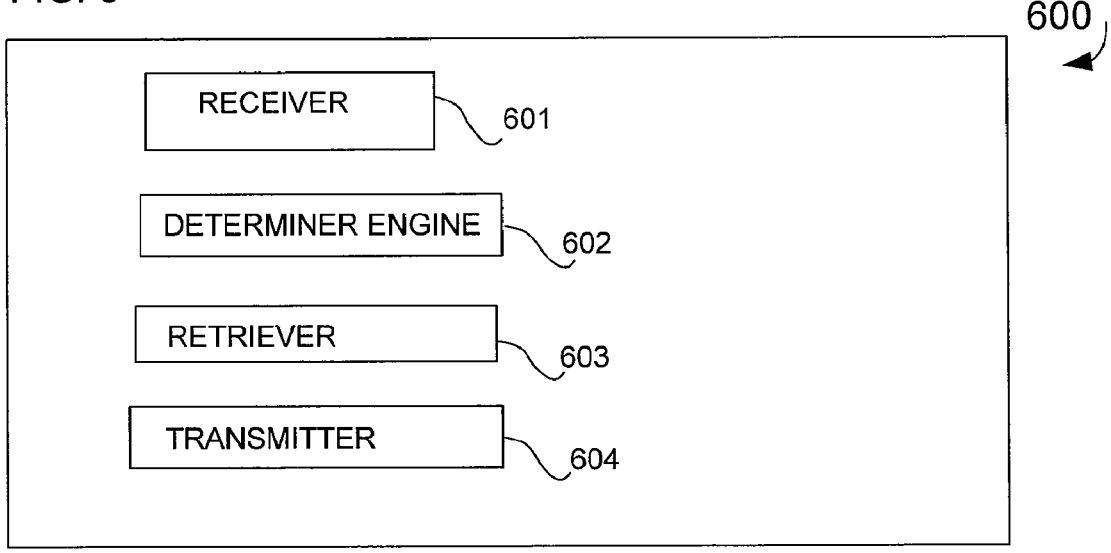
FIG. 6 is a block diagram of a computer system for determining the existence of a privilege to access a global conduct score and/or attribute data, according to an example embodiment.

FIG. 6 is a block diagram of a computer system 600, and some of the functionality associated therewith. The blocks may be implemented as hardware, firmware, or even software. These blocks may reside as part of the scoring server 110, the computer system 201, or as one of the computer systems associated with the member of the network 104-107. Illustrated is a receiver 601 to receive a data request with a data identifier, the data request including at least one of a request relating to global conduct score, and a request relating to attribute data. A determiner engine 602 is also shown to that uses the data identifier to determine the existence of a privilege to access data identified by the data request, the data including at least one of data in the form of a global conduct score, and data in the form of attribute data. A retriever 603 is illustrated that retrieves the data where the privilege to access data identified by the data request exists. A transmitter 604 is shown that transmits the data as at least one data packet.

Example Use of Global Conduct Score

Figure 7:
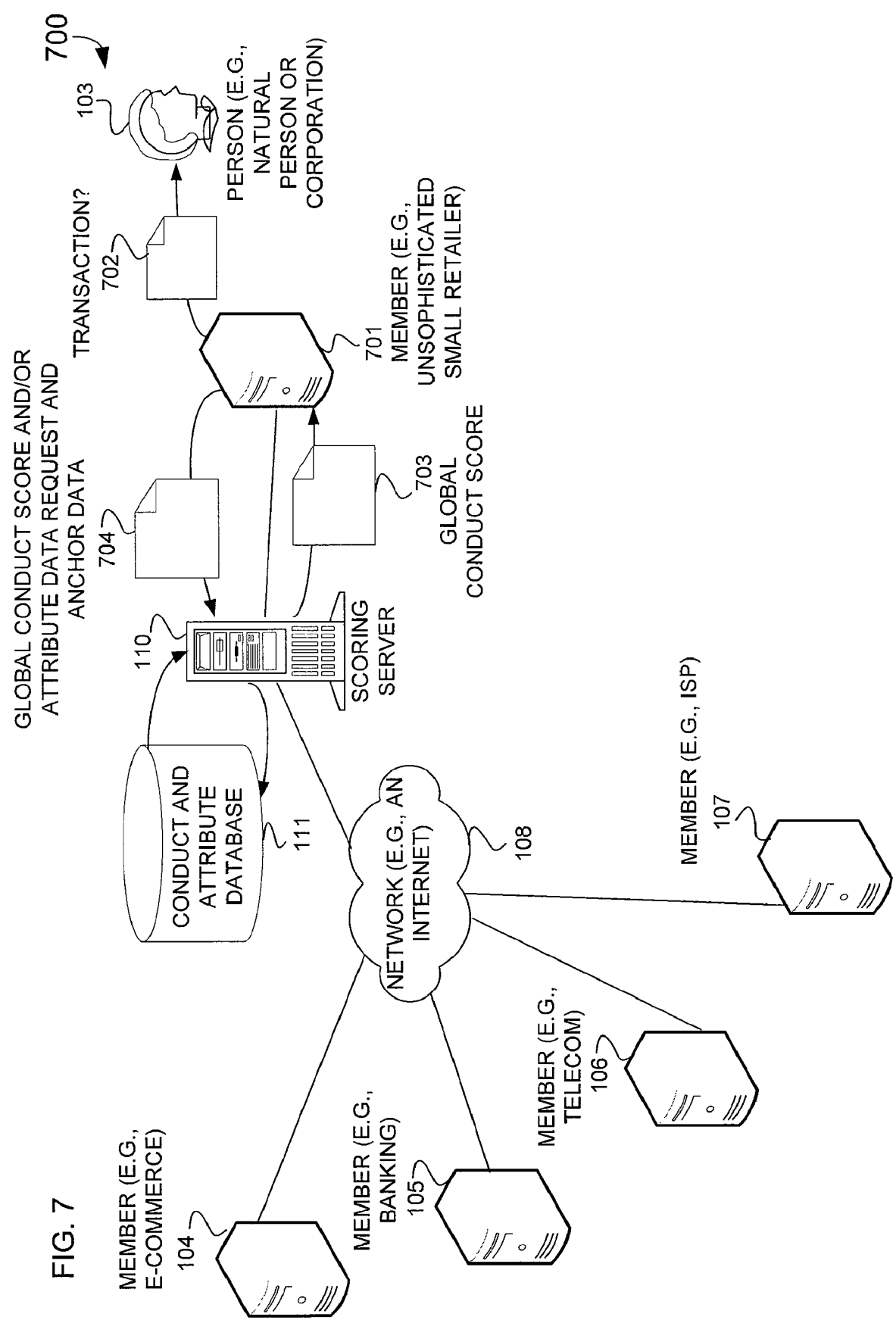
FIG. 7 is a diagram of a system illustrating the providing of a global conduct score to a member, wherein this member may be an unsophisticated small retailer utilizing a computer system, according to an example embodiment.

FIG. 7 is a diagram of an example system 700 illustrating the providing of a global conduct score to a member 701, wherein this member 701 may be, for example, an unsophisticated small retailer utilizing a computer system. Unsophisticated may mean they have limited facilities and support staff to conduct any level of analysis of a global conduct score and/or attribute data. Further, this member 701 may be part of the previously referenced federation of participants that includes the members 104-107. Illustrated is the person 103 who seeks to engage in a transaction 702 with the member 701. In certain example cases, the member 701 may seek to engage in the transaction 702 with the person 103. In response to this transaction 702, the member 701, in some example embodiments, may generate a global conduct score and/or attribute data request 704, and send this, and associated anchor data, across a network, such as network 108 (not shown), to be received by the scoring server 110. Once received by the scoring server 110, the scoring server 110 may determine if the member 701 has a privilege to access the global conduct score and/or attribute data associated with the anchor data. In example cases where they do have the privilege, the scoring server 110 may query the conduct and attribute database 111, and retrieve a global conduct score. This global conduct score, now a global conduct score 703, may then be transmitted back across a network, such as network 108 (not shown), to the member 701. This member 701 may then look at this global conduct score, and make a determination as to whether or not they will engage in the transaction 702 with the person 103. In certain example cases, this transaction 702 may be, for example, a sales transaction, a purchase transaction, or some other suitable type of transaction common in the area of commerce. In certain example cases, in lieu of providing the member 701 with a global conduct score 703, the scoring server 110 may themselves provide some level of analysis to the member 701. This analysis may include, for example, the scoring server 110, in effect advising (e.g., saying "yes," "no," or even under what conditions) the member 701 as to whether or not they should engage in a transaction 702 with the person 103.

Figure 8:
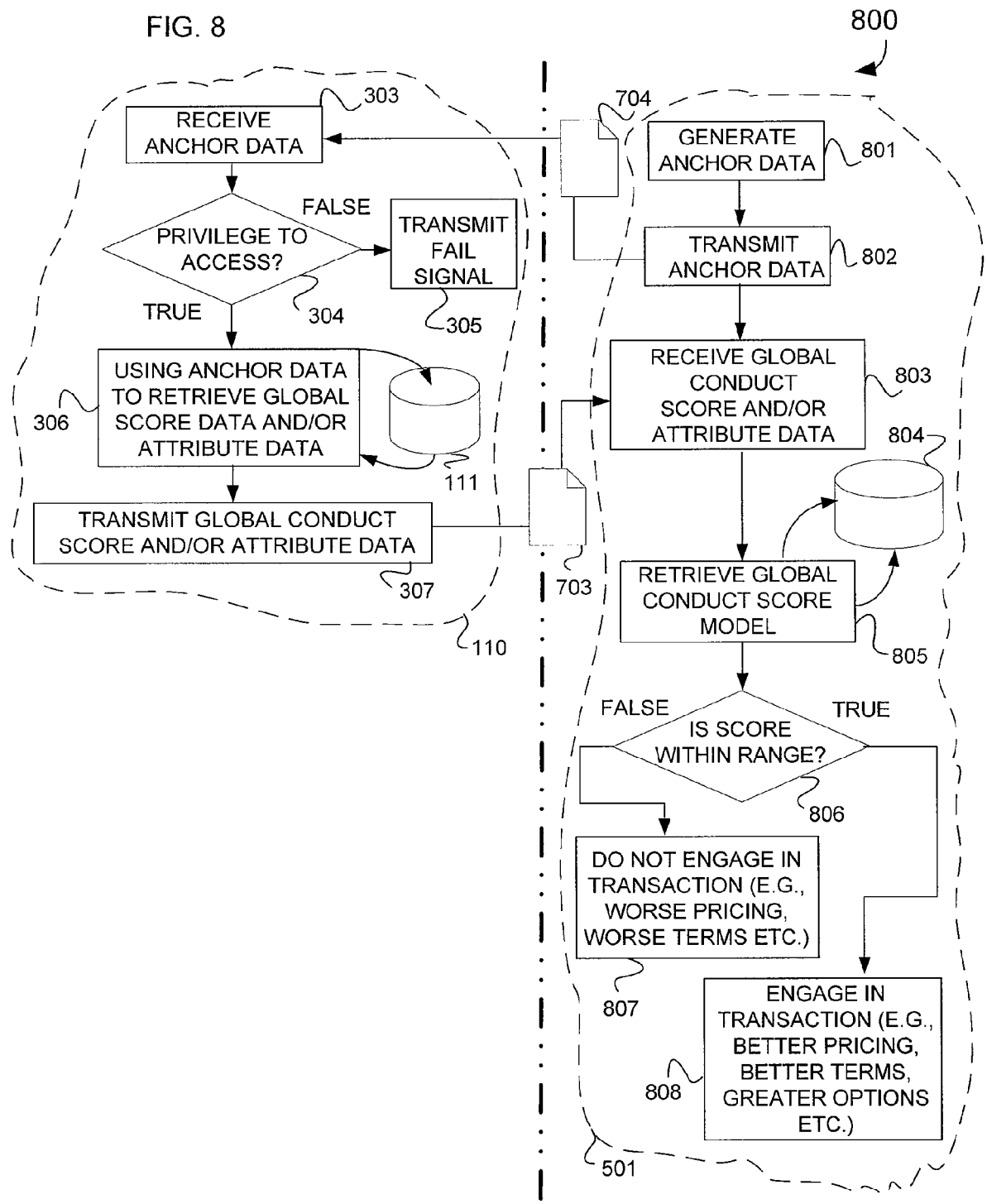
FIG. 8 is a dual-stream flowchart illustrating a method used to request a global conduct score, such as global conduct score, and to provide this global conduct score to the party requesting the global conduct score (e.g., a member), according to an example embodiment.

FIG. 8 is a dual-stream flowchart illustrating an example method 800 used to request a global conduct score, and to provide this global conduct score 703 to the party requesting the global conduct score 703 (e.g., the member 701). Illustrated are two streams, wherein a first stream illustrates various operations that may reside as a part of, for example, the scoring server 110. The second stream illustrates various operations that may reside as a part of the computer system utilized by the member 701. In one case, an operation 801, residing as a part of the member 701, generates anchor data. This anchor data may be anchor data that is unique to, for example, the person 103 and uniquely identify them. As previously illustrated, the anchor data may be a social security number, a tax identification number, some type of two or three factor identification, or some other suitable way to identify the person 103. Once this operation 801 is executed, an operation 802 is executed that transmits the anchor data as, for example, a global conduct global conduct score and/or attribute data request 704 along with anchor data across a network, such a network 108 (not pictured), to be received through the execution of an operation 303 that resides on the scoring server 110. As previously illustrated a number of subsequent operations may executed all of which reside as part of the scoring server 110. These operations include, for example, the decisional operation 304 that determines whether or not the requesting party, in this case member 701, has a privilege the access the score and/or attribute data associated with the anchor data, the previously illustrated operation 306 that may retrieve the global conduct score and/or attribute data from the conduct and attribute database 111, and the previously shown operation 307. Assuming that the member 701 has the privilege to access the global conduct score associated with the person 103, this global conduct score, now a global conduct score 703, is transmitted back across a network, such as network 108 (not shown), to be received through the execution of operation 803.

Once the global conduct score 703 is received, an operation 805 is executed that may retrieve a global conduct score model. In certain example cases this global conduct score model may be retrieved from, for example, a database 804 and may be a range of acceptable values. This range of acceptable values may then be used such that if the provided global conduct score 703 falls within this range, then the member 701 may be free to engage in the transaction 702 with the person 103. Additionally, once this global conduct score model is retrieved through the execution of the operation 805 from the database 804, a decisional operation 806 is executed. Decisional operation 806 makes a determination of whether or not the provided global conduct score 703 is within a range of acceptable values. In example cases where a decisional operation 806 evaluates to "true," then an operation 808 is executed that instructs the member 701 to engage in the transaction 702 with the person 103. Through the execution of the operation 808, the person 103 may be entitled to receive better terms for a particular transaction, such as the transaction 702. A better term is a term that is more economically advantageous as compared to another term. These better terms may include, for example, better pricing, better payment terms, and a greater breadth of payment options that are based, in large part, upon the global conduct score 703 falling within a range of acceptable values as defined by the global conduct score model. In example cases where a decisional operation 806 evaluates to "false," that is the global conduct score 703 is not within the acceptable range as defined by the global conduct score model, a further operation 807 is executed. When executed, the operation 807 advises the member 701 not to engage in the transaction 702 with the person 103. In certain example cases, the member 701 may be advised not to engage in the transaction, whereas in other example cases, the member 701 may be advised to engage in the transaction 702, but using terms that are disadvantageous to the person 103. These terms may include, for example, worse pricing, worse payment options and basically terms that are worse relative to the terms that the person 103 would have otherwise been entitled to had the global conduct score 703 fallen within the range of acceptable values as defined by the global conduct score model.

In some example embodiments, the various illustrated operations 801 through 808, and the database 804 may all resided as a part of a computer system operated by the member 701. In certain example cases, these various operations (e.g., 801 through 808, and database 804) may reside as a part of the scoring server 110. In example cases where these various operations (e.g., operation 801 through 808, and database 804) reside as a part of the scoring server 110, the scoring server 110 will, in effect, provide analyses for the member 701 as to whether or not they should engage in the transaction 702 with the person 103.

In some example embodiments, decisional operation 806, and operations 807 and 808 reflect the concept of risk based pricing and terms. Risk may be a chance of financial loss based upon a global conduct score(s), and/or attribute data. Part of this concept, is the notion that the higher the risk the higher the price, and the worse the terms for the person such as person 103. Conversely, the lower the risk the lower the price, ands the better the terms for the person such as person 103. Some example embodiments may include, the analyzing of the level of risk for a particular transaction (e.g., transaction 702) based upon a global conduct score 703 such that the better or worse the global conduct score, the better or worse the terms. As stated elsewhere, these terms may be better pricing, better payment terms, and a greater breadth of payment options as compared to other terms. As applied in the present case of operations 807 and 808, the concept of risk based pricing and terms provides a basis for operation 807 to advise the member 701 to not engage in the transaction 702, when this operation 807 is executed. Alternatively, operation 807 may advise the member 701 to engage in the transaction

702 under terms that are worse for the person 103 as compared to other possible terms. Further, using risk based pricing and terms, operation 808, when executed, may advise the member 701 to engage in the transaction 702, and under terms that are more advantageous to the person 103.

FIG. 9 is a flow chart illustrating an example method 900 used to retrieve a global conduct score to determine what terms should be granted in a transaction. The operations shown below may reside as part of the scoring server 110, the computer system 201, or as one of the computer systems associated with the member of the network 104-107. Shown is an operation 901 that when executed retrieves a global conduct score model that defines a range of values based upon which a better term is granted in a transaction than would otherwise be granted in the transaction. An operation 902 is illustrated that when executed compares the global conduct score model and a global conduct score. An operation 903 is shown, that when executed, grants the better term where the global conduct score falls within the range of values. In some example embodiments, the global conduct score is computed using an approach including at least one of a feed score approach, and a composite score approach. Some example embodiments may include the transaction including a transaction using a network. In some example cases, the better term are more economically advantageous to a party to the transaction, as compared to another possible term. An operation 904 is shown that grants a worse term that is less economically advantageous to a party to the transaction than would otherwise be granted, where the global conduct score exceeds the range of values.

FIG. 10 is a block diagram of a computer system 1000, and some of the functionality associated therewith. The blocks may be implemented as hardware, firmware, or even software. These blocks may reside as part of the scoring server 110, the computer system 201, or as one of the computer systems associated with the member of the network 104-107. Illustrated is a retriever 1001 to retrieve a global conduct score model that defines a range of values based upon which a better term is granted in a transaction than would otherwise be granted in the transaction. A comparison engine 1002 is shown to compare the global conduct score model and a global conduct score. A first granting engine 1003 is also shown that grants the better term where the global conduct score falls within the range of values. In some example embodiments, the global conduct score is computed using an approach including at least one of a feed score approach, and a composite score approach. In some example cases, the transaction includes a transaction using a network. Some example embodiments, the better term is more economically advantageous to a party to the transaction, as compared to another possible term. Shown is a second granting engine 1004 that grants a worse term that is less economically advantageous to a party to the transaction than would otherwise be granted, where the global conduct score exceeds the range of values.

Example Use of Global Conduct Score and Attribute Data

Figure 11:
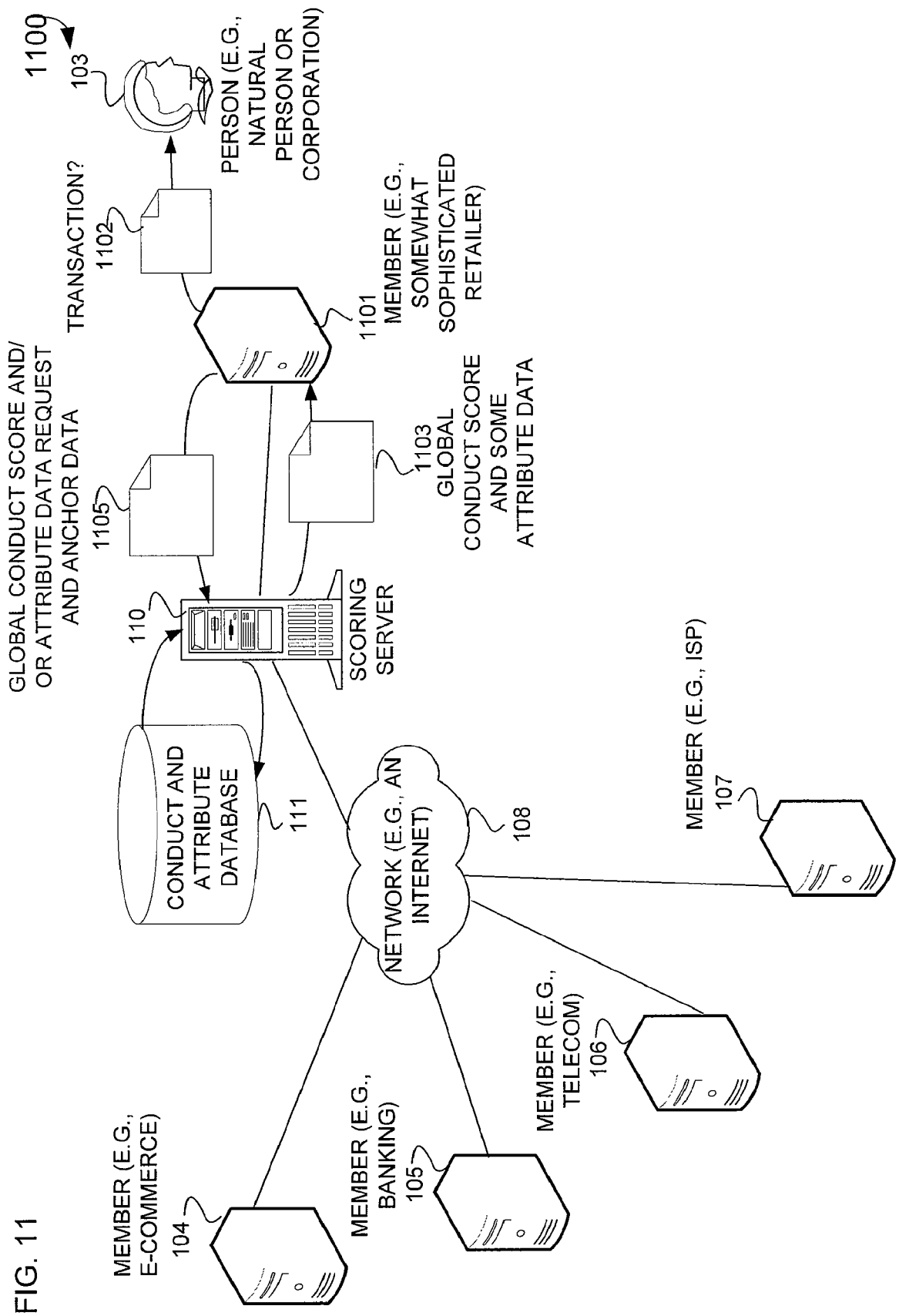
FIG. 11 is a diagram of a system illustrating the providing of both a global conduct score and some attribute data to a member, according to an example embodiment.

FIG. 11 is a diagram of an example system 1100 illustrating the providing of both a global conduct score and some attribute data to a member, such as member 1101. This member 1101 may be part of the previously referenced federation of participants that includes the members 104-107. Illustrated is the member 1101 who, in some example cases, may be a partially sophisticated retailer who seeks to engage in a transaction 1102 with the person 103. Partially sophisticated may mean that they have the facilities and support staff to conduct some level of analysis of attribute data. In some example cases, as a prelude to engaging in a transaction 1102 with the person 103, the member 1101 may generate a global conduct score and/or attribute data request 1105 and provide this global conduct score and/or attribute data request 1105 to the scoring server 110 along with anchor data. This anchor data may uniquely identify the person 103. Assuming the member 1101 has the privilege to access this global conduct score and/or attribute data, the scoring server 110 may proceed to retrieve the global conduct score and/or attribute data corresponding to the anchor data from the conduct and attribute database 111. The global conduct score and/or attribute data may be retrieved in response to a global conduct score and/or attribute data request 1105 that contains the anchor data. This global conduct score and/or attribute data request 1105 may be transmitted across a network such as network 108 (not pictured), wherein the scoring server 110 and the member 1101, computer system operated by member 1101 are operatively coupled via this network 108.

Once the scoring server 110 retrieves the global conduct score and/or attribute data from the conduct and attribute database 111, the scoring server 110 transmits a global conduct score and attribute data 1103 back across a network, such as network 108 (not pictured), to be then received by the member 1101. In certain example cases, only some of the available attribute data that the scoring server 110 has access to, is provided to the member 1101 whereas, in other example cases, all of the available attribute data is provided to the member 1101. Once the member 1101 receives the global conduct score and attribute data 1103 from the scoring server 110, the member 1101 is free to make a determination as to whether or not to engage in the transaction 1102 with the person 103. In certain example cases, the scoring server 110 that may make this determination.

Figure 12:
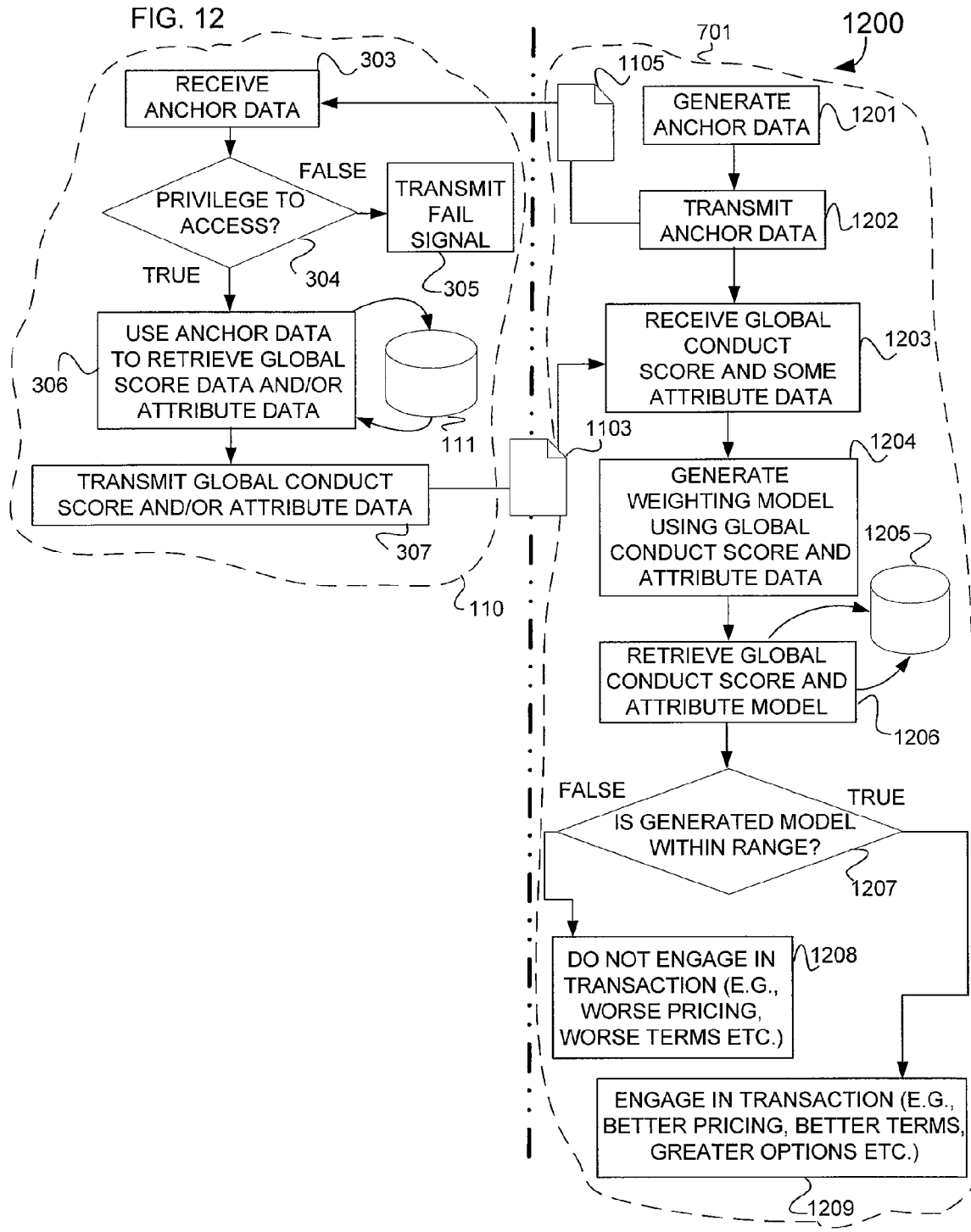
FIG. 12 is a dual-stream flowchart illustrating a method used to make a determination as to whether or not, a member should engage in a transaction with a person, according to an example embodiment.

FIG. 12 is a dual-stream flowchart illustrating an example method 1200 used to make a determination as to whether or not, for example, the member 1101 should engage in a transaction 1102 with, for example, the person 103. Shown is an operation 1201 that when executed generates anchor data. This anchor data is anchor data that may be used to uniquely identify a person such as person 103. Once operation 1201 is executed, and operation 1202 is executed that transmits this anchor data along with the global conduct score and/or attribute data request 1105 across a network, such as network 108, to be received through the execution of an operation 303. As previously illustrated, various decisional operations and databases may be executed to determine whether or not the member 1101 has the privilege to access the requested global conduct score and/or attribute data (see e.g., operations 303 through 307, and conduct and attribute database 111). Assuming that member 1101 has the privilege to access the global conduct score and/or attribute data associated with the provided anchor data, then the global conduct score and/or attribute data 1103 may be transmitted back across a network such as network 108 to be received through the execution of an operation 1203.

Once the global conduct score and/or attribute data 1103 is received, an operation 1204 may be executed that generates a weighting model using both the global conduct score and attribute data. The weighting model is a numeric score generated through assigning a weighted numeric value to the global conduct score, and a weighted numeric value to the attribute data, and then combining these weighted values. Combining may be by way of finding the product, sum, or by performing some other mathematical operation or series of operations on the weighted values. Further, combining may be by way of using a function of implementing one or more mathematical property to generate a result in the form of output from that function. An operation 1206 is executed that retrieves a global conduct score and/or attribute model from, for example, a database 1205. In certain example cases, as will be more fully illustrated below, a particular weighting value will be assigned to the global conduct score whereas a further weighting value may be assigned to one or more portions of the provided attribute data relating to the person such as persons 103. The combination of these weighted values may then be combined together to form the previously alluded to weighting model. The global conduct score and attribute model, on the other hand, may provide a model to evaluate the weighting model and, in effect, may provide a range of values that the weighting model must fall within so as to facilitate the completion of the transaction 1102. The values defining this range of values may be numeric values, where the values are weighing values. Once the weighting model and the global conduct score and attribute model are generated, a decisional operation 1207 is executed that determines whether or not the weighting model is within a range of acceptable values as defined by the global conduct score and attribute model. In example cases where a decisional operation 1207 evaluates to "true," a further operation 1209 is executed that instructs the member 701 to engage in a transaction, such as transaction 1102. In example cases where operation 1209 is executed, the person 103 may be entitled to receive better pricing terms, or other options with regard to the transaction 1102. In example cases where a decisional operation 1207 evaluates to "false," an operation 1208 is executed that, in effect, advises the member 1101 not to engage in the transaction or, in some example cases, advises the member 1101 that they should only engage in the transaction 1102 on terms that are worse relative to the terms that would otherwise be provided through the execution of the operation 1209. The various operations 1201 through 1209 in database 1205 may reside as a part of, for example, the member 1101.

In certain example cases, these various operations 1201 through 1209 and database 1205 may reside as a part of the scoring server 110 such that the scoring server 110 will provide analyses to the member 1101. This in contrasted with the member 1101 performing the analyses themselves or itself. Further, in some example cases, the weighing of the global conduct score vis-à-vis the attribute data, or portion thereof, may be based upon the certain considerations specific too, for example, the member 1101. The member 1101 may decide that the global conduct score should be weighted more heavily than, for example, the attribute data.

In some example embodiments, decisional operation 1207, and operations 1208 and 1209 reflect the concept of risk based pricing and terms. Risk may be a chance of financial loss based upon a global conduct score(s), and/or attribute data. Part of this concept, is the notion that the higher the risk the higher the price, and the worse the terms for the person such as person 103. Conversely, the lower the risk the lower the price, ands the better the terms for the person such as person 103. Some example embodiments may include, the analyzing of the level of risk for a particular transaction (e.g., transaction 1102) based upon a global conduct score and some attribute data 1103 such that the better or worse the global conduct score and some attribute data, the better or worse the terms. As stated elsewhere, these terms may be better pricing, better payment terms, and a greater breadth of payment options as compared to other terms. As applied in the present case of operations 1208 and 1209, the concept of risk based pricing and terms provides a basis for operation 1208 to advise the member 1101 to not engage in the transaction 1102, when this operation 1208 is executed. Alternatively, operation 1208 may advise the member 1101 to engage in the transaction 1102 under terms that are worse for the person 103 as compared to other possible terms. Further, using risk based pricing and terms, operation 1209, when executed, may advise the member 1101 to engage in the transaction 1102, and under terms that are more advantageous to the person 103.

Figure 13:
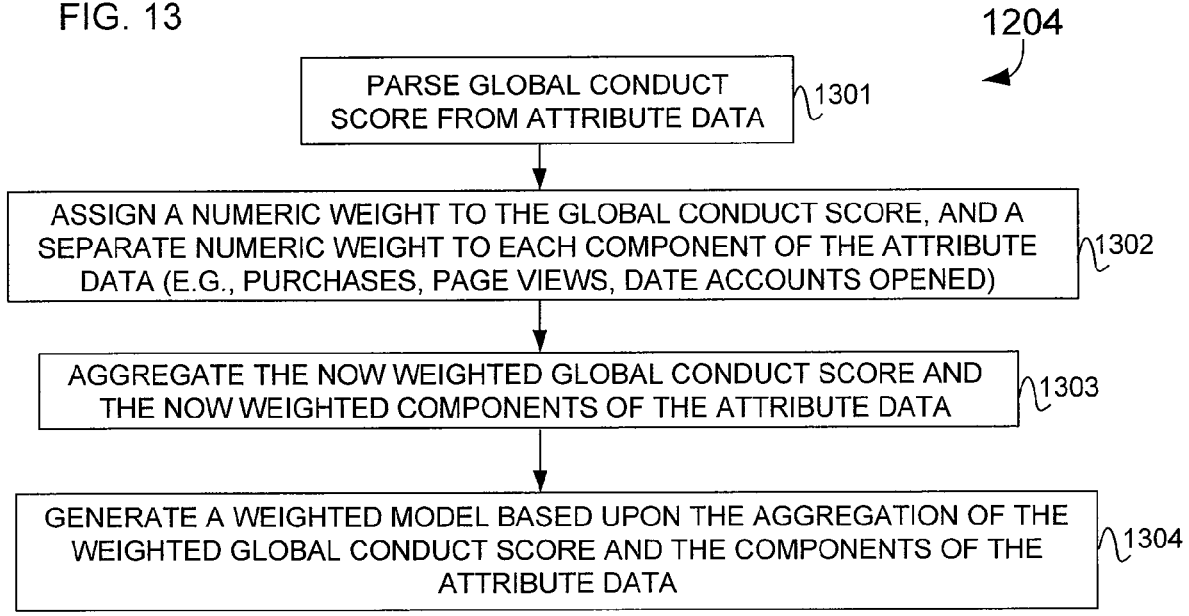
FIG. 13 is a flowchart illustrating a method used to execute operation that generates a weighting model using both the global conduct score and attribute data, according to an example embodiment.

FIG. 13 is a flowchart illustrating an example method used to execute operation 1204. Illustrated is an operation 1301 that parses a global conduct score from attribute data. This parsing may occur in those example cases where the global conduct score and attribute data are provided together as, for example, a global conduct score and attribute data 1103. An operation 1302 is executed that assigns a numeric weight to the global conduct score, and a separate numeric weight to each component of the attribute data. These components may be, for example, components provided by, for example, the members 104, 105, 106 or 107 and may include purchases, page views (e.g., webpage views), dates that accounts are opened (e.g., e-commerce account), or other information that the various members 104, 105, 106 and/or 107 may be uniquely positioned to provide. An operation 1303 is executed that aggregates the now weighted global conduct score, and components of attribute data into a single weighting model. Further, an operation 1304 is executed that generates the weighting model based upon the aggregation of the weighted global conduct score and components of the attribute data. Again, as previous alluded to, these various operations (e.g., 1301 through 1304) may reside as a part of a member 1101, wherein this member 1101 is a computer system. Additionally, these various operations (e.g., 1301 through 1304) may reside as, for example, a part of the scoring server 110.

Figure 14:
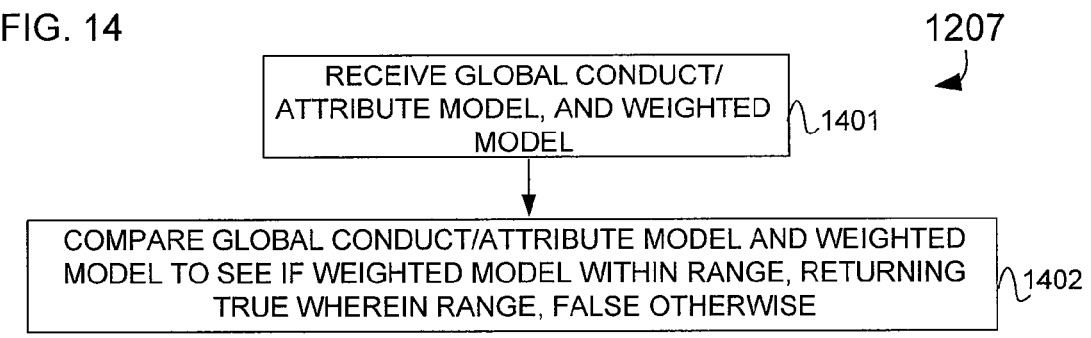
FIG. 14 is a flowchart illustrating a method that determines whether or not the weighting model is within a range of acceptable values as defined by the global conduct score and attribute model, according to an example embodiment.

FIG. 14 is a flowchart illustrating an example method 1207. Shown is an operation 1401 that receives a global conduct/attribute model or more precisely a global conduct score and attribute model, and the previously shown weighting model. Next, an operation 1402 is executed that compares the weighting model to the global conduct score and attribute model and determines whether or not the weighting model falls within some predefined range contained or otherwise defined by the global conduct score and attribute model. In example cases where the weighting model does fall within range, then a "true" value may be returned, whereas in example cases where the weighing model does not fall within range, a "false" value may be returned. These various operations (e.g., 1401 and 1402) may reside as a part of the member 1101, and computer system associated therewith, or may reside as a part of, for example, the scoring server 110.

Figure 15:
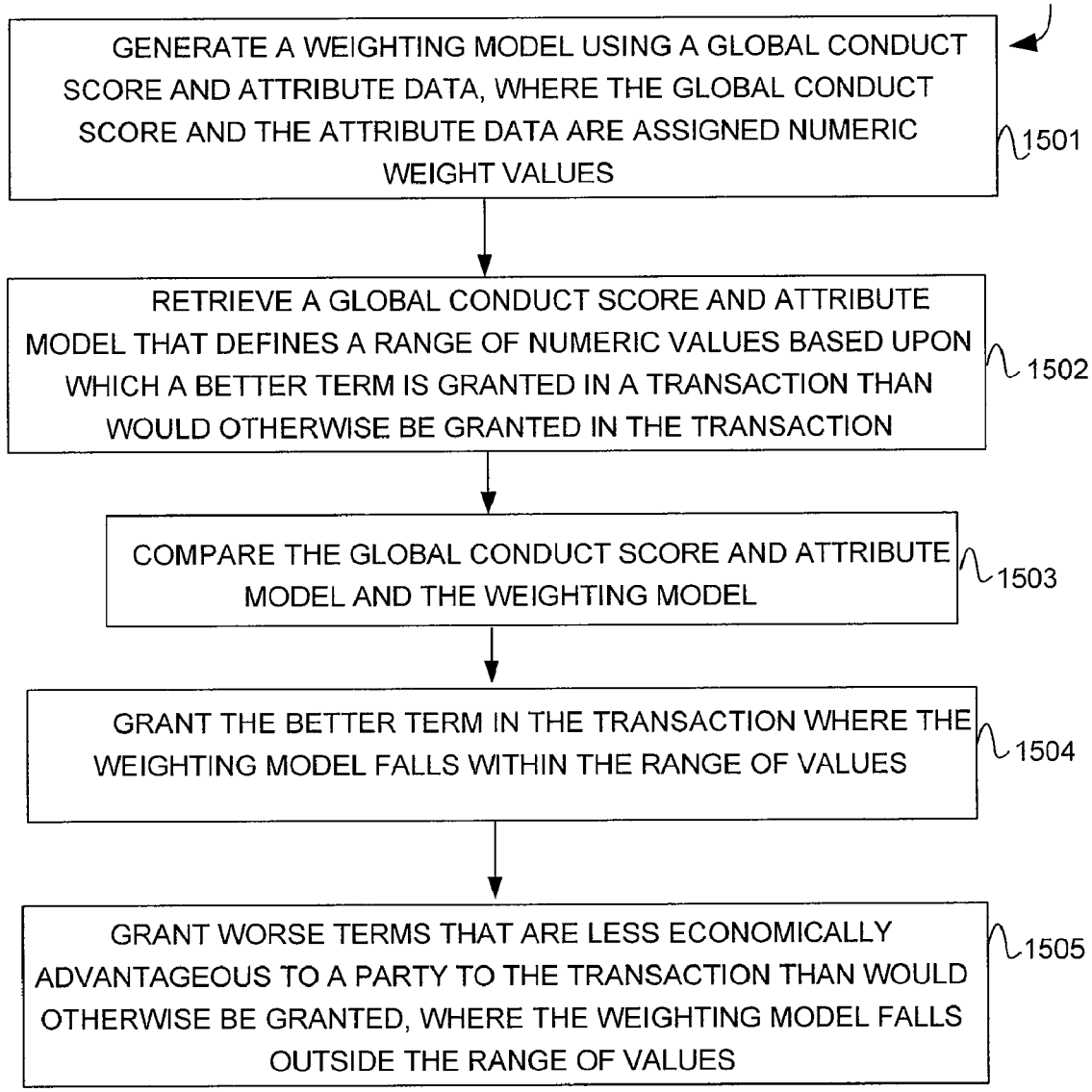
FIG. 15 is a flow chart illustrating a method to determine whether better transaction terms should be granted using both a global conduct score and attribute data, according to an example embodiment.

FIG. 15 is a flow chart illustrating a method 1500 to determine whether better transaction terms should be granted using both a global conduct score and attribute data. The operations shown below may reside as part of the scoring server 110, the computer system 201, or as one of the computer systems associated with the member of the network 104-107. Shown is an operation 1501 that when executed generates a weighting model using a global conduct score and attribute data, where the global conduct score and the attribute data are assigned numeric weight values. An operation 1502 is also shown that, when executed, retrieves a global conduct score and attribute model that defines a range of numeric values based upon which a better term is granted in a transaction than would otherwise be granted in the transaction. Further, an operation 1503 is shown that when executed compares the global conduct score and attribute model and the weighting model. Operation 1504, when executed, grants the better term in the transaction where the weighting model falls within the range of values. In some example embodiments, the global conduct score is computed using an approach including at least one of a feed score approach, and a composite score approach. Some example embodiments may include the attribute data including page view data, click through data, account usage data, and good purchased data. In some example cases, the better terms are more economically advantageous to a party to the transaction, as compared to another possible term. Operation 1504, when executed, grants worse terms that are less economically advantageous to a party to the transaction than would otherwise be granted, where the weighting model falls outside the range of values. In some example embodiments, the transaction includes a transaction using a network.

Figure 16:
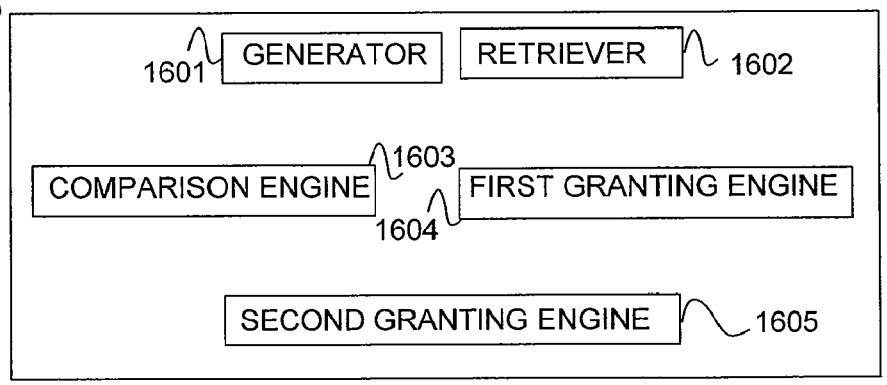
FIG. 16 is a block diagram of a computer system to determine whether better transaction terms should be granted using both a global conduct score and attribute data, according to an example embodiment.

FIG. 16 is a block diagram of a computer system 1600, and some of the functionality associated therewith. The blocks may be implemented as hardware, firmware, or even software. These blocks may reside as part of the scoring server 110, the computer system 201, or as one of the computer systems associated with the member of the network 104-107. In some example embodiments, a generator 1601 is shown that generates a weighting model using a global conduct score and attribute data, where the global conduct score and the attribute data are assigned numeric weight values. A retriever 1602 is shown that retrieves a global conduct score and attribute model that defines a range of numeric values based upon which a better term is granted in a transaction than would otherwise be granted in the transaction. A comparison engine 1603 is shown that compares the global conduct score and attribute model and the weighting model. Also, a first granting engine 1604 is shown that grants the better term in the transaction where the weighting model falls within the range of values. In some example cases, the global conduct score is computed using an approach including at least one of a feed score approach, and a composite score approach. Some example embodiments may include attribute data that includes page view data, click through data, account usage data, and good purchased data. In some example embodiments, the better term is more economically advantageous to a party to the transaction, as compared to another possible term. A second granting engine 1605 may be shown that grants worse terms that are less economically advantageous to a party to the transaction than would otherwise be granted, where the weighting model falls outside the range of values. In some example embodiments, the transaction includes a transaction using a network.

Example Use of Attribute Data

Figure 17:
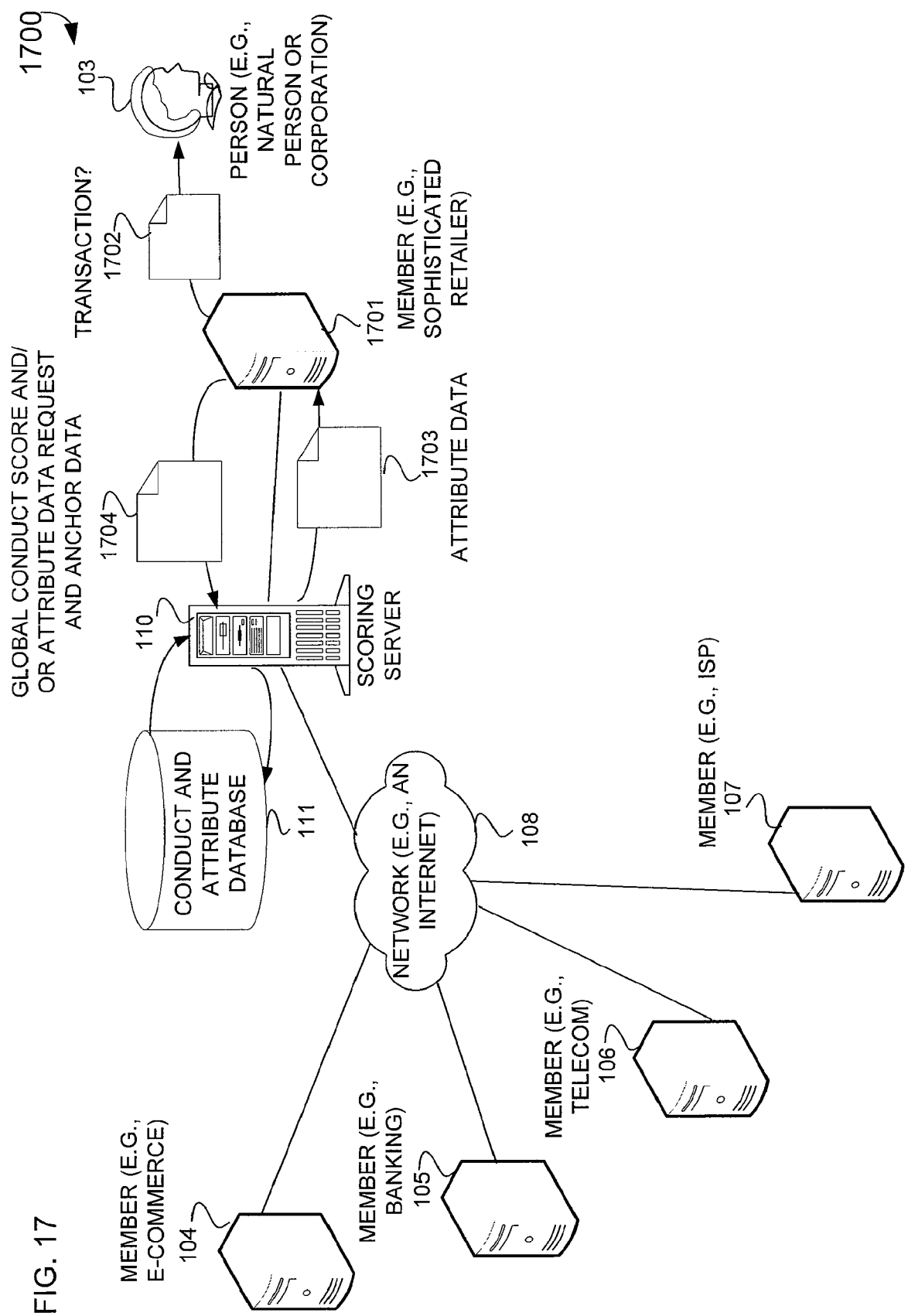
FIG. 17 is a diagram of a system illustrating a request for attribute data and the providing of this attribute data to a member where this member may be a sophisticated retailer, according to an example embodiment.

FIG. 17 is a diagram of an example system 1700 illustrating a request for attribute data and the providing of this attribute data to a member where this member may be, for example, a sophisticated retailer. Sophisticated may mean that they have the facilities and support staff to conduct a high degree of analysis of attribute data. Shown is a member 1701 who seeks to engage in a transaction 1702 with the person 103. This member 1701 may be part of the previously referenced federation of participants that includes the members 104-107. As a prelude to engaging in this transaction 1702, the member 1701 may generate a global conduct score and/or attribute data request 1704 along with anchor data, and transmit this global conduct score and/or attribute data request and anchor data across a network, such as network 108 (not shown), to be received by the scoring server 110. Once this global conduct score and/or attribute data request 1704, and accompanying anchor data, is received by the scoring server 110, the scoring server 110 makes a determination as to whether or not the member 1701 has the privileges to access the global conduct score and/or attribute data. In example cases where the member 1701 does have the privilege, the scoring server 110 may access a conduct and attribute database 111 to retrieve the corresponding attribute data and transmit the attribute data as attribute data 1703 back across a network, such as network 108 (not pictured), to be received by the member 1701. The attribute data 1703 may be transmitted as one or more data packets. The member 1701 may then analyze the attribute data and make a determination as to whether or not they should engage in a transaction 1702 with the person 103. As will be more fully discussed below, the determination as to whether or not the member 1701 should engage in transaction 1702 with the person 103 may be based upon logic residing as a part of the member 1701, and a computer system associated therewith, or may be based upon logic residing as a part of the scoring server 110.

Figure 18:
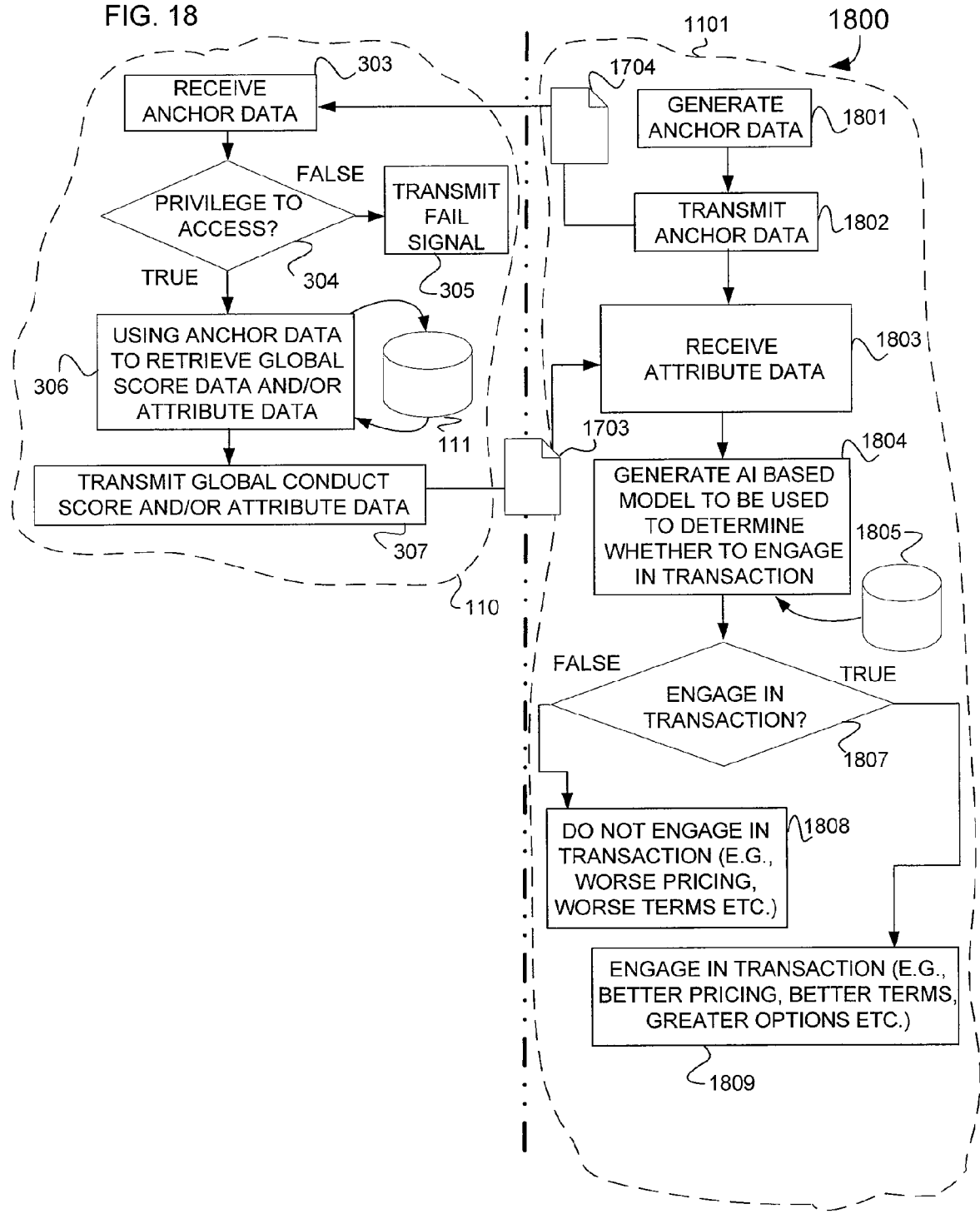
FIG. 18 is a dual-stream flowchart illustrating a method used to determine whether or not a member should engage in a transaction with a particular person, according to an example embodiment.

FIG. 18 is a dual-stream flowchart illustrating an example method 1800 used to determine whether or not the member 1701 should engage in a transaction with a particular person such as the person 103. Shown is an operation 1801 that generates anchor data, where this anchor data uniquely identifies a person such as person 103. Once this anchor data is generated, an operation 1802 is executed that transmits the anchor data along with a global conduct score and/or attribute data request 1704 across a network, such as network 108, to be received through the execution of an operation 303. In certain example cases, the previously illustrated operations 303 through 307 are utilized to determine whether or not, for example, the member 1701 has a privilege to access the requested global conduct score and/or attribute data. In example cases where they do have the privilege to access such data, then attribute data 1703 is transmitted back across a network, such as network 108, to be received through the execution of an operation 1803.

Once operation 1803 is executed, a further operation 1804 is executed that may, in some example cases, generate an AI based model to be used to determine whether or not to engage in the transaction 1702 with the person 103. As part of the execution of the operation 1804, a database 1805 may be accessed where this database 1805 may contain any one of a number of AI algorithms. These AI algorithms, or examples thereof, will be more fully discussed below but may include, any number of deterministic algorithms stored in the AI library 1805. Additionally, these AI algorithms may utilize Case-Based Reasoning, Bayesian networks (including Hidden Markov Models), Neural Networks, or Fuzzy Systems. The Bayesian networks may include: Machine Learning Algorithms including-Supervised Learning, Unsupervised Learning, Semi-Supervised Learning, Reinforcement Learning, Transduction, Learning to Learn Algorithms, or some other suitable Bayesian network. The Neural Networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network (ASNN), Holographic Associative Memory, Instantaneously Trained Networks, Spiking Neural Networks, Dynamic Neural Networks, Cascading Neural Networks, Neuro-Fuzzy Networks, or some other suitable Neural Network.

In some example embodiments, some type of advanced statistical method or algorithm may be employed to determine whether or not to engage in the transaction 1702 with the person 103. These methods may include the use of Statistical Clusters, K-Means, Random Forests, Markov Processes, or some other suitable statistical method, or algorithm. One or more of these advanced statistical methods may be used to create the AI based model.

Once operation 1804 is executed and an AI based model is generated, then a decisional operation 1807 is executed to determine whether or not to engage in the transaction, such as transaction 1702, with the person 103. This decisional operation 1807, and the logic contained therein, may include parsing attribute data, and then passing this parsed attribute data through some type of AI based data structure, such as a Decision Tree. Once this attribute data is passed through the Decision Tree, the resulting output may then be analyzed in terms of whether or not the attribute data provides a basis for instructing the member 1701 to engage in, for example, the transaction 1702. In example cases where a decisional operation 1807 evaluates to "true," a further operation 1809 is executed that instructs the member 1701 to engage in the transaction and to provided the person 103 with better pricing options, better term options and other types of options that are advantageous to the person 103. In example cases where a decisional operation 1807 evaluates to "false," a farther operation 1808 is executed that instructs the member 1701 not to engage in the transaction 1702 with the person 103. In some example embodiments, through the execution of operation 1808, the member 1701 is instructed to provide disadvantageous or worse terms and conditions to the person 103 when engaging in a transaction 1702 with the person 103. Worse terms are terms that are economically disadvantageous as compared to other terms. For example, high interest rates paid for transactions, forfeiture for the failure to make a payment, restrictive payment instrument options may be examples of worse terms. The various operations 1801 through 1809 and the database 1805 may reside as a part of, for example, the member 1701 and computer system associated therewith, or may reside as a part of the scoring server 110. In example cases where these various operations (e.g., operation 1801 through 1809, and database 205) reside as a part of the scoring server 110, this scoring server 110 may perform the various analyses illustrated through the execution of these operations and provide the outcome of the execution of these various operations to the member 1701.

In some example embodiments, decisional operation 1807, and operations 1808 and 1809 reflect the concept of risk based pricing and terms. Risk may be a chance of financial loss based upon a global conduct score(s), and/or attribute data. Part of this concept, is the notion that the higher the risk the higher the price, and the worse the terms for the person such as person 103. Conversely, the lower the risk the lower the price, ands the better the terms for the person such as person 103. Some example embodiments may include, analyzing of the level of risk for a particular transaction (e.g., transaction 1702) based upon attribute data 1703 such that the better or worse the global conduct score and some attribute data, the better or worse the terms. As stated elsewhere, these terms may be better pricing, better payment terms, and a greater breadth of payment options as compared to other terms. As applied in the present case of operations 1808 and 1809, the concept of risk based pricing and terms provides a basis for operation 1808 to advise the member 1701 to not engage in the transaction 1702, when this operation 1807 is executed. Alternatively, operation 1809 may advise the member 1701 to engage in the transaction 1702 under terms that are better for the person 103 as compared to other possible terms. In some example embodiments, operation 1808 may only advise the member 1701 to engage in the transaction 1702 under worse terms for the person 103. Additionally, in some example embodiments, the operation 1809 may advise the member 1701 to engage in the transaction under better terms.

Figure 19:
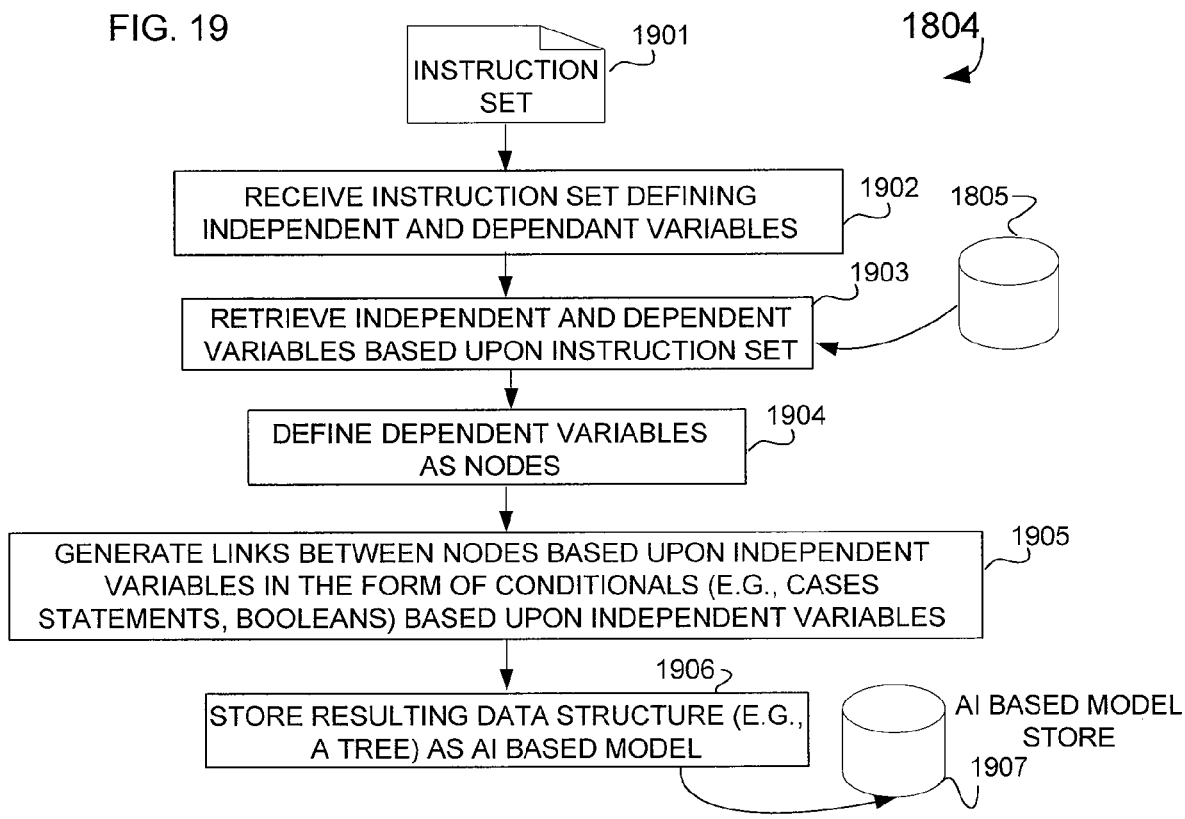
FIG. 19 is a flowchart illustrating a method to generate an Artificial Intelligence (AI) based model to be used to determine whether or not to engage in the transaction with a person, according to an example embodiment.

FIG. 19 is a flowchart illustrating an example method 1804. Shown is an instruction set 1901 that may, in some example cases, instruct the member 1701 as to which types of variables the member 1701 should consider in the classification of these variables. This instruction set 1901 may be processed through the execution of an operation 1902, where this operation 1902 not only receives the instruction set 1901, but parses this instruction set 1901. Once parsed, an operation at 1903 is executed that retrieves independent and dependent variables based upon the instructions at 1901 from, for example, a database 1805. An operation 1904 is executed that defines dependent variables as, for example, nodes. An operation 1905 is executed that generates links between these nodes based upon, for example, independent variables in the form of conditionals, which may be, for example, case statements, booleans, or other suitable conditional based statements. Further, these conditionals may be based upon the previously alluded to independent variables. An operation 1906 is executed which stores the resulting data structure, for example, a tree as an AI based model into, for example, an AI based model store 1907. In certain example cases, as will be more fully illustrated below, the dependent variables may be variables defined by, for example, the member 1701 to assist the member 1701 in determining whether or not to engage in a transaction 1702. These dependent variables may also be defined by members of the federation of participants (e.g., members 104-107). In contrast, the independent variables may be, for example, variables that are based upon, or in some way, otherwise relate to the attribute data 1703 that is provided to the member 1701 regarding, for example, the person 103. These dependent and independent variables and examples thereof will be provided below.

Figure 20:
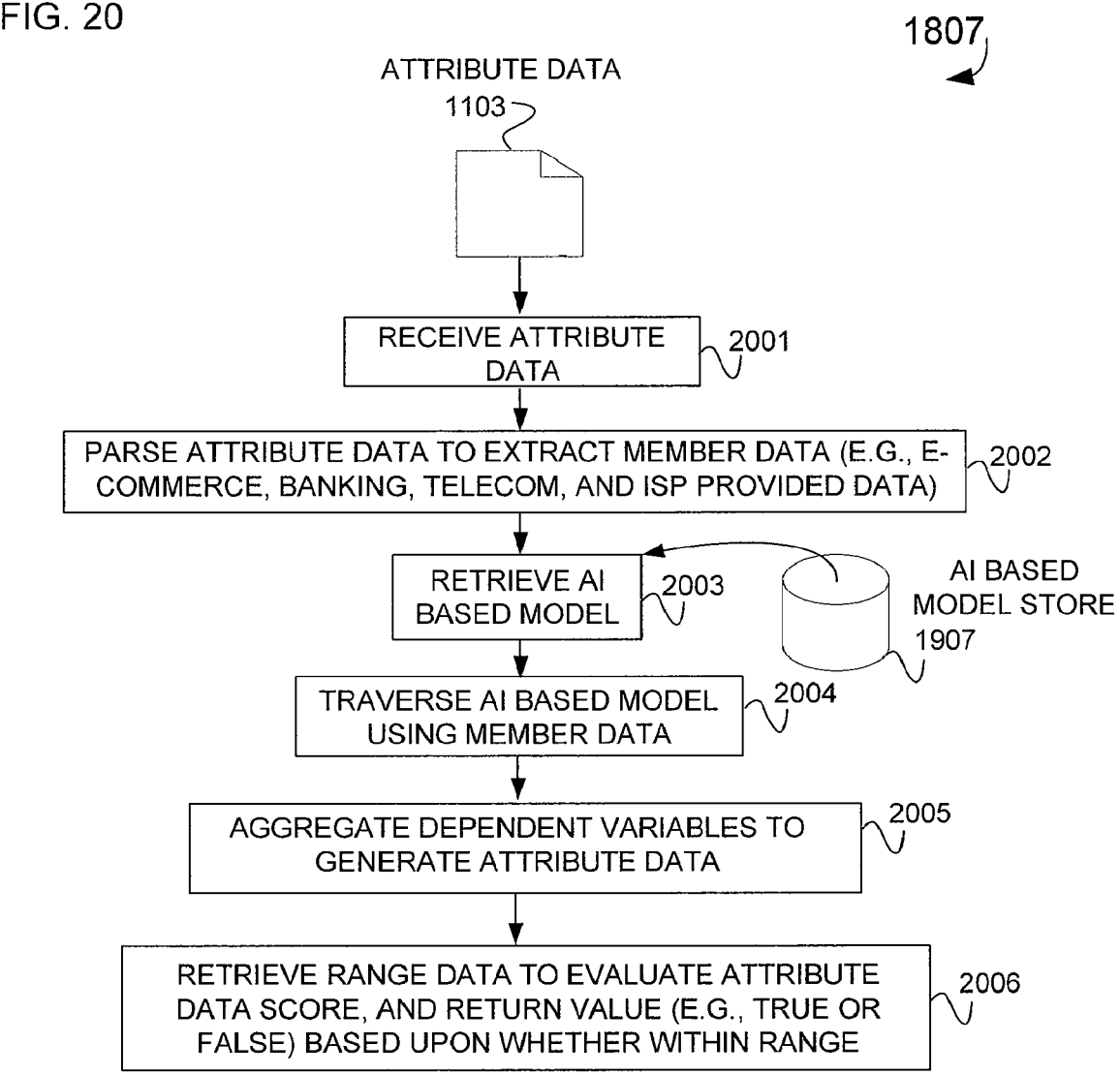
FIG. 20 is a flowchart illustrating a method executed to determine whether one should engage in a transaction, according to an example embodiment.

FIG. 20 is a flowchart illustrating an example method 1807 executed to determine whether one should engage in a transaction or not. Shown is attribute data 1703 that is retrieved or otherwise processed through the execution of an operation 2001. An operation 2002 is executed that parses the attribute data to extract member data, wherein this member data may be, for example, data provided by one or more of the various members 104, 105, 106 and/or 107. This member data may be uniquely identified by the provided anchor data. An operation 2003 is executed that retrieves an AI based model from the previously shown AI based model store 1907. Once retrieved, an operation 2004 is executed that traverses the AI based model using the member data. An operation 2005 is executed that aggregates the dependent variables to generate a model for the member data (e.g., the attribute data) This aggregation process may include, for example, finding the average of a plurality of percentile values or performing some other mathematical analyses using the dependent variables. An operation 2006 is executed that retrieves range data to evaluate the aggregated dependent variables and once this evaluation is performed, to return a "true" or "false" value as to whether or not the aggregated dependent variables are within a particular prescribed range. In one embodiment, the aggregated dependent variables are compared to a range of prescribed values, such that where these aggregate dependent variables fall within this range, then the member 1701 will be advised to engage in the transaction 1702 with the person 103. Where they fall outside this range, the member 1701 will be advised not to engage in the transaction 1702 with the person 103 or, in the least, engage in this transaction 1002 with the person 103 under terms that are more advantageous to the member 1701 (see e.g., operations 1808 and the discussion thereof).

FIG. 21 is a diagram illustrating an AI based model 2100 which in this case is Decision Tree. Shown is a root node 2101 that illustrates the start of the Decision Tree. Connected to this root node 2101 is a child node 2102, 2103 and 2104, wherein each of these child nodes represents a dependent variable denoting the probability (e.g., as a percentage value) that a particular person, such as person 103, will pay their bills. Connecting the root node 2101, and its various children 2102 through 2104, are a number of edges such that, for example, an edge 2110 connects the child node 2102 and root node 2101, and edge 2111 connects the child node 2103 and the root node 2101, and an edge 2112 connects the child node 2104 and root node 2101. These various edges (e.g., 2110 through 2112) represent, for example, the number of e-commerce accounts that, for example, the person 103 may have or, more precisely, a range of e-commerce accounts that this person 103 may have. The edge 2110 represents the values 0-3, that the person 103 may have anywhere between zero to three e-commerce accounts. The edge 2111 represents that this person 103 may have, for example, 3-10 e-commerce accounts, while the edge 2112 represents that the person 103 may have 10+ e-commerce accounts.

Each of these various child nodes 2102 through 2104 themselves have various children. For example, the child node 2102 has child nodes 2105, 2106 and 2107, while the child node 2103 has child nodes 2105, 2106 and 2107. While these nodes are distinct within the Decision Tree, they contain the same probability values as the previously referenced child nodes 2105, 2106, and 2107. Further, these child nodes are accessed under the same conditions. Connecting the nodes 2105 through 2107 to their respective parents (e.g., child node 2102, 2103 and 2104) are a number of edges, where these edges represents, for example, the length of time (e.g., in months) that a person, such as person 103, has had bank account. For example, the edge 2113 that connects the child node 2102 and its child 2105 has a range of 0-4 months. Further, an edge 2114 connects the child node 2102 and its child 2106 and states that a person has had a bank account for 4-12 months. The edge 2115 that connects the child node 2102 to its child 2107 states that a person has had a bank account for 12+ months. Each one of these edges 2113 through 2115 represents an independent variable, whereas the various children of, for example, child node 2102 represent various dependent variables relating to the probability that a person, such as person 103, may pay on a particular account such as, for example, in this case a bank account. In some example embodiments, some other type of suitable account may be used such as, for example, a credit card account, mortgage account or some other suitable account.

Connected to each of the nodes 2105 through 2107 are a variety of additional child nodes. These child nodes include a child node 2108 and 2109 wherein each of the nodes 2105 through 2107 each has two child nodes (e.g., 2108 and 2109). For example, connecting the node 2105 to the node 2108 is an edge 2116 representing a delinquency period (e.g., a probability that they will pay their bills) of 2+ months for a particular person such as person 103. Also, the node 2109 is connected to the node 2105 via an edge 2117 denoting that a person, such as person 103, has had a delinquency in their phone bills of 1-2 months. These edges 2116 and 2117 represent independent variables that may be used to determine whether the probability that a person, such as person 103, may pay their bills.

Using this AI based model 2100, the attribute data, such as attribute data 1703, may be processed and, in effect, an attribute data score may be generated through, for example, using the previously illustrated operation 2005. This process for generating the attribute data score may take the form of, for example, traversing this AI based model or, in this case, finding a path through this Decision Tree where at the end of the traversal a leaf node is reached. Once a path is discovered, and through the aggregation of the various dependent variables (e.g., node 2101, 2102, 2105 and 2108) along this path, a resulting attribute data score may be generated. This attribute data score may then be taken and compared against a range of values to see whether this attribute data score falls within a particular range. This range of values may be a range of percentile values. The decisional operation 1807 may make a determination as to whether or not to execute the operation 1808 or operation 1807, based upon where the attribute data score falls in this range of values.

In one example, attribute data, such as attribute data 1703, contains the number of e-commerce accounts that the person 103 has, the length of time they have had a particular bank account, and the delinquency period that they have had on for a particular phone bill. Specifically, this attribute data 1703 may state that the person 103 has two e-commerce accounts, that they have had a bank account for seven months, and that they have been delinquent on their phone bill for one month. Using this attribute data, decisional operation 1807 may be executed to traverse this AI based model 2100, such that starting at the root node 2101 a case statement or Boolean operation may be used to ask how many e-commerce accounts the person 103 has. In this case they have two, such that the edge 2110 may be traversed resulting in the arrival at a child node 2112 containing a 90% value. Next, a case statement or Boolean operation may be used to ask the length of time that the person 103 has had a bank account, in this case seven months; which may lead to the traversal of the edge 2114 to the node 2106 containing the value of 60%. Next, a case statement or Boolean operation may be used to determine the delinquency of the person 103 in terms of the delinquency of their phone bill, which in this case is one month; which will lead to the traversal of an edge 2150 to a node 2109 containing the dependent variable in the form of 70%. Next, these various percentile values may be averaged such that an attribute data score of 73.3% may be generated (e.g., (90%+60%+70%)/3=73.3%). This attribute data score of 73.3% may then be compared to a range of values (e.g., a range of percentile values) to determine whether or not this attribute data score falls within a recommended range of values. Some example embodiments may include using a function implementing one or more mathematical property to generate a result in the form of output from that function. This range of values will be more fully discussed below.

FIG. 22 is a diagram 2200 of a range of values where these values represent percentile values ranging from no delinquency to always delinquent, where no delinquency corresponds to 100% and always delinquent corresponds to 0%. Shown is a best terms position 2201 denoting a 95% value (not pictured), and an average terms position 2204 denoting an 85% value. Next, a worse terms position 2205 is shown denoting a 65% value. Additionally, a position 2202 is denoted lying between the best terms position 2201 and average terms position 2204. Contained between this position 2202 and the best terms position 2201 is, for example, a range wherein transactions are recommended (e.g., a recommended range 2203). In example cases where, for example, an attribute data score falls within this recommended range 2203, then, for example, the decisional operation 1807 may evaluate to "true" and the operation 1809 may be executed advising the member 1001 to provide better pricing terms and other benefits to the person 103 when engaging in the transaction 1702. In example cases where values fall outside of this recommended range 2202, then the decisional operation 1807 may evaluate to "false" resulting in the execution of the previously shown operation 1808, such that the member 1701 may be advised to provide less preferential terms to the person 103 when engaging in the transaction 1702 with the person 103. The previously computed attribute data score of 73.3% as illustrated in the example from FIG. 21 would not fall within the preferred range 2203 such that a person, such as the person 103, would not be entitled to better terms pricing etc. associated with the transaction 1702.

Figure 23:
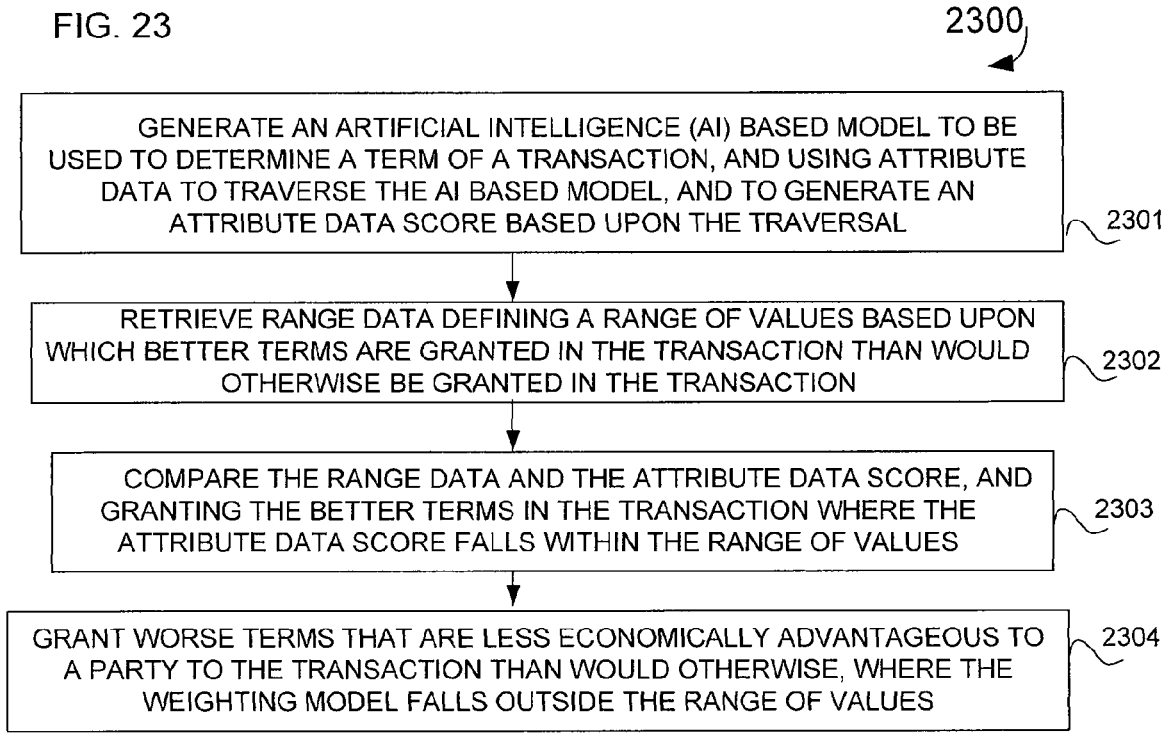
FIG. 23 is a flow chart illustrating a method to determine whether better transaction terms should be granted using both a global conduct score and attribute data, according to an example embodiment.

FIG. 23 is a flow chart illustrating a method 2300 to determine whether better transaction terms should be granted using both a global conduct score and attribute data. The operations shown below may reside as part of the scoring server 110, the computer system 201, or as one of the computer systems associated with the member of the network 104-107. Operation 2301 may be executed so as to generate an AI based model to be used to determine a term of a transaction, and using attribute data to traverse the AI based model, and to generate an attribute data score based upon the traversal. Operation 2302 may operate to retrieve range data defining a range of values based upon which better terms are granted in the transaction than would otherwise be granted in the transaction. Operation 2303 may be executed so as to compare the range data and the attribute data score, and granting the better terms in the transaction where the attribute data score falls within the range of values. In some example embodiments, the attribute data may include page view data, click through data, account usage data, and good purchased data. In some example cases, the better term is more economically advantageous to a party to the transaction, as compared to another possible term. An operation 2304 may be executed to grant a worse term that is less economically advantageous to a party to the transaction than would otherwise, where the weighting model falls outside the range of values. Some example embodiments the transaction includes a transaction using a network. The operation 2304 may also include, when executed, granting worse terms in the transaction than would otherwise be granted, where the attribute data score falls outside of the range of values. In some example embodiments, the AI based model includes at least one of a Decision Tree, and a Fuzzy Associative Matrix.

Figure 24:
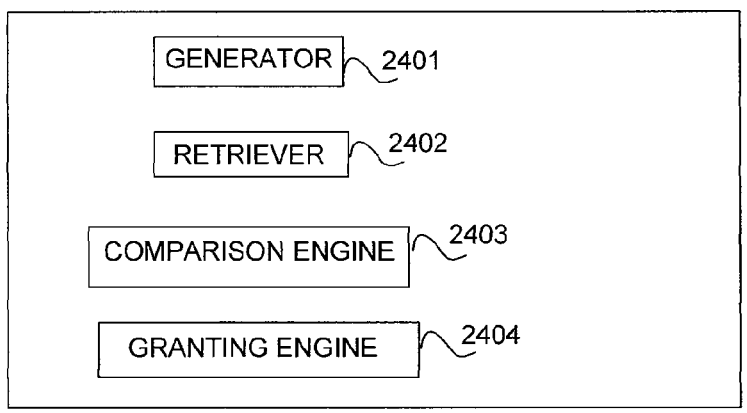
FIG. 24 is a block diagram of a computer system to determine whether better transaction terms should be granted using both a global conduct score and attribute data, according to an example embodiment.

FIG. 24 is a block diagram of a computer system 1600, and some of the functionality associated therewith. The blocks may be implemented as hardware, firmware, or even software. These blocks may reside as part of the scoring server 110, the computer system 201, or as one of the computer systems associated with the member of the network 104-107. A generator 2401 is shown that generates an AI based model to be used to determine a term of a transaction, and to use attribute data to traverse the AI based model, and to generate an attribute data score based upon the traversal. Retriever 2402 retrieves range data defining a range of values based upon which better terms are granted in the transaction than would otherwise be granted in the transaction. Comparison engine 2403 compares the range data and the attribute data score, and to grant the better terms in the transaction where the attribute data score falls within the range of values. In some example embodiments, the attribute data includes page view data, click through data, account usage data, and good purchased data. Some example embodiments may include the better terms that are more economically advantageous to a party to the transaction, as compared to another possible term. A granting engine 2404 is shown to grant worse terms that are less economically advantageous to a party to the transaction than would otherwise, where the weighting model falls outside the range of values. In some example embodiments, the transaction includes a transaction using a network. Also, in some example embodiments, the granting engine 2404 may grant a worse term in the transaction than would otherwise be granted, where the attribute data score falls outside of the range of values. Some example embodiments may include the AI based model including at least one of a Decision Tree, and a Fuzzy Associative Matrix.

Example Use of Global Conduct Score and/or Attribute Data For Predictive Value

Figure 25:
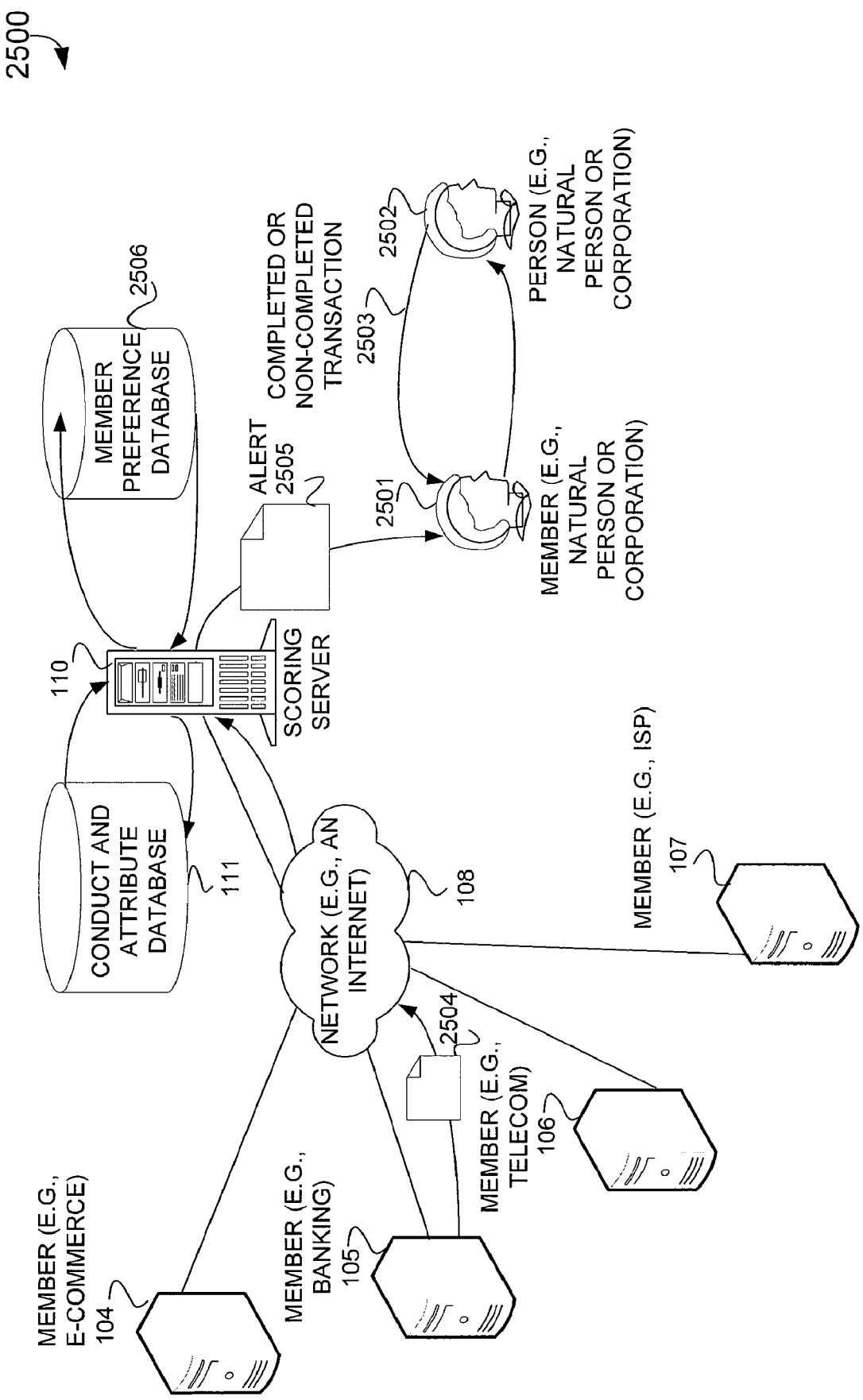
FIG. 25 is a diagram illustrating an alert system used to alert a member as to whether or not they should engage in a transaction with a particular person, according to an example embodiment.

FIG. 25 is a diagram of an example system 2500 illustrating an alert system used to alert a member as to whether or not they should engage in a transaction with a particular person. In some example embodiments, this alerting may occur prior to, or subsequent to the engaging in of a transaction between, for example, a member and a person. Shown is a member 2501 who may be a natural person, corporation, or the like and who may have access to, for example, a computer system. This member 2501 may be part of the previously referenced federation of participants that includes the members 104-107. Further, this member 2501 may have engaged in a completed, or non-completed transaction 2503 with a person 2502. Prior to, during, or shortly after engaging of this completed, or non-completed transaction 2503, an alert 2505 may be sent by, for example, a scoring server 110 to the member 2501. This alert 2505 may be based upon, for example, the receipt by the scoring server 110 of, for example, a data packet 2504, where this data packet 2504 may put the scoring server 110 on notice that, for example, the member 2501 intends to, or already has engaged in (e.g., a completed or non-completed) transaction with the person 2502. In certain example cases, this alert 2505 may be based upon a service that the member 2501 subscribes to, or otherwise has the benefit of. As a part of providing this alert 2505, the scoring server 110 may not only access the previously shown and illustrated conduct and attribute database 111, but may also access a member preference database 2506. This member preference database 2506 may define certain preferences that the member 2501 may have, or preferences that must otherwise be met prior to the member 2501 receiving, for example, an alert 2505. This alert 2505 may be in the from of an email based alert, a Short Message Service (SMS) based alert, Multimedia Messaging Service (MMS) based alert, an instant messaging based alert, a telephonic based alert (e.g., a phone call), or some other suitable technological basis for the alert. Various data, such as the previously shown data 2504, may be provided by any one of a number of members, such as member 104, 105, 106 and/or 107, to the scoring server 110 prior to sending an alert to the member 2501.

Figure 26:
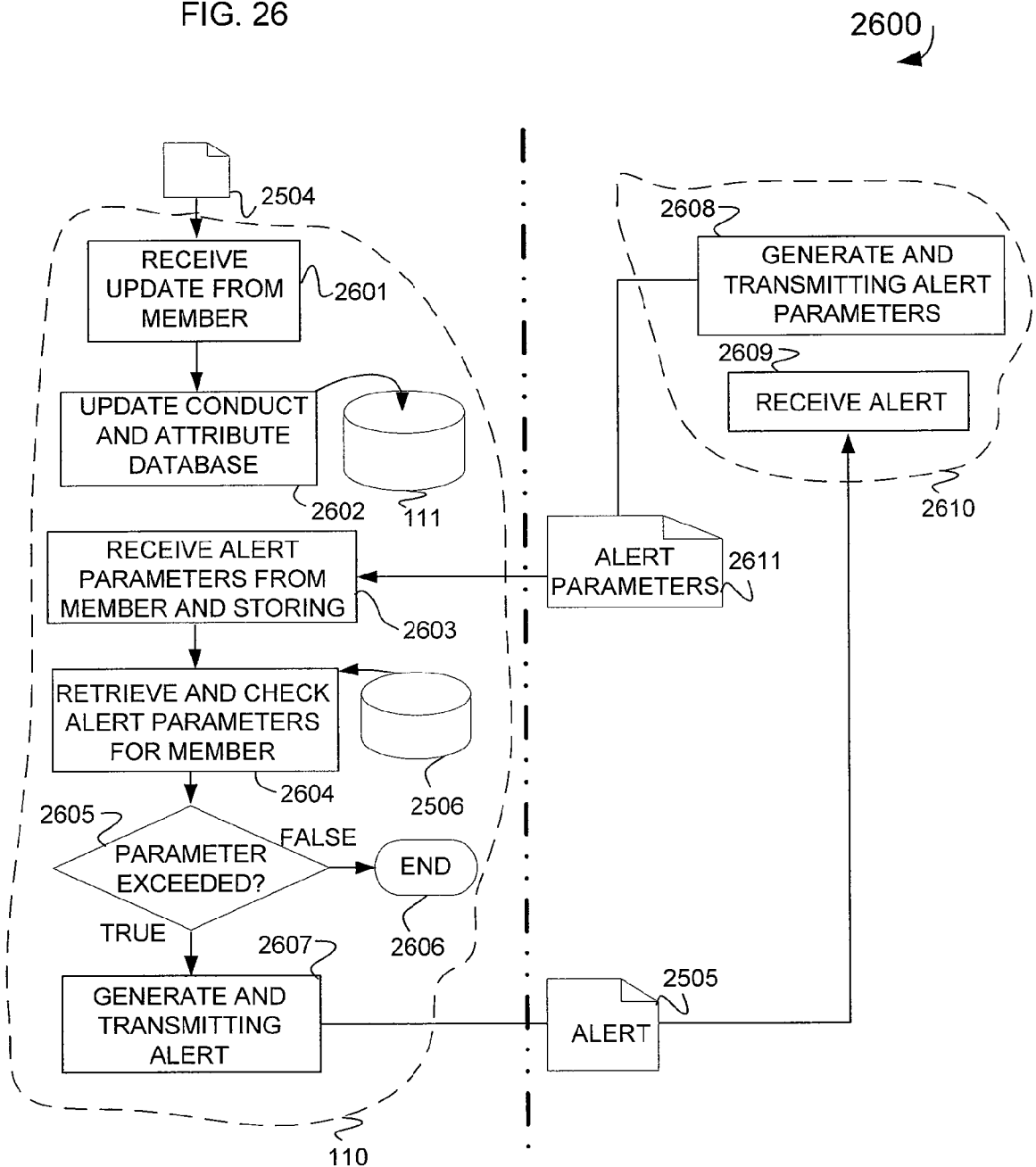
FIG. 26 is a dual-stream flowchart illustrating a method used to alert a member as to whether or not they should engage in a transaction with a particular person, according to an example embodiment.

FIG. 26 is a dual-stream flowchart illustrating an example method 2600 used to alert a member as to whether or not they should engage in a transaction with a particular person. Shown is a number of operations 2601 through 2607 and at least one conduct and attribute database 111 and 2506 that reside as part of, for example, the scoring server 110. In one embodiment, a data packet 2504 is received from a member, such as member 105 that updates the conduct and attribute database 111 that the scoring server 110 has access to. This data packet 2504 is received through the execution of an operation 2601. An operation 2602 is executed that updates the conduct and attribute database 111 with the received data packet 2504. An operation 2603 is executed that receives various alert parameters from, for example, a member, such as member 2501, wherein these alert parameters are alert parameters 2611. An alert parameter 2611 may be a set of one or more values, which when exceeded the member 2501 would like to receive an alert. These values may include, for example, a percentage value reflecting the percentage of time the person 2502 is delinquent in making payments on accounts. Further, in certain cases, for example, these values may reflect the number or persons the person 2502 is related to, through transactions, where threes persons are fraudsters.

In some example cases, these alert parameters may relate to alerting the member 2501 where an attribute data score falls outside of the previously illustrated range 2203 or where, for example, a weighted model falls outside of a range, or even where a particular global conduct score falls outside of a particular range. Next, upon the successful execution of operation 2603 wherein these alert parameters 2611 are stored into, for example, the member preference database 2506 and operation 2604 is executed. In example cases where an operation 2604 is executed, the alert parameters for particular members, such as member 2501, are checked or, more to the point, the alert parameters are defined and alert parameter 2611 are retrieved and checked against data contained in the conduct and attribute database 111. An alert parameter is a condition defined by a person, where when this condition is met they are to be alerted. This alert parameter may be a global conduct score model, a global conduct score and attribute model, and/or range data.

In some example embodiments, a decisional operation 2605 is executed that determines whether or not any one of the parameters contained in the alert parameters 1605 have been exceeded. In example cases where decisional operation 2605 evaluates to "false" a termination operation 2606 is executed. In example cases where decisional operation 2605 evaluates to "true," a further operation 2607 is executed that generates and transmits an alert such as alert 2505. This alert 2505 is then received through the execution of an operation 809 wherein this operation 809 may reside as a part of a computer system 2610 that the member 2501 may have access to. Also, residing as a part of this computer system 2610 is an operation 2608 that generates the previously illustrated alert parameters 2611.

Figure 27:
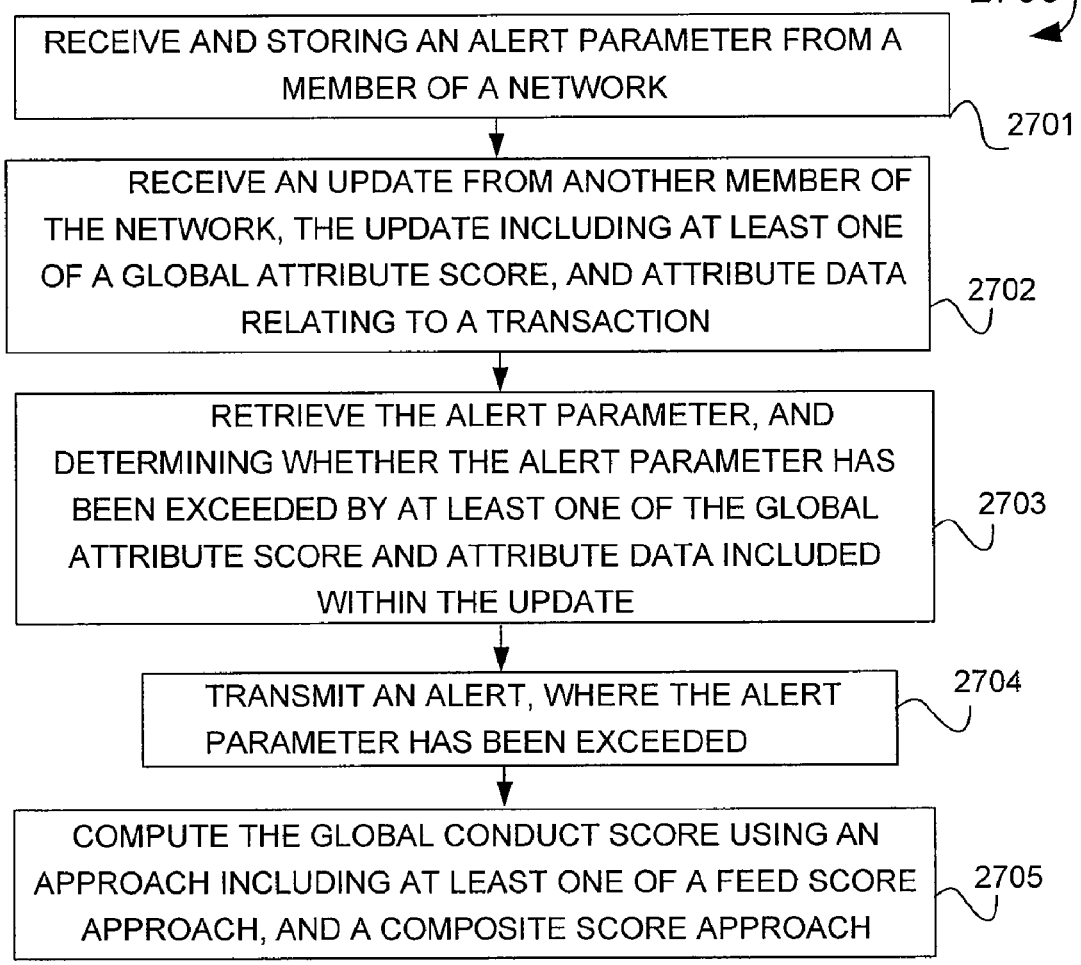
FIG. 27 is a flow chart illustrating a method to determine whether better transaction terms should be granted using both a global conduct score and attribute data, according to an example embodiment.

FIG. 27 is a flow chart illustrating a method 2700 to determine whether better transaction terms should be granted using both a global conduct score and attribute data. The operations shown below may reside as part of the scoring server 110, the computer system 201, or as one of the computer systems associated with the member of the network 104-107. An operation 2701 is shown that, when executed, receives and stores an alert parameter from a member of a network. Also, an operation 2702 is shown that when executed receives an update from another member of the network, the update including at least one of a global conduct score, and attribute data relating to a transaction. Operation 2703, when executed, retrieves the alert parameter, and determining whether the alert parameter has been exceeded by at least one of the global conduct score and attribute data included within the update. Operation 2704, when executed, transmits an alert, where the alert parameter has been exceeded. In some example embodiments, the alert parameter includes at least one of a global conduct score model that defines a first range of values, a global conduct score and attribute model that defines a second range of values, and range data defining a third range of values. Operation 2705, when executed, computes the global conduct score using an approach including at least one of a feed score approach, and a composite score approach. In some example embodiments, the attribute data includes page view data, click through data, account usage data, and good purchased data.

Figure 28:
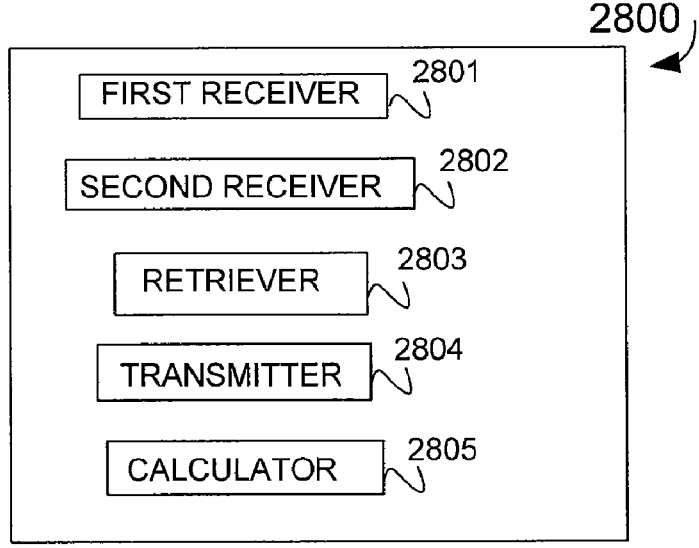
FIG. 28 is a block diagram of a computer system to determine better transaction terms, according an example embodiment.

FIG. 28 is a block diagram of a computer system 2800, and some of the functionality associated therewith. The blocks may be implemented as hardware, firmware, or even software. These blocks may reside as part of the scoring server 110, the computer system 201, or as one of the computer systems associated with the member of the network 104-107. Shown is a first receiver 2801 to receive and storing an alert parameter from a member of a network. A second receiver 2802 is illustrated to receive an update from another member of the network, the update including at least one of a global conduct score, and attribute data relating to a transaction. A retriever 2803 is shown to retrieve the alert parameter, and to determine whether the alert parameter has been exceeded by at least one of the global conduct score and attribute data included within the update. Also shown, is a transmitter 2804 to transmit an alert, where the alert parameter has been exceeded. In some example embodiments, wherein the alert parameter includes at least one of a global conduct score model that defines a first range of values, a global conduct score and attribute model that defines a second range of values, and range data defining a third range of values. A calculator 2805 is shown to compute the global conduct score using an approach including at least one of a feed score approach, and a composite score approach. Some embodiments may include attribute data that includes page view data, click through data, account usage data, and good purchased data.

Example Use of an Association Network as a Basis for Decision Making

In some example embodiments, an association network may be developed based upon global conducts scores and attribute data. This association network may be a model (e.g., an associated network model) generated by the scoring server 110 to associate one person and their behavior with another person and their behavior. This notion of association may be thought of as viral such that the behaviors of one group of person may be seen to infect another group of person through mere association. An association (e.g., association data) may be a transaction in commerce, an email exchange, a phone call, or some other type of interaction between persons. This association may be thought of as a node transaction. This associated network model may be a cyclic and acyclic graph and may contain a hierarchy of association networks. In some example embodiment, behavior may be synonymous with a global conduct score, and/or attribute data. In some example cases, the existence of this association may serve as the basis for advising a person on whether or not to engage in a transaction with another person, and/or may serve as the basis for determining the terms of the transaction. Further, in some example embodiments, the existence of this association may serve as the basis for alerting a person as to whether or not they should engage in a transaction, or seek to invalidate a transaction that they have already engaged in with another person. This process for alerting is previously illustrated in FIGS. 25-28.

Figure 29:
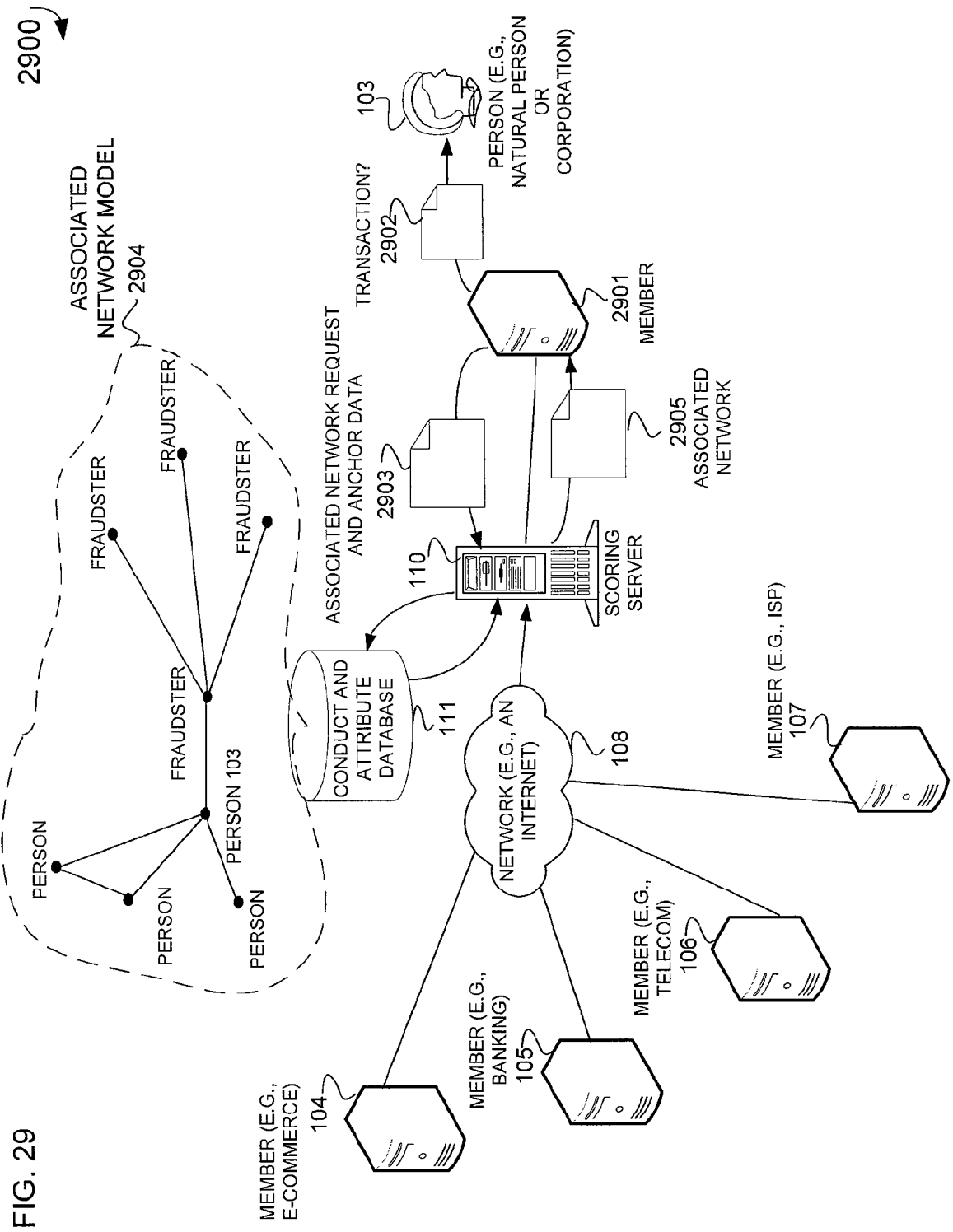
FIG. 29 is a diagram of a system implementing an associative network used to advise a person as to whether or not they should engage in a transaction with a particular person, according to an example embodiment.

FIG. 29 is a diagram of an example system 2900 illustrating a system implementing an associative network used to advise a person as to whether or not they should engage in a transaction with a particular person. In some example embodiments, a member 2901 seeks to engage in a transaction 2902 with a person 103. Prior to, during, or after the completion of the transaction 2902, the member 2901 may make an associated network request 2903 of the scoring server 110. As with, for example, FIGS. 1, 2, 7, 11, 17, and 25 anchor data may be associated with this associated network request 2903 so as to uniquely identify the party about whom the associated network request 2903 is being made. Once the associated network request 2903 is received at the scoring server 110, the scoring server 110 will access the conduct and attribute database 111 so as to retrieve the data necessary to generate an associated network model 2904. This data may include various global conducts scores associated with a number of persons, and/or may include attribute data for a number of person. In some example embodiments, the scoring server 110 may use the data necessary to generate an associated network model 2904 to generate the associated network model 2904.

Some example embodiments may include the associated network model 2904, and/or the global conducts scores and attribute data used to generate it, being transmitted by the scoring server 110 to the member 2901 for review as an associated network 2905 data packet or series of data packets. In some example cases, this associated network 2905 data packet or series of data packets may be sent across a network such as network 108 (not pictured). The member 2901 may then, using a computer system, build the associated network model 2904 using the associated network 2905 data packet or series of data packets. Further, the member 2901, using a computer system, may review, analyze, or otherwise use the associated network 2904 to make a determination as to whether to engage in the transaction 2902 with the person 103.

Some example embodiments may include at least one computer system operated by one or more of the members 104-107 generating the associated network model 2904 and transmitting it across the network 108 for storage into the conduct and attribute database 111. This associated network model 2904 generated by one or more of the members 14-107 may be then be retrieved by a member making an associated network request, and providing anchor data. One example of analysis is provided below.

Figure 30:
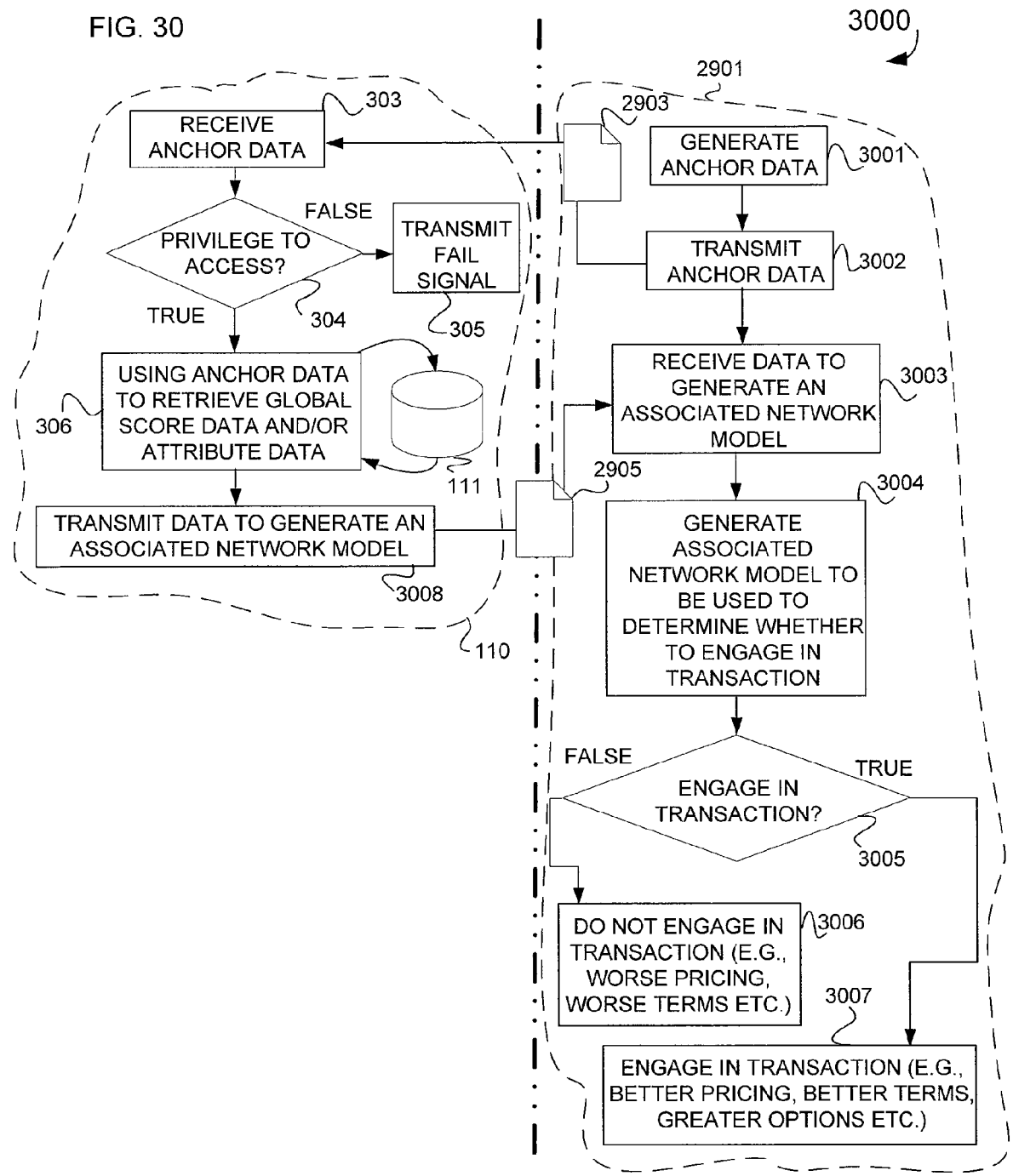
FIG. 30 is a dual-stream flowchart illustrating a method used to generate the associated network model that may be used by a member to determine whether or not they should engage in a transaction with a particular person, according to an example embodiment.

FIG. 30 is a dual-stream flowchart illustrating an example method 3000 used to generate the associated network model 2904 that may be used by a member to determine whether or not they should engage in a transaction with a particular person. Shown is a number of operations 3001 through 3007 and various conduct and attribute databases 111 and operations that reside as part of, for example, the scoring server 110. In some example cases, these operations 3001 through 3007 may reside on at least one computer system operated by the member 2901. Some example embodiments may include an operation 3001 that when executed generates anchor data along with making an associated network request. An operation 3002, when executed, may transmit this associated network request and anchor data as the associated network request 2903. Operation 303 may be executed to receive this associated network request 2903. Various operation 304 through 306 may then use the anchor data to make a determination as to whether the member making the request (e.g., member 2901) has the privileges to make this request. Where the privileges are deemed to exist, an operation 3008 is executed that generates an associated network model 2904 and transmits it as the associated network 2905 data packet or series of data packets. As illustrated above, in some example cases, only the attribute data and/or global conduct scores needed to generate the associated network model 2904 may be transmitted by the operation 3008. In some example cases, the operations 303-306, conduct and attribute database 111, and operation 3008 may reside on the scoring server 110.

Some example embodiments may include the execution of an operation 3003 that receives the associated network 2905 data packet or series of data packets. An operation 3004 may be executed that may generate the associated network model 2904 to be used to determine whether to engage in the transaction 2902, and/or what the terms of the transaction 2902 should be. A decisional operation 3005 may be executed to advise the member 2901 as to whether they should engage in the transaction 2902 based upon the provided or generated associated network model 2904. In cases where the decisional operation 3005 evaluates to "true", an operation 3006 may be executed. In cases where decisional operation 3007 evaluates to "false", an operation 3007 may be executed. Operation 3006 may instruct the member 2901 not to engage in the transaction 2902, or to do so under terms that are disadvantageous to the person 103. Operation 3007 may instruct the member 2901 to engage in the transaction 2902, and/or to do so under terms that are advantageous to the person 103. As discussed elsewhere the concept of disadvantageous terms may include, for example, worse pricing, worse payment options and basically terms that are worse relative to the terms that the person 103 would have otherwise been entitled to receive. An advantageous term may include a term that is more economically advantageous as compared to another term. These better terms may include, for example, better pricing, better payment terms, and a greater breadth of payment options.

In some example embodiments, decisional operation 3005, and operations 3006 and 3007 reflect the concept of risk based pricing and terms. Risk may be a chance of financial loss based upon a global conduct score(s), and/or attribute data. Part of this concept, is the notion that the higher the risk the higher the price, and the worse the terms for the person such as person 103. Conversely, the lower the risk the lower the price, ands the better the terms for the person such as person 103. Some example embodiments may include, analyzing of the level of risk for a particular transaction (e.g., transaction 2902) based upon an associated network 2905, as reflected in the associated network model 2904. Using this associated network model 2904, as constructed from the associated network 2905 the better or worse the network model 2904, the better or worse the terms. As stated elsewhere, these terms may be better pricing, better payment terms, and a greater breadth of payment options as compared to other terms. As applied in the present case of operations 3006 and 3007, the concept of risk based pricing and terms provides a basis for operation 3006 to advise the member 2901 to not engage in the transaction 2902, when this operation 3006 is executed. Alternatively, operation 3007 may advise the member 2901 to engage in the transaction 2902 under terms that are better for the person 103 as compared to other possible terms. Further, using risk based pricing and terms, operation 3007, when executed, may advise the member 2901 to engage in the transaction 2902, and under terms that are more advantageous to the person 103.

Figure 31:
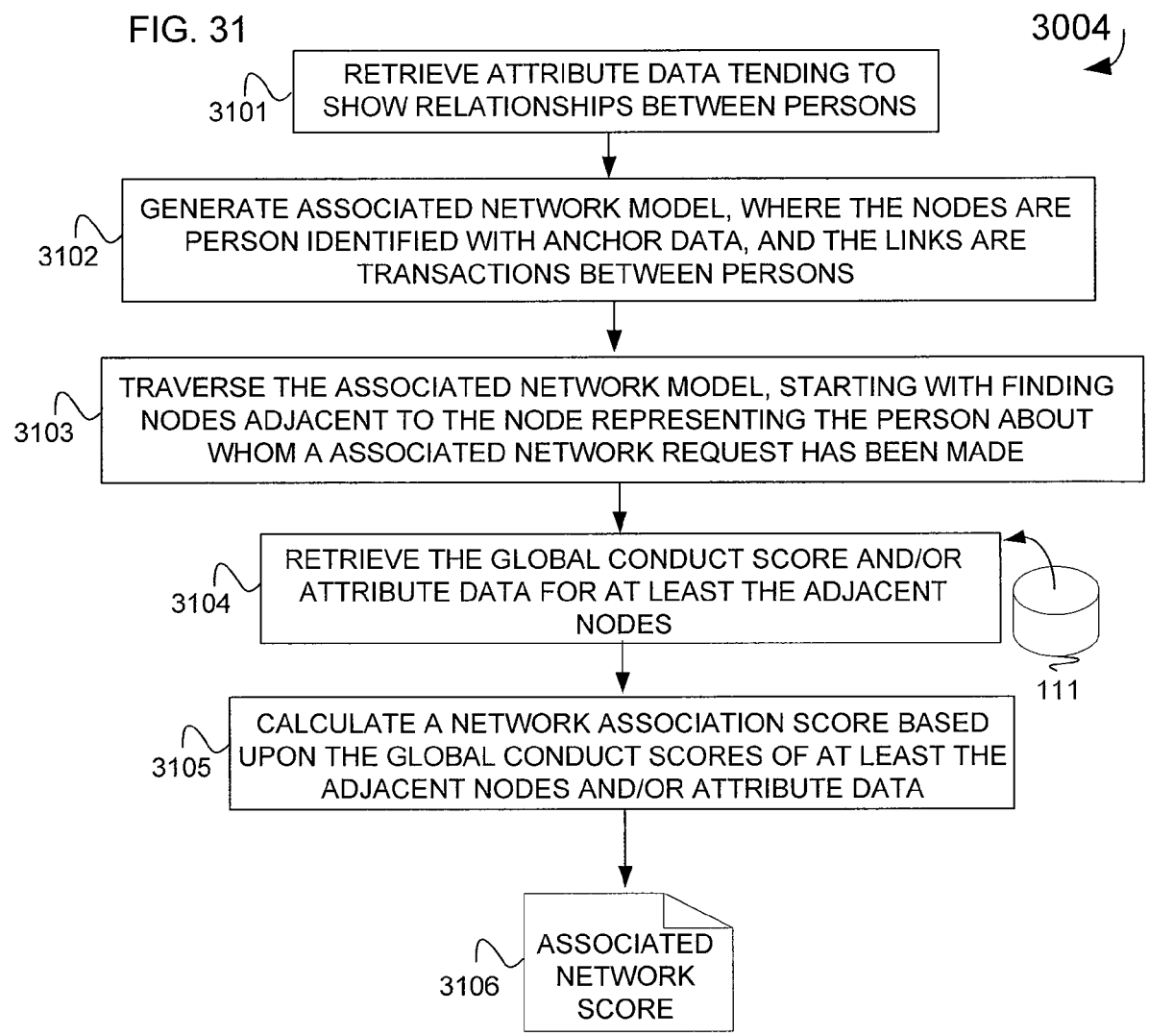
FIG. 31 is a flow chart illustrating a method to execute operation that generates an associated network model, according to an example embodiment.

FIG. 31 is a flow chart illustrating an example method to execute operation 3004. Shown is an operation 3101 that when executed retrieves attribute data tending to show a relationship between persons. In one example embodiment, this data (e.g., a node transaction) may be association data documenting a transaction in commerce, an email exchange, a phone call, or some other type of interaction between, for example, person 103 and another person. In certain example cases, this data may be probability based data documenting a relationship between the person 103 and another person. This probability based data may include data generated using certain statistical methods including Statistical Clusters, K-Means, Random Forests, and Markov Processes. These methods are referenced elsewhere as advanced statistical methods used to create the AI based model. An operation 3102 is also shown that, when executed, generates an associated network model such as associated network model 2904. The nodes of the associated network model may be persons, and links may be transactions between these persons, or other types of association data. Operation 3103 allows for the traversal of the associated network model, where the starting point of the traversal is the person (e.g., person 103) about whom the associated network request has been made. This may be the person identified by the anchor data generated by operation 3001. In some example embodiments, the traversal moves forward by finding all nodes adjacent to the person. Next, an operation 3104 may be executed that retrieves the global conduct scores and/or attribute data for all nodes adjacent to the person in the associated network model. In certain embodiments the transversal may continue with the discovery of nodes adjacent to the nodes that adjacent to the person about whom the associated network model has been requested. This process of traversing the associated network model may continue until certain sink nodes are encountered. An operation 3105 may executed that calculates a associated network score 3106 based upon the global conducts scores and/or attribute data from at least the nodes adjacent to the person about whom the associated network model has been requested. In certain example cases, where the associated network model is provided by, for example the scoring server 110, operations 3101 and 3102 may be bypassed and operation 3103 initially executed during the process of executing operation 3004.

In some example embodiments, the associated network score may be generated by applying one or more functions of mathematical properties to generate an output. For example, in one example embodiment, an average function is implemented that finds a sum of global conduct scores for nodes adjacent to the node representing the person about whom the associated network model has been requested. This sum is then used to compute an average global conduct score for adjacent nodes. This average global conduct score may be understood as the associated network score. Further, in some example embodiments, the average function may be applied to find other averages associated with node that are adjacent to the adjacent nodes and so on such that the average global conduct score may take into account a wider range of nodes.

Some example embodiments may include the use of a weighting function that maps a weighted numeric value to pieces of attribute data relating to nodes adjacent to the node representing the person about whom the associated network model has been requested. Once the numeric weighted values are mapped, then an average of these weighted numeric values may be determined and an associated network score generated. The mapping process may, in some cases, utilize a predefined table (e.g., a data structure such as a Hash Table, Binary Search Tree, Red-Black Tree, or even a Trie) of weighting values and predefined attributed data. The attribute data from the adjacent nodes may then be looked up and corresponding weighting values discovered and applied to the attribute data. For example, if adjacent nodes "A", "B", "C", and "D" have all made a phone call to a node "Z", and node "Z" is a known fraudster, then these phone calls as a type of attribute data may have a low weighted numeric value mapped to it. In this example, a low numeric weighted value may represent a value that is disadvantageous in terms of its ability to secure advantageous terms for the person about whom the associated network model has been requested. These weighted numeric value may be then averaged to generate an associated network score.

Figure 32:
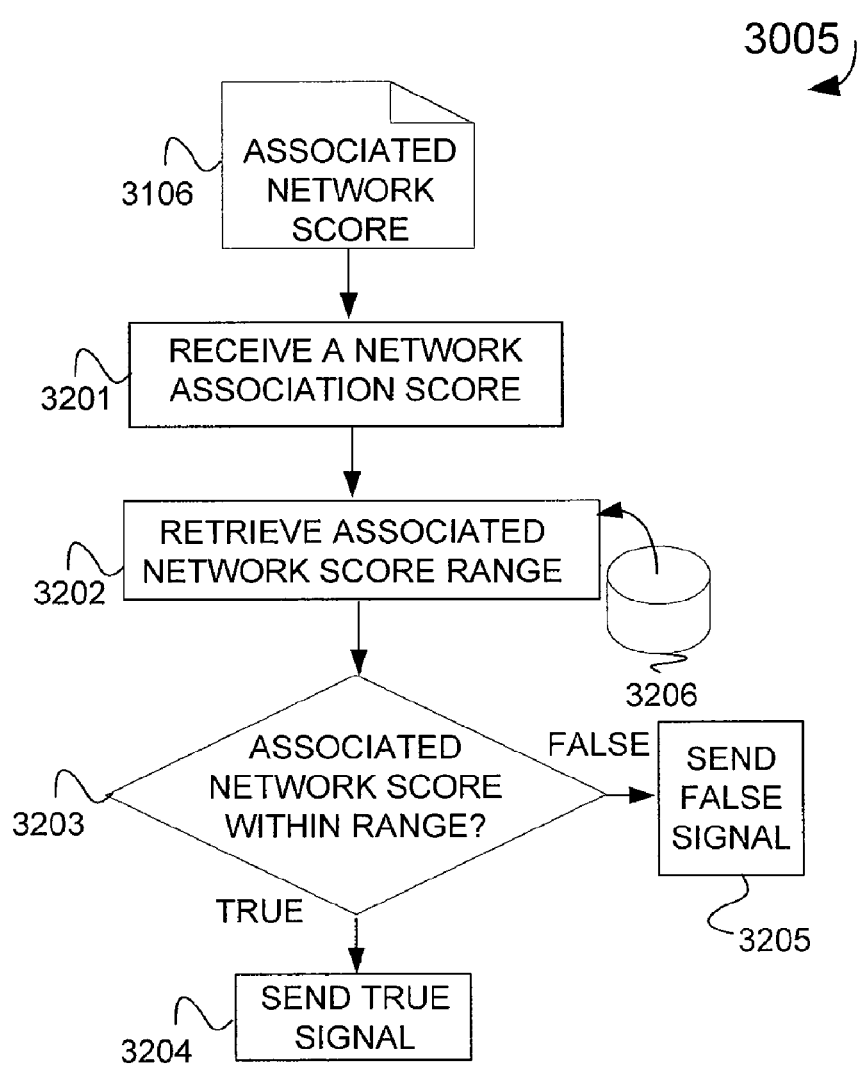
FIG. 32 is a flow chart illustrating a method to execute operation instructs a member as to whether to engage in a transaction, and/or the terms for such a transaction, according to an example embodiment.

FIG. 32 is a flow chart illustrating an example method to execute operation 3007. Shown is the network association score 3106 that is received through the execution of an operation 3201. An operation 3202 may be executed that retrieves an associated network score range from a database 3206. A decisional operation 3203 is executed to determine whether the network association score 3106 falls within the retrieved associated network score range. In cases where decisional operation 3203 evaluates to "false", an operation 3205 is executed that sends false signal. In cases where decisional operation 3203 evaluates to "true" an operation 3204 is executed. This operation 3204 transmits a true signal.

Figure 33:
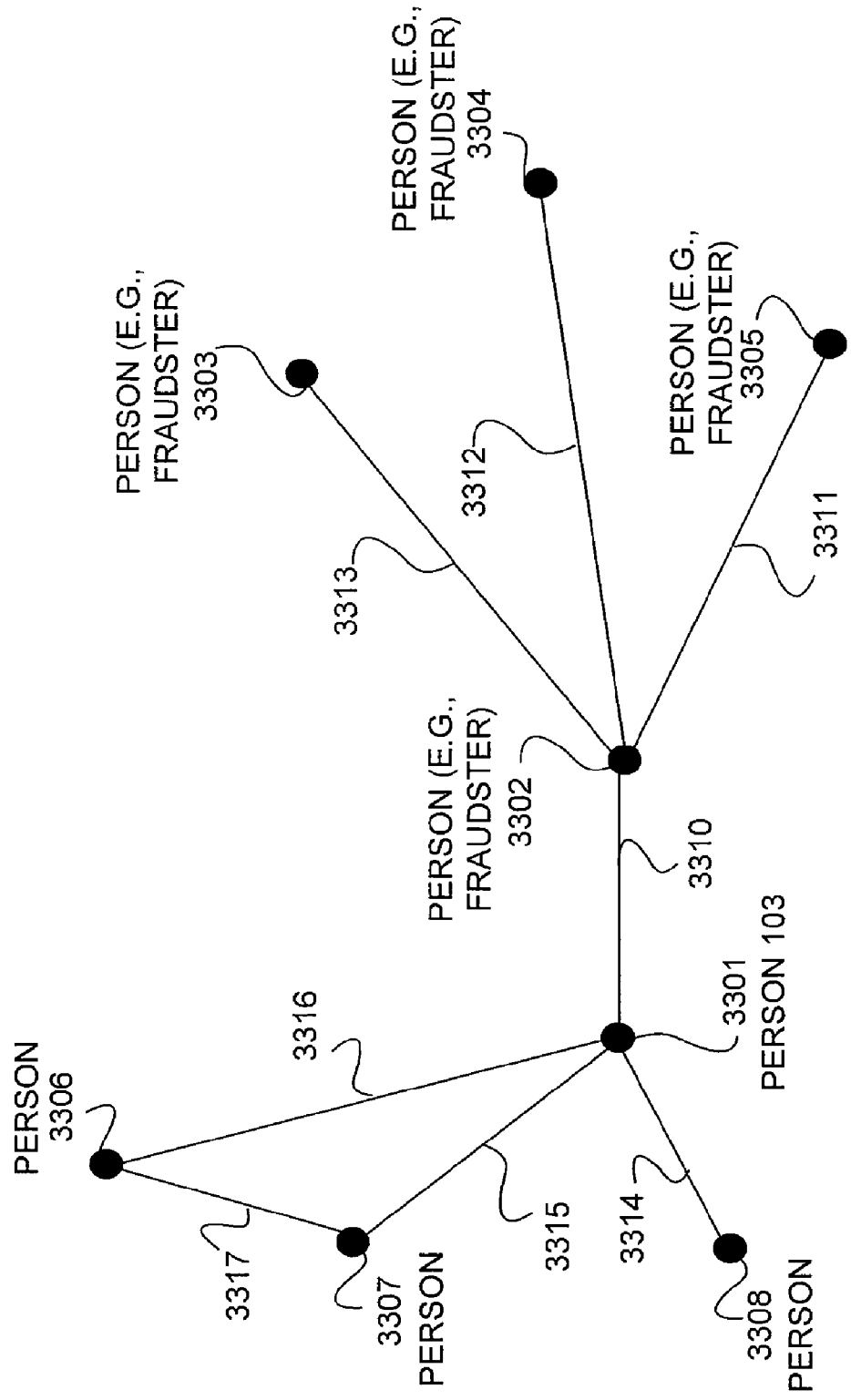
FIG. 33 is a diagram of a associated network diagram showing the relation between a person, and a network of fraudsters, according to an example embodiment.

FIG. 33 is a diagram of the example associated network diagram 2904. Illustrated is a series of person nodes 3306, 3307, 3308, and 3301, where person nodes 3301 represents person 103. Also shown is a number of person nodes, where the persons are fraudsters. These person nodes include 3303, 3304, and 3305. Connecting each of the person nodes 3306, 3307, 3308, and 3301 are a plurality of links 3314-3317. Connecting each of the nodes 3303-3305 (e.g., the fraudsters) are number of links 3311-3313. In some example embodiments, links between person nodes 3303-3305 are links denoting attribute data representing a node transaction such as phone call, emails, jointly held financial account that involve at least two of the persons represented by the nodes. Similarly, the links between person nodes 3301, 3308, 3307, and 3306 (e.g., links 3314-3317) may represent transactions between these nodes. These links 3314-3317 may be transactions including, for example, phone calls, emails, jointly held financial accounts that involve at least two of the persons.

Some example embodiments may include a link 3310 that links the person node 3301 to the person node 3302, where person node 3302 represents the person 3302 as a fraudster. This link 3310 may be, for example a node transaction in the form of a phone call between person node 3302 and person node 3301. For the purpose of determining a network association score 3106, this link 3310 may be considered as attribute data against which a weighted value may be mapped. This weighted value may then used, as previously discussed, to generate the network association score. Here, for example, the linkage between person node 3301 and 3301 as evidenced by link 3310, may result in person node 3301 being, in a sense, infected by the fraudulent activities of person node 3302.

In some example embodiments, the link 3310 may represent a node transaction between the person node 3301 and the person nodes 3302, but only for the purpose of justifying the use of the global conduct score of person node 3302 in the creation of the network association score 3106 for the person node 3301. Specifically, rather than weighting a link, in some embodiments, the link is used to justify the inclusion of a global conduct score from an adjacent node in the generation of the network association score 3106 for a particular node. Here, for example, the linkage between person node 3301 and 3301 as evidenced by link 3310, may result in person node 3301 being, in a sense, infected by the fraudulent activities of person node 3302.

Figure 34:
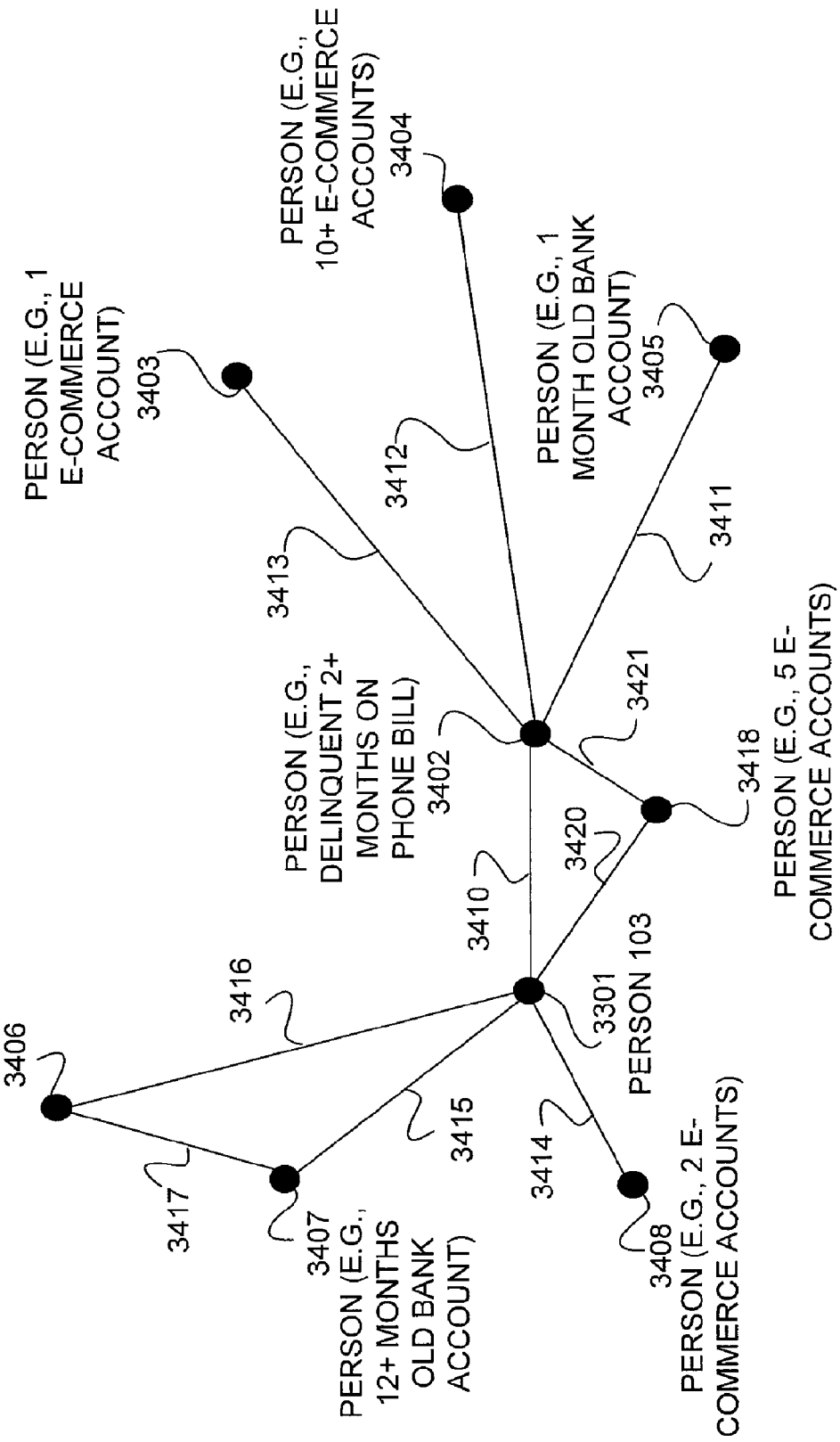
FIG. 34 is a diagram of the associated network diagram illustrating various persons and the status of various accounts they hold, according to an example embodiment.

FIG. 34 is a diagram of the example associated network diagram 3400. Illustrated is a series of person nodes 3406-3408, 3403-3405, and 3418. Connecting each of the person nodes are a plurality of links 3414-3417, and 3420-3421. Associated with each of the person nodes is some type of attribute data. For example, person node 3406 is represents a person 2+ months delinquent on their phone bill, person node 3403 represents a person with 1 e-commerce account, and person node 3404 represents a person with 10+ e-commerce accounts. In some example embodiments, collectively these various person nodes, and the links between them, may represent a neighborhood of relations. Here, for example, a person such as person 103 represented as person node 3301, may exist as part of this neighborhood of relations.

Some example embodiments may include person node 3301 being linked to a plurality of other person nodes such as person nodes 3406 and 3408. The links between person node 3301, and person nodes 3406 and 3408 include links 3416 and 3414. These links 3416 and 3414 may represent a transaction that have occurred between person node 3406 and 3301, in the case of link 3416, and transactions that have occurred between person node 3408 and 3301 in the case of link 3414. These transactions may include, for example, phone calls, emails, jointly held financial accounts that involve at least two of the persons represented by the person nodes.

In some example embodiments, based upon these links and person nodes, the person 103 reflected in person nodes 3301 may receive better or worse terms in a transaction. In some example cases, the a neighborhood of relations may dictate the terms that one may receive in a transaction. For example, if a person as represented by the person node 3402, has engaged in number of transactions with a person, as represented by a person node 3404, who has 10+ e-commerce accounts, or a person, as represented by a person node 3405, who has a 1 month old bank account, then the person may receive worse terms for a transaction. The determination of whether one should be offered worse terms or better terms may be based upon, for example, the previously illustrated mapping of a weighted value to attribute data.

Figure 35:
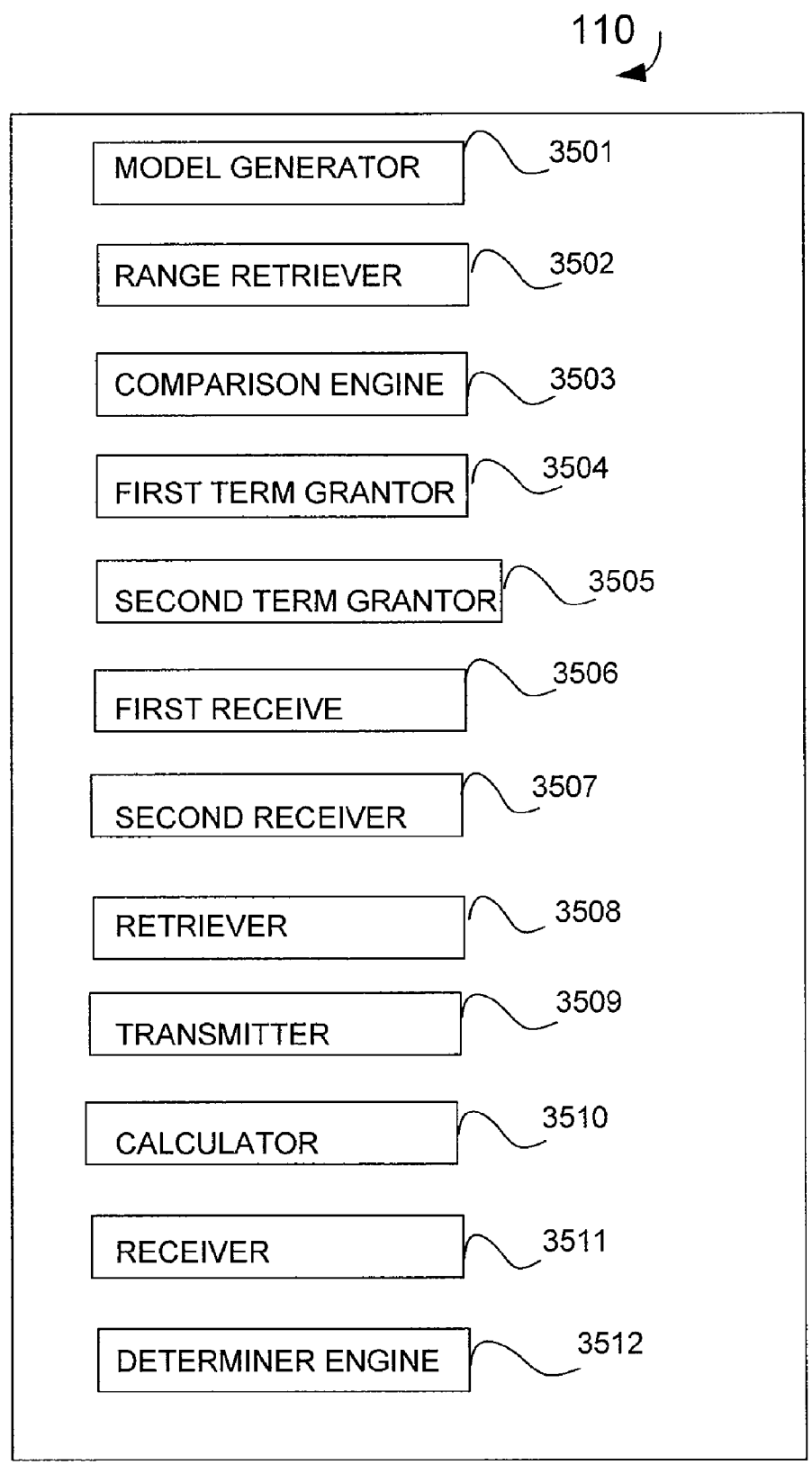
FIG. 35 is a block diagram of a computer system in the form the scoring server, according to an example embodiment.

FIG. 35 is a block diagram of an example computer system in the form of, for example, the scoring server 110. These various blocks may be implemented in hardware, firmware, or software. Illustrated is a computer system including a model generator 3501 to generate a model using at least one of a global conduct score and attribute data, a range retriever 3502 to retrieve a range of numeric values, based upon which, a better term is granted in a transaction than would otherwise be granted in the transaction, a comparison engine 3503 to compare the model and the range of numeric values, and a first term grantor 3504 to grant the better term in the transaction where the model falls within the range of numeric values. In some example embodiments, the global conduct score is computed using an approach including at least one of a feed score approach, and a composite score approach. Further, in some example embodiments the range of numeric values includes at least one of a global conduct score and attribute model, range data, and an associated network range score. Additionally, in some example cases, the better term is more economically advantageous to a party to the transaction, as compared to another possible term. Some example embodiment may include a second term grantor 3505 to grant a worse term that is less economically advantageous to a party to the transaction than would otherwise be granted.

In some example embodiments, the scoring server 110 may include a first receiver 3507 to receive and storing an alert parameter from a member of a network, a second receiver 3508 to receive an update from another member of the network, the update including at least one of a global conduct score, and attribute data relating to a transaction, a retriever 3509 to retrieve the alert parameter, and determining whether the alert parameter has been exceeded by at least one of the global conduct score and the attribute data included within the update, and a transmitter 3510 to transmit an alert, where the alert parameter has been exceeded. Moreover, in some example cases, the alert parameter includes at least one of a global conduct score model that defines a first range of values, a global conduct score and attribute model that defines a second range of values, and range data defining a third range of values. A calculator 3511 may be implemented to compute the global conduct score using an approach including at least one of a feed score approach, and a composite score approach. Further, in some example embodiments, the attribute data includes page view data, click through data, account usage data, and good purchased data. Also, in some example embodiments, a receiver 3512 is implemented to receive a data request with a data identifier, the data request including at least one of a request relating to global conduct score, and a request relating to attribute data, a determiner engine 3512 is implemented to determine to use the data identifier to determine the existence of a privilege to access data identified by the data request, the data including at least one of data in the form of a global conduct score, and data in the form of attribute data. Additionally, the retriever 3509 is implemented to retrieve the data where the privilege to access data identified by the data request exists, and the transmitter 3510 to transmit the data as at least one data packet.

Figure 36:
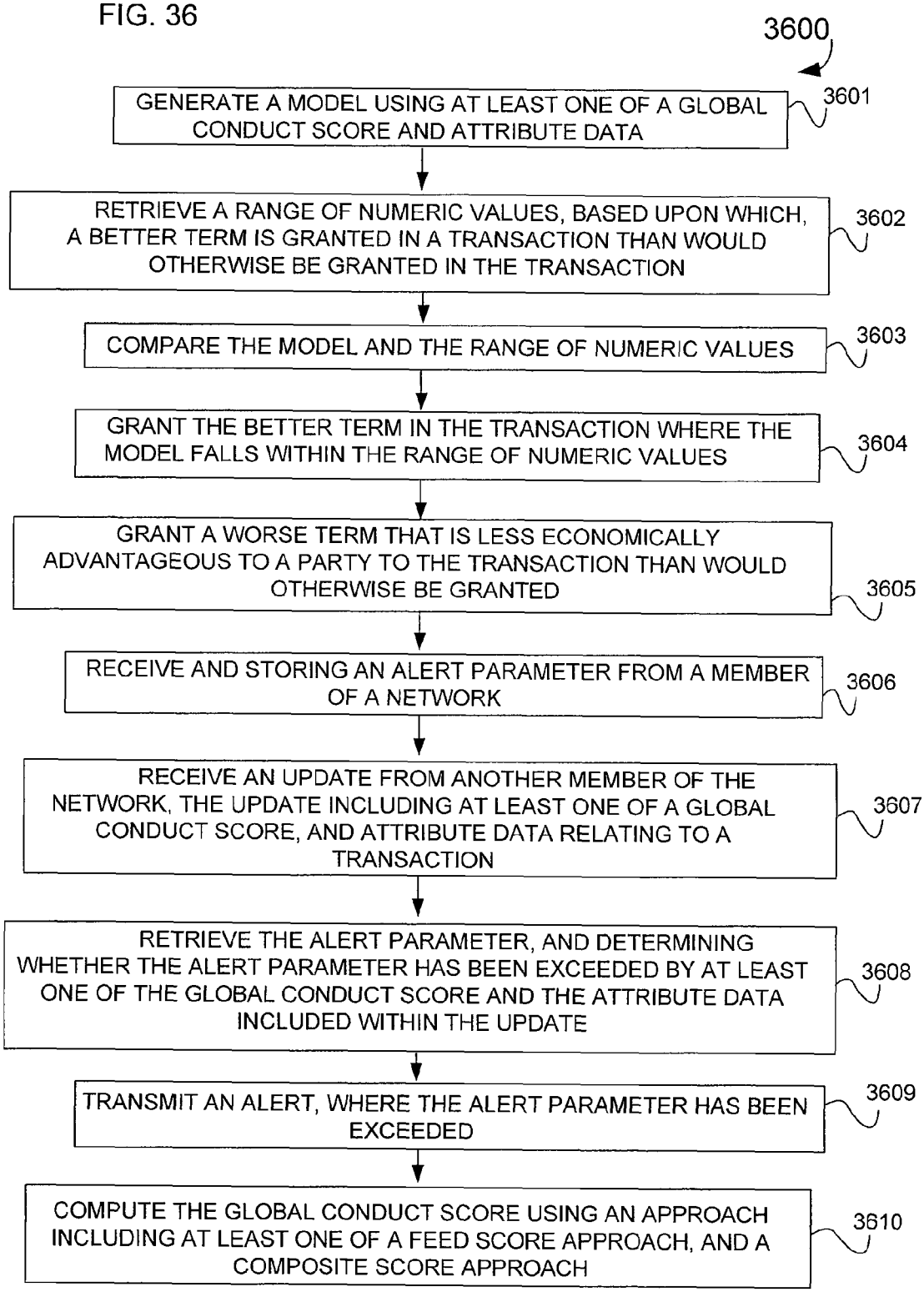
FIG. 36 is a flow chart illustrating a method to generate a model to assisting in making a decision as to whether to engage in a transaction based upon a global conduct score and/or attribute data, according to an example embodiment.

FIG. 36 is a flow chart illustrating an example method 3600 to generate a model to make a decision as to whether to engage in a transaction based upon a global conduct score and/or attribute data. Shown is an operation 3601 that when executed generates a model using at least one of a global conduct score and attribute data. An operation 3602 may be executed to retrieve a range of numeric values, based upon which, a better term is granted in a transaction than would otherwise be granted in the transaction. Further, an operation 3603 may be executed to compare the model and the range of numeric values. Also, an operation 3604 may be executed to grant the better term in the transaction where the model falls within the range of numeric values. The global conduct score may be computed using an approach including at least one of a feed score approach, and a composite score approach. The attribute data may include page view data, click through data, account usage data, and good purchased data. The model may include a global conduct score model, a weighting model, an AI based model, and an associated network based model. The AI based model may include at least one of a Decision Tree, a Fuzzy Associative Matrix, Statistical Clusters, K-Means, Random Forests, and Markov Processes. The range of numeric values may include at least one of a global conduct score and attribute model, range data, and an associated network range score. The better term may be more economically advantageous to a party to the transaction, as compared to another possible term. Also shown is an operation 3605 that when executed further comprises granting a worse term that is less economically advantageous to a party to the transaction than would otherwise be granted.

In some example embodiments, a further operation 3606 is executed on the scoring server 110 that receives and stores an alert parameter from a member of a network. Additionally, an operation 3607 may be executed that receives an update from another member of the network, the update including at least one of a global conduct score, and attribute data relating to a transaction. Further, an operation 3608 is executed that retrieves the alert parameter, and determining whether the alert parameter has been exceeded by at least one of the global conduct score and the attribute data included within the update. Also, an operation 3609 is executed that transmits an alert, where the alert parameter has been exceeded. In some example embodiments, the alert parameter includes at least one of a global conduct score model that defines a first range of values, a global conduct score and attribute model that defines a second range of values, and range data defining a third range of values. Also, in some example embodiments, an operation 3610 is executed to computing the global conduct score using an approach including at least one of a feed score approach, and a composite score approach. In some example case, the attribute data includes page view data, click through data, account usage data, and good purchased data.

Figure 37:
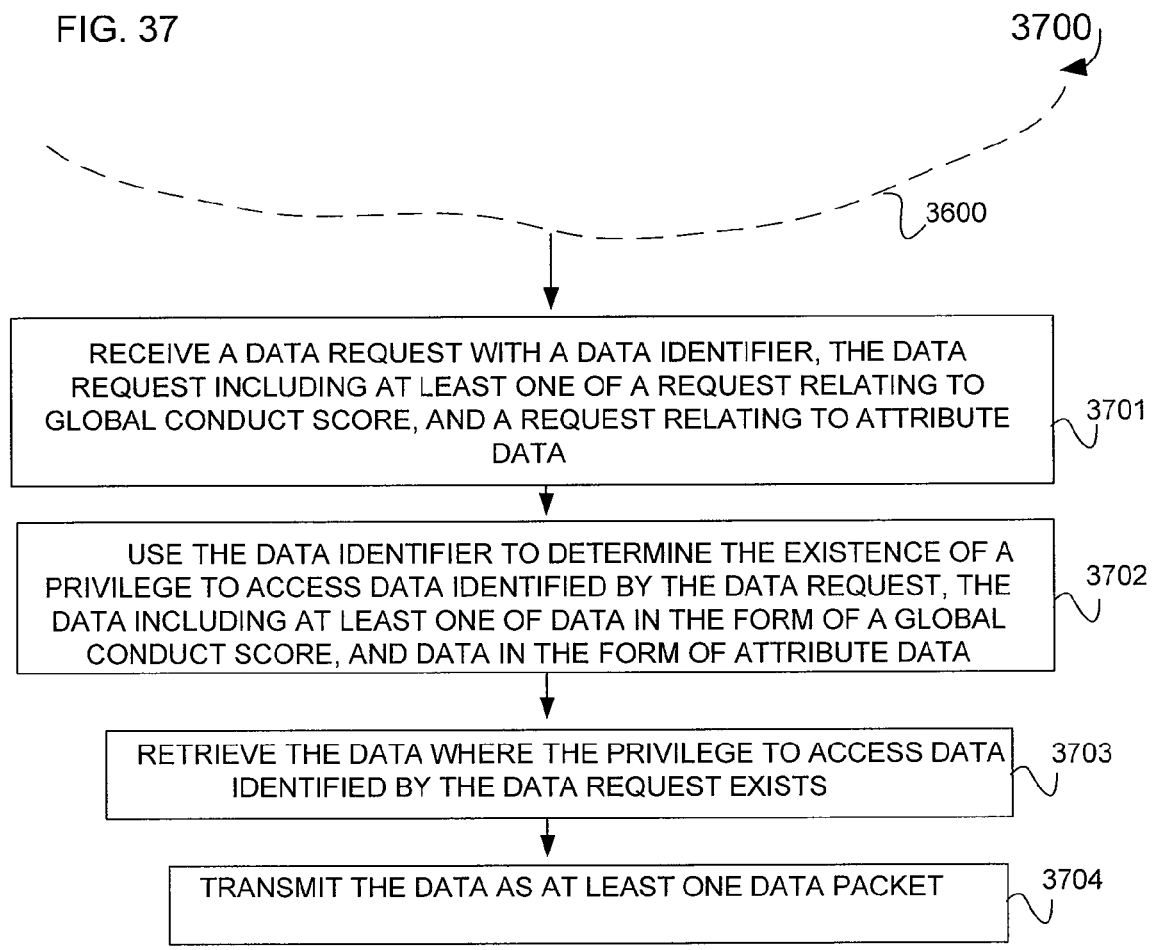
FIG. 37 is a flow chart illustrating a method to generate model to further assist in making a decision as to whether to engage in a transaction based upon a global conduct score and/or attribute data, according to an example embodiment.

FIG. 37 is a flow chart illustrating an example method 3700 to generate model to make a decision as to whether to engage in a transaction based upon a global conduct score and/or attribute data. Illustrated is an operation 3701 to receiving a data request with a data identifier, the data request including at least one of a request relating to global conduct score, and a request relating to attribute data. An operation 3702 may be executed to use the data identifier to determine the existence of a privilege to access data identified by the data request, the data including at least one of data in the form of a global conduct score, and data in the form of attribute data. An operation 3703 may be executed to retrieve the data where the privilege to access data identified by the data request exists. An operation 3704 may be executed to transmitting the data as at least one data packet.

Example Storage

Some example embodiments may include the various databases being relational databases, or in some example cases On-Line Analytical Processing (OLAP) based databases. In the case of relational databases, various tables of data are created and data is inserted into, and/or selected from, these tables using a Structured Query Language (SQL) or some other database-query language known in the art. In the case of OLAP databases, one or more multi-dimensional cubes or hypercubes containing multidimensional data from which data is selected from or inserted into using a Multi-Dimensional Expression (MDX) language may be implemented. In the case of a database using tables and SQL, a database application such as, for example, MYSQL™, SQLSERVER™, Oracle 8I™, 10G™, or some other suitable database application may be used to manage the data. In this case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 38:
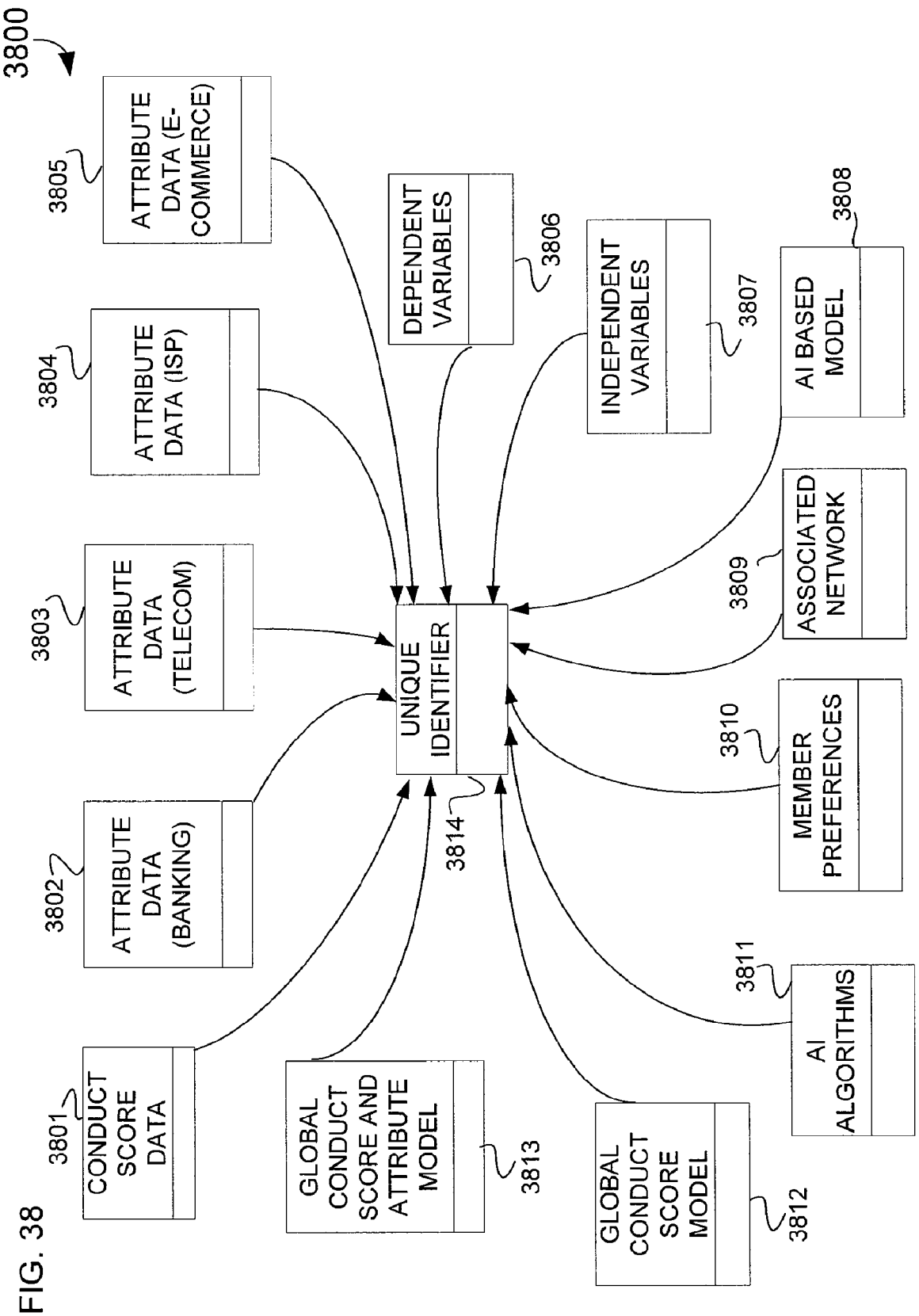
FIG. 38 is a diagram of a Relational Data Schema (RDS), according to an example embodiment.

FIG. 38 is a diagram of an example RDS 3800. Shown is a plurality of tables that may reside on any one of a number of databases 111, 804, 1205, 1805, 3707, and/or 2506. Illustrated is table 3801 titled "The Conduct Score Data." Contained within this table 3801 may be conduct score data that may be of an integer, float, or some other suitable numeric data type. Next, a table 3802 is illustrated containing attribute data for a banking site or website. This attribute data for table 3802 may include, for example, the number of transactions a particular person, such as person 103 is engaged in, the amount of each transaction, the date the various bank accounts were opened, account information relating to credit cards, or some other suitable type of data associated with banking and in particular online banking. Next, a table 3803 is illustrated that contains attribute data relating to the Telecom industry. This attribute data for Telecom may include, for example, the date that a Telecom account was opened, the usage on a particular account, the numbers called for or on the account, the geographical location of these numbers and other suitable data. Next, a table 3804 is shown that contains attribute data for an ISP, wherein this attribute data for the ISP includes, for example, the dates an account was opened, the location of the various IP addresses or Internet protocol addresses for a particular user or, in this case, persons such as person 103, and the other persons with whom this account holder, such as person 103, may interact. Further, illustrated is a table 3805 containing attribute data in the form of, for example, an e-commerce account. This attribute data for the e-commerce account may include, for example, the purchases engaged in by the account holder, in this case, the person 103, the number of page views that they have engaged in, the number of click-throughs they have engaged in, account usage information, and the goods that they have purchased from a particular e-commerce site.

With regard to table 3802, 3803, 3804 and 3805, a variety of data types may be utilized to classify and store the data for each one of these tables. For example, with regard to table 3802 an integer, date, or other suitable data type may be used. As to table 3803, an integer, date, string, or other suitable data type may be used. With regard to table 3804 an integer, float, or double may be used or some other suitable data type may be used. With regard to table 3805 an integer, date, or even, in some example cases, a Binary Large Object (BLOB) may be used; wherein, for example, this BLOB may be used to classify web pages that a particular person, such as person 103, has viewed. Other tables that may make up this RDS 3800 may include, for example, a dependent variables table (e.g., table 3806) that may contain various dependent variables. These dependent variables may be, for example, percentile values that may be used to judge whether or not, for example, a person may make a payment such as, for example, a payment percentage value. Other suitable dependent variable values may be used based upon the type of, for example, AI based data structure that may be implemented to judge or otherwise evaluate attribute data such as, for example, attribute data 1703. Further, various independent variables may be stored into, for example, a table 3807. These independent variables may be ranges of values that correspond to the attribute data contained in, for example, the attribute data 1703. In some example cases, these independent variables may correspond to various links and link values connecting various nodes in an AI based data structure (e.g., node 2110, node 2111, node 2112, node 2113, node 2114, node 2115, node 2116 and node 2117).

In the case of table 3806, these dependent variables may be, for example, a string, integer, or some other suitable data type. In the case of table 3807, the various data contained within this table may include, for example, a string, integer, or some other suitable data type. Further, shown is a table 3808 titled "AI Based Model." Also shown is a table 3808 containing an AI based model. This AI based model may be, as previously shown, a Decision Tree, or may be, for example, a fuzzy matrix, an associative fuzzy matrix, or a plurality of associative fuzzy matrices. In some example cases, a BLOB data type may be used to store these various AI based models or some other suitable data type.

In some cases, a table 3809 is shown that contains data related to at least one associated network. Contained within this table 3809 are a number nodes and their relationships in the form of links. A BLOB data type may be used to store these nodes and there respective links. As shown elsewhere, a node may be able to be traversed using a link. Collectively, these nodes and there respective links may form an associated network model 2904, 3400, or some other suitable associated network model.

Also shown is a table 3810, wherein this table 3810 contains a number of member preferences. These member preferences may be taken from the various alert parameters 1811, previously illustrated, and may include various ranges of values based upon which a member, such as member 2501, may want to receive an alert, such as alert 2505. These ranges of values may be, for example, a global conduct score range and/or attribute data falling within a range based upon, for example, a global conduct score and/or attribute model or even a range in the form of, for example, a range within which an attribute date score may or may not fall. These member preferences contained within the table 3810 may include, for example, a string or integer or range of integers and data types associated therewith.

Further shown is a table 3811 containing one or more AI algorithms. These AI algorithms may be, for example, algorithms that may be used to construct, for example, a Decision Tree, a fuzzy matrices, a fuzzy associated matrix, or some other suitable AI algorithm. These AI algorithms may be in the form of, for example, a BLOB data type.

Also shown is a table 3812 that contains a global titled "A Global Conduct Score Model." Contained within this table 3812 is a global conduct score model, wherein this global conduct score model may be a predefined value or range of values that a global conduct score may or may not fall into. As previously alluded to and illustrated, in example cases where the global conduct score does fall within this range, then a person, such as the person 103, may be entitled to better or worse benefits when engaging in a transaction, such as transaction 702, with a member such as member 701. An integer, float, double, or some other suitable numeric data type may be used to classify the data contained within the table 3812. Also shown is a table 3812 that contains a global conduct score and attribute model, wherein this global conduct score and attribute model may be, for example, a model based upon weighted values comprising or including the global conduct score and attribute data. For example, in some example cases, the previously illustrated weighted model may fall within the range of values defined by this global conduct score and attribute model. This global conduct score and attribute model may be, for example, an integer, float, double, or some other suitable numeric data type.

In some example cases, a table 3813 may be implemented. Contained within this table 3813 may be at least one global conduct score and attribute model. This model may illustrate a range of numeric values based upon which a better term is granted. An integer, float, or other suitable data type may be used to store this model.

Some example embodiments may include a table 3814 containing unique identifier information to uniquely identify some, if not all, of the data contained in the various tables (e.g., table 3801 through 3813). This uniquely identifying information may be, for example, an integer, float, or some other suitable numeric data type that will facilitate the unique identification of the various data contained in these various tables.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or, non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above illustrated tiers, and processes or operations that make them up, as being written as one or more software components. Common too many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or TCP/IP protocol stack model for defining the protocols used by a network to transmit data.

A System of Transmission Between a Server and Client

Some example embodiments may utilize the Open Systems Interconnection (OSI) basic reference model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some example cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

Figure 39:
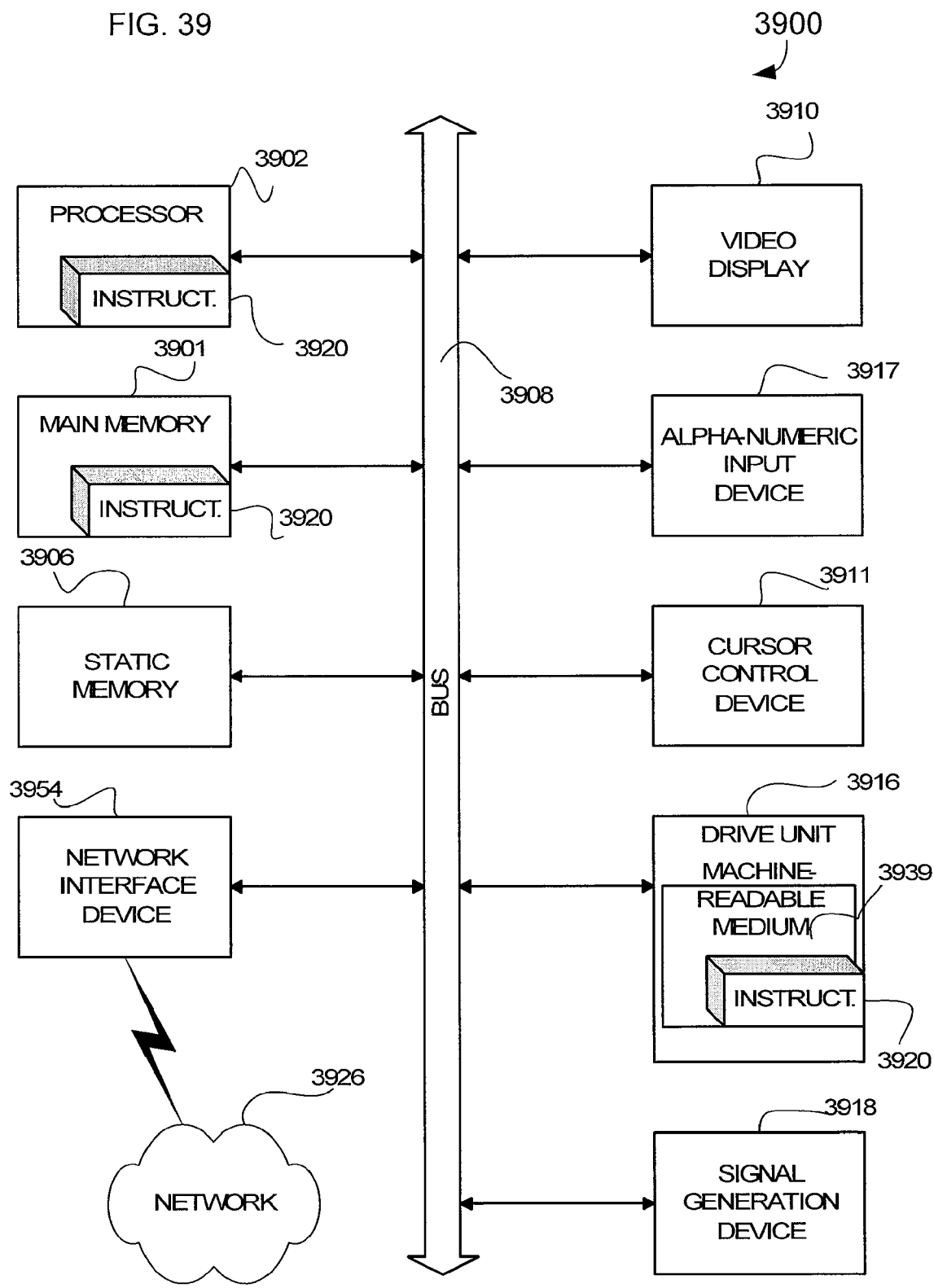
FIG. 39 shows a diagrammatic representation of a machine in the form of a computer system, according to an example embodiment.

FIG. 39 shows a diagrammatic representation of a machine in the example form of a computer system 3900 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network, both perform tasks. In a distributed system environment, program modules may be located in both local and remote memory-storage devices (see below).

The example computer system 3900 includes a processor 3902 (e.g., a Central Processing Unit (CPU), a Graphics Processing Unit (GPU) or both), a main memory 3901 and a static memory 3906, which communicate with each other via a bus 3908. The computer system 3900 may further include a video display unit 3910 (e.g., a Liquid Crystal Display (LCD) or a Cathode Ray Tube (CRT)). The computer system 3900 also includes an alphanumeric input device 3917 (e.g., a keyboard), a User Interface (UI) cursor controller 3911 (e.g., a mouse), a disc drive unit 3916, a signal generation device 3918 (e.g., a speaker) and a network interface device (e.g., a transmitter) 3954.

The disc drive unit 3916 includes a machine-readable medium 3922 on which is stored one or more sets of instructions and data structures (e.g., software) embodying or utilized by any one or more of the methodologies or functions illustrated herein. The software may also reside, completely or at least partially, within the main memory 3901 and/or within the processor 3902 during execution thereof by the computer system 3900, the main memory 3901 and the processor 3902 also constituting machine-readable media.

The instructions 3920 may further be transmitted or received over a network 3926 via the network interface device 3920 utilizing any one of a number of well-known transfer protocols (e.g., (Hyper-Text-Transfer Protocol (HTTP), Session Initiation Protocol (SIP)).

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, a system and method is illustrated to provide for the analysis of a global conduct score and attribute data. This analysis, in some example cases, may assist a person (e.g., a natural person, corporation, or a member as defined herein) in determining whether to engage in a transaction with another party (e.g., where this party is a natural person, corporation, or even a member). In some example cases this analysis may be performed by one of the parties to the transaction, while in other embodiments, this analysis may be performed by another party and the results provided to the party to the transaction. This analysis may assist a party to the transaction in determining such things as whether the terms of a transaction are beneficial to the party given the global conduct score and/or attribute data associated with the other party with whom the party is transacting. Types of analysis include determining where a global conduct score falls within a range of values, weighting a global conduct score combined with weighting attribute data and determining where the combination of the these two weighted values fall within a range of values, and generating and AI based model and passing attribute data through this model. Once passed through the AI based model, a value may be generated that can then be compared against a range of values to determine whether to proceed with a transaction and under what conditions.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    identifying a network of users, the network of users comprising first users who have previously interacted with a particular user of the network of users and second users who have previously interacted with the first users, each interaction being a prior commercial transaction or an electronic communication, each user of the network of users having conducted one or more prior commercial transactions with a business entity or with another business entity;
    retrieving page view data including a number of views of a page by respective users of the network of users;
    retrieving a first range of numeric values determined by the business entity, the business entity to transact a current commercial transaction with the particular user of the network of users;
    comparing, using one or more processors, the number of views of the page and the range of numeric values; and
    in the current commercial transaction, granting a first contractual term to the particular user if the number of views of the page is within the range of numeric values and granting a second contractual term to the particular user if the number of views of the page is not within the range of numeric values.

2. The method of claim 1, further comprising computing a global conduct score using an approach including at least one of a feed score approach, and a composite score approach.

3. The method of claim 1, further comprising retrieving click through data of the respective users of the network of users, and account usage data of the respective users of the network of users.

4. The method of claim 1, further comprising computing a global conduct score model, a weighting model, and an Artificial Intelligence (AI) based model.

5. The method of claim 4, wherein the AI based model includes at least one of a Decision Tree, a Fuzzy Associative Matrix, Statistical Clusters, K-Means, Random Forests, and Markov Processes.

6. The method of claim 3, further comprising comparing click through data and account usage data to a second range of numeric values and a third range of numeric values, respectively.

7. The method of claim 1, wherein the first contractual term is more economically advantageous to the particular user as compared to the second contractual term.

8. The method of claim 1, wherein the second contractual term is less economically advantageous to the particular user than the first contractual term.

9. A method comprising:
    receiving and storing an alert parameter from a member of a network, the alert parameter indicating a threshold number of views of a page;
    receiving an update from another member of the network, the update including at least page view data of a network of users, the network of users being comprised of first users who have previously interacted with a particular user of the network of users and second users who have previously interacted with the first users, each interaction being a prior commercial transaction or an electronic communication, each user of the network of users having conducted one or more prior commercial transactions with a business entity, the page view data indicating a number of views of the page by respective users of the network of users;
    retrieving the alert parameter, and comparing the alert parameter with the page view data included within the update; and
    transmitting an alert if the page view data exceeds the alert parameter.

10. The method of claim 9, wherein the alert parameter indicates at least a click through threshold, and an account usage threshold.

11. The method of claim 9, further comprising computing a global conduct score using an approach including at least one of a feed score approach, and a composite score approach.

12. The method of claim 9, wherein the update includes click through data of the respective users of the network of users, and account usage data of the respective users of the network of users.

13. The method of claim 9, further comprising:
    receiving a data request with a data identifier, the data request including at least a request for page view data;
    using the data identifier to determine a privilege to access data identified by the data request;
    retrieving the requested data based on the privilege; and
    transmitting the requested data.

14. A computer system comprising:
    a scoring server to identify a network of users, the network of users comprising first users who have previously interacted with a particular user of the network of users and second users who have previously interacted with the first users, each interaction being a prior commercial transaction or an electronic communication, each user of the network of users having conducted one or more prior commercial transactions with a business entity or with another business entity, the scoring server to retrieve page view data of the network of users, the page view data indicating number of views of a page by respective users of the network of users;
    a range retriever to retrieve a first range of numeric values determined by the business entity, the business entity to transact with the particular user of the network of users;
    a comparison engine to compare the number of views of the page and the range of numeric values; and
    a term grantor to grant, in a current commercial transaction, a first contractual term to the particular user if the number of views of the page is within the range of numeric values and to grant a second contractual term if the number of views of the page is not within the range of numeric values.

15. The computer system of claim 14, further comprising a calculator to compute a global conduct score using an approach including at least one of a feed score approach, and a composite score approach.

16. The computer system of claim 14, where the range of numeric values includes at least click through data, and account usage data.

17. The computer system of claim 14, wherein the first contractual term is more economically advantageous to the particular user as compared to the second contractual term.

18. The computer system of claim 14, wherein the second contractual term is less economically advantageous to the particular user than the first contractual term.

19. The computer system of claim 14, further comprising:
    a first receiver to receive and store an alert parameter from a member of a network, the alert parameter indicating a threshold number of views of a page;
    a second receiver to receive an update from another member of the network, the update including at least page view data of the network of users;

a retriever to retrieve the alert parameter, and comparing the alert parameter with the page view data included within the update; and a transmitter to transmit an alert if the page view data exceeds the alert parameter.

20. The computer system of claim 19, wherein the alert parameter indicates at least a click through threshold, and an account usage threshold.

21. The computer system of claim 19, further comprising a calculator to compute a global conduct score using an approach including at least one of a feed score approach, and a composite score approach.

22. The computer system of claim 19, wherein the update includes click through data of the respective users of the network of users and account usage data of the respective users of the network of users.

23. The computer system of claim 14, further comprising:
a receiver to receive a data request with a data identifier, the data request including at least a request for page view data;
a determiner engine to use the data identifier to determine a privilege to access data identified by the data request;
a retriever to retrieve the requested data based on the privilege; and
a transmitter to transmit the requested data.

24. An apparatus comprising:
means for identifying a network of users comprising first users who have previously interacted with a particular user of the network of users and second users who have previously interacted with the first users, each interaction being a prior commercial transaction or an electronic communication, each user of the network of users having conducted one or more prior commercial transactions with a business entity or with another business entity;
means for retrieving page view data including number of views of a page by respective users of the network of users;
means for retrieving a first range of numeric values determined the business entity, the business entity to transact a current commercial transaction with the particular user of the network of users;
means for comparing the number of views of the page and the range of numeric values; and
means for granting, in the current commercial transaction, a first contractual term to the particular user if the number of views of the page is within the range of numeric values and granting a second contractual term to the particular user if the number of views of the page is not within the range of numeric values.

25. A non-transitory machine-readable medium comprising instructions, which when implemented by one or more machines, cause the one or more machines to perform operations comprising:
identifying a network of users, the network of users comprising first users who have previously interacted with a particular user of the network of users and second users who have previously interacted with the first users, each interaction being a prior commercial transaction or an electronic communication, each user of the network of users having conducted one or more prior commercial transactions with a business entity or with another business entity;
retrieving page view data including a number of views of a page by respective users of the network of users;
retrieving a first range of numeric values determined by the business entity, the business entity to transact a current commercial transaction with the particular user of the network of users;
comparing, using one or more processors, the number of views of the page and the range of numeric values; and
in the current commercial transaction, granting a first contractual term to the particular user if the number of views of the page is within the range of numeric values and granting a second contractual term to the particular user if the number of views of the page is not within the range of numeric values.

* * * * *